(12) United States Patent
Naboulsi

(10) Patent No.: US 9,809,169 B1
(45) Date of Patent: Nov. 7, 2017

(54) SAFETY CONTROL SYSTEM FOR VEHICLES

(71) Applicant: Mouhamad A. Naboulsi, West Bloomfield, MI (US)

(72) Inventor: Mouhamad A. Naboulsi, West Bloomfield, MI (US)

( * ) Notice: Subject to any disclaimer, the term of this patent is extended or adjusted under 35 U.S.C. 154(b) by 0 days.

(21) Appl. No.: 14/216,201

(22) Filed: Mar. 17, 2014

Related U.S. Application Data

(60) Provisional application No. 61/788,354, filed on Mar. 15, 2013.

(51) Int. Cl.
  *B60R 1/00* (2006.01)
  *B60R 1/08* (2006.01)
  *B60R 1/02* (2006.01)
  *B60R 1/04* (2006.01)

(52) U.S. Cl.
  CPC ............... *B60R 1/025* (2013.01); *B60R 1/04* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,668,675 A | * | 9/1997 | Fredricks | B60R 1/02 359/838 |
| 5,993,015 A | * | 11/1999 | Fredricks | B60R 1/02 359/839 |
| 6,176,587 B1 | * | 1/2001 | Fredricks | B60R 1/02 307/10.1 |
| 8,717,196 B2 | * | 5/2014 | Wang | B60R 1/00 340/936 |
| 9,475,492 B2 | * | 10/2016 | Okano | H04N 7/18 |
| 2005/0180032 A1 | * | 8/2005 | Seguchi | B60R 1/1207 359/838 |
| 2009/0009874 A1 | * | 1/2009 | Englander | B60R 1/083 359/604 |
| 2013/0342926 A1 | * | 12/2013 | Lutz | B60R 1/025 359/846 |

* cited by examiner

*Primary Examiner* — Yonel Beaulieu

(57) ABSTRACT

A method for adjusting an outside mirror and inside rearview mirror comprising receiving pre-stored information, identifying the driver physical dimensions and preset at least one vehicle setting to the correctly engineered position for a the identified driver physical dimensions to avoid dangerous conditions from wrongly set device where the device is a rear view mirror and the dangerous condition is not seeing vehicles in adjacent lane when trying to change lanes and adapting the position of the rear view mirror as new information become available.

16 Claims, 33 Drawing Sheets

From BUS or SENSOR OR CALCULATED VALUES

Drive
- Parking Gear
- Neutral Gear
- Drive Gear
- Clutch depressed (M/T Only)
- Transmission Shift UP/Down
- Brake activation
- G Force/Two planes
- Throttle position, position/time
- Gas Pedal position, position/time
- Valves Intake / Exhaust position sensor
- Tachometer-Engine RPM rate/time
- Valves Intake/Exhaust position sensor
- Tachometer-Engine RPM rate/time
- Automatic Transmission flywheel dynamic change in Pressure sensor Change in Centrifugal force.
- Steering member angle, angle/time
- Inclinometer
- Rollover sensor
- Airbag deployment
- Roll/Bank
- Tires Pressure, FR, FL, RR, RL

Active Driver Assistant Systems
- ABS activation Signal(time)
- Adaptive/Intelligent cruise control
- Night vision
- Traction Control signal
- ESP/Stability controls/Anti Roll
- Intersection Collision Warning
- Lane/Road departure

Environment
- Lighting condition Night/Day
- Wiper Setting
- High beam light
- Fog Lamp
- HVAC setting
- Total Vehicle Weight
- Vehicle speed
- Number of Passengers
- Bearing/Longitude/Latitude/Altitude
- Proximity Alarm, Front Rear Blind spot

Body
- Turning signal Left/Right
- Emergency Flasher
- HVAC activation
- Wiper activation
- Intelligent food and beverage holder
- Driver Seat Belt
- Accessories activation
- Horn activation
- SSORSP, SSORSU, SSORSD, SSORSR, SSORSL, &CRD

Accessories
- Dog Strap
- Child Crying
- Dog barking detector
- Cigarette smoke

Physiology
- Alcohol Level
- Heart Rate
- Pressure on Steering Mechanism
- Sweat sensor
- Driver Temperature
- Voice Monitor

Security
- Driver Seat Position/Recliner Sensor
- Driver Seat/Back weight Sensor
- Steering Tilt wheel position

Figure 5 B

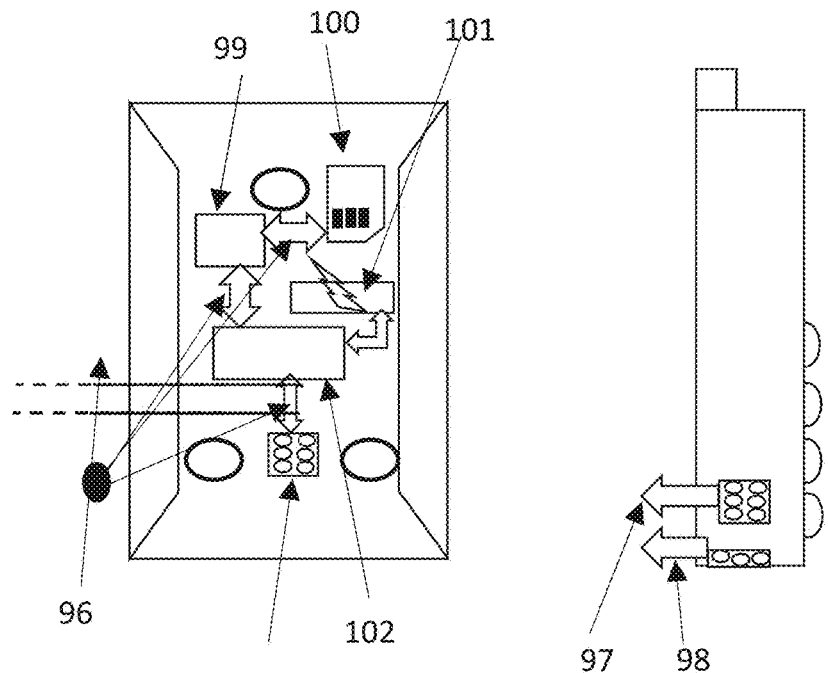
Figure 16 C  Figure 16 D
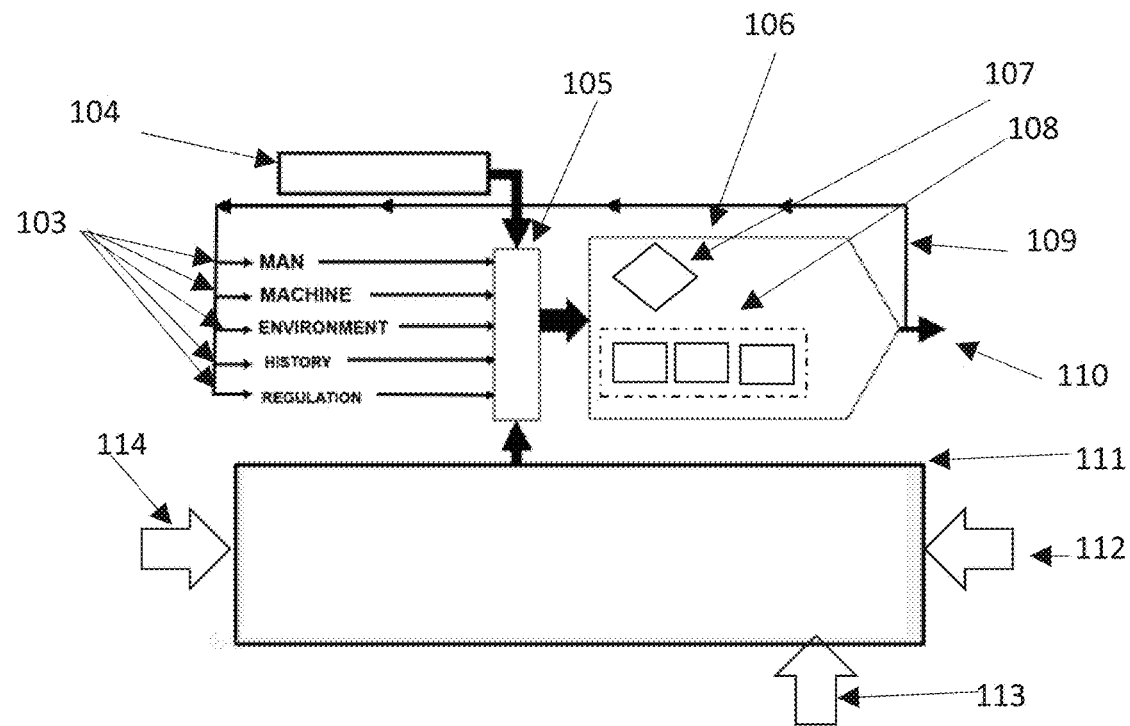
Figure 17

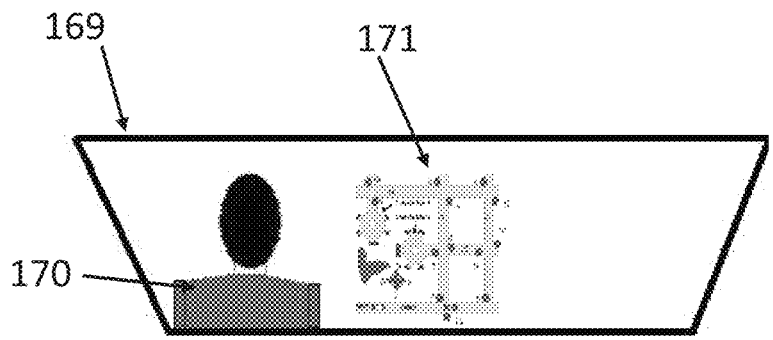
Figure 23
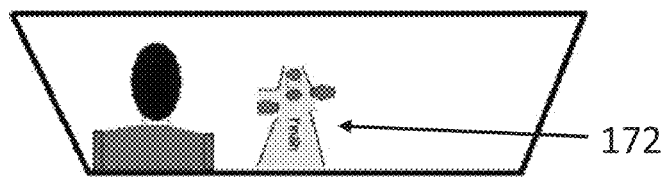
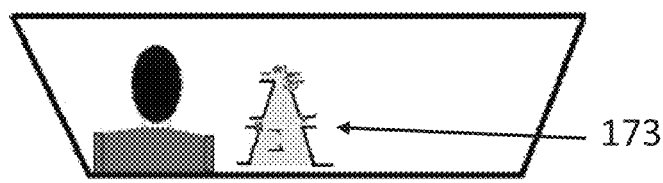
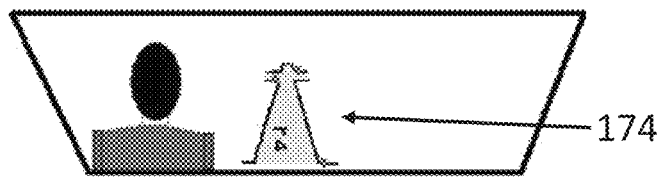
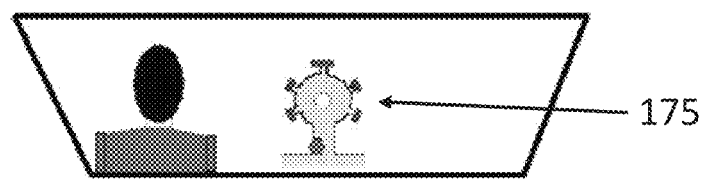
Figure 24

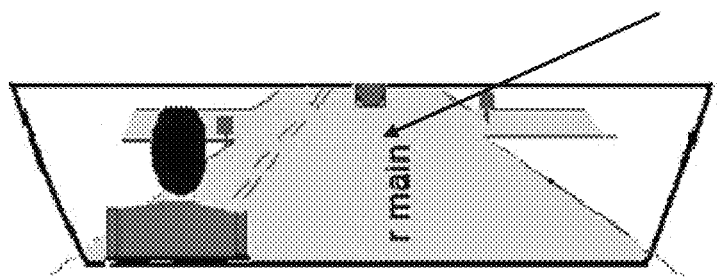
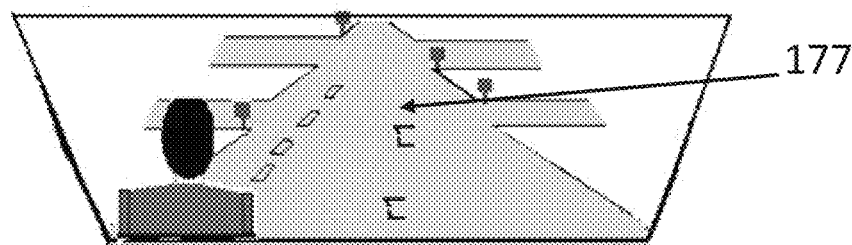
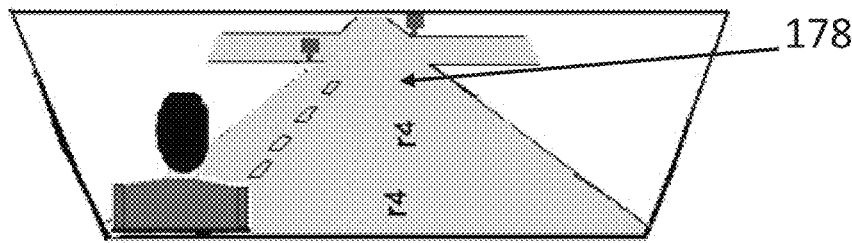
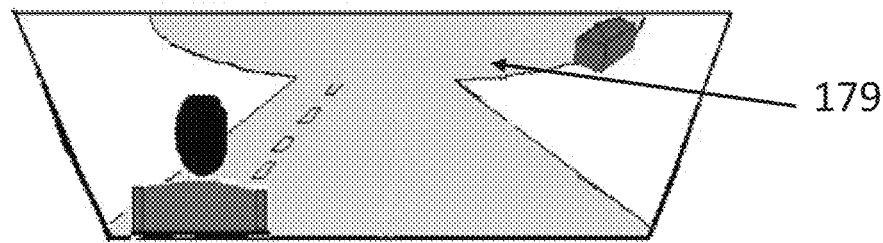
Figure 25

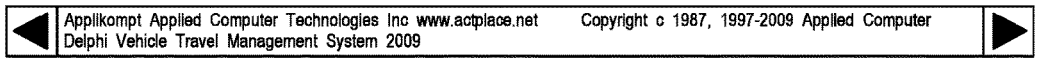

Closer look at the IP

Main Algorithms of the DrivingSystem™ Are:

- Man Machine interface (Focused on Telematic and not part of this presentation)
- Machine Machine Interface (Not a part of this presentation)
- Machine Regulation Interface (Other part of this presentation)
- Machine Environment Interface (Focus of the presentation)

- Predictive Algorithms

- On ramp / Off ramp detection
- Maintaining the steering wheel at an angle ALPHA outside Zero & Tolerance is an indication of long Blind View ahead
- Look Ahead Vector: Navigation As a look ahead Sensor
- G Force / Two planes
- Inclinometer Sensor
- Proximity Sensor
- Roll / Bank / Drive Sensor
- Wireless Data from LAN WAN Internet
- Speed + Mass United States and International patents are pending. All right reserved. This is a presentation for the purpose of soliciting business transaction and not for benchmarking or sharing of ideas. All contents are intellectual properties and need to be licensed by the inventor in writing for use by any other party or entity.

Figure 50

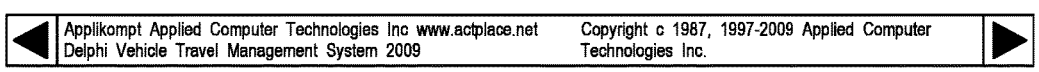

The Solution . . . .

Using Navigation as a look ahead sensor
AND other sensors in real time to:

1. Turn Off Engine or Electric Motor
2. Change Engine Calibration to reduce fuel consumption when not necessary
3. Give the Driver instantaneous feed back (Red, Yellow, Green)

United States and International patents are pending. All right reserved. This is a presentation for the purpose of soliciting business transaction and not for benchmarking or sharing of ideas. All contents are intellectual properties and need to be licensed by the inventor in writing for use by any other party or entity.

Figure 51

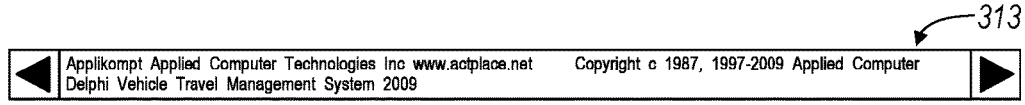

The Result....

- 10 % to 25% more MPG
- Tank range extended from:
  - from low 400 mile
    - To low 500 mile MAX
    - To Upper 400 mile Minimum
- Best Gas Mileage 25.9 MPG
- Least Gas Mileage 23.2 MPG
- Normal Gas Mileage 20.X - 21 MPG
- Same Driver (Mouhamad A. Naboulsi)
- Same Vehicle (1997 Villager)

United States and International patents are pending. All right reserved. This is a presentation for the purpose of soliciting business transaction and not for benchmarking or sharing of ideas. All contents are intellectual properties and need to be licensed by the inventor in writing for use by any other party or entity.

Figure 52

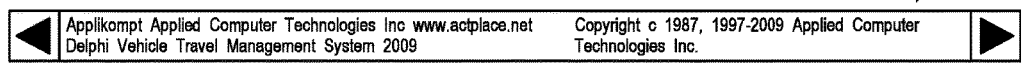

The Solution in Diagram....

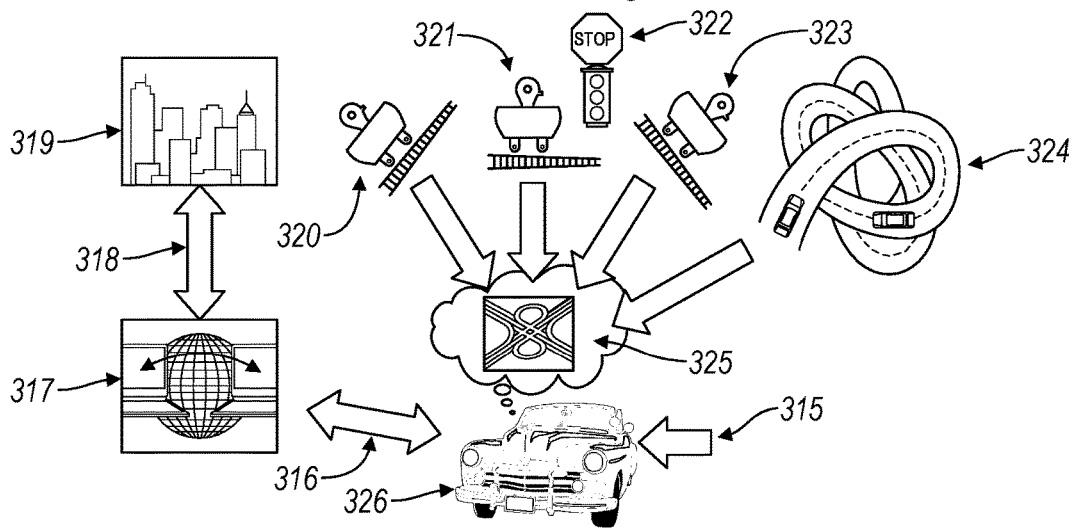

United States and International patents are pending. All right reserved. This is a presentation for the purpose of soliciting business transaction and not for benchmarking or sharing of ideas. All contents are intellectual properties and need to be licensed by the inventor in writing for use by any other party or entity.

<u>Figure 53</u>

| Signal | Signal Level/Nature | Engine | Drive Train | HMS | Normal Regenerative | New Regenerative |
|---|---|---|---|---|---|---|
| Foot On | Gas | | | | | |
| | Stable | ON | Coupled | Deactivate | Off | Off |
| | Increase | ON | Coupled | | | |
| | Decrease | Decrease Torque (change in fuel mixture to decrease torque or selectively shut down some cylinders) | Decouple | Active | Off | Off *Sample Logic table* |
| Foot Off Gas | | Off | Decouple | Active | Off | Off |
| Foot Off Brake | | Off | Decouple | Active | Off | Off |
| Brake | On | Off | Decouple | Deactivate | ON | ON |
| | Stable | Off | Decouple | Deactivate | ON | ON |
| | Increase | ON | Couple | Deactivate | ON | ON |
| | Decrease | Off | Decouple | Deactivate | ON | ON |
| Turn Signal ON | | Off | Decouple | Active | Off | ON |
| | Based on Foot Gesture | As per Foot Gesture information above | | | | |

Fig. 56

SAFETY CONTROL SYSTEM FOR VEHICLES

REFERENCE TO CO-PENDING APPLICATIONS

The present application is a continuation-in-part of U.S. patent application Ser. No. 10/287,299, filed on Nov. 4, 2002, which claims the benefit of U.S. patent application Ser. No. 10/279,447, filed on Oct. 24, 2002, Provisional application Ser. No. 60/336,293 filed on Oct. 24, 2001, and Provisional application Ser. No. 60/390,877 filed on Jun. 21, 2002, and Provisional Application No. 61/788,354 filed Mar. 15, 2013, and claims the benefit of the filing date of U.S. copending Non Provisional application Serial No. 13/405,237 filed on Feb. 25, 2012, the contents of which are incorporated herein by reference.

COPYRIGHT NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD OF THE INVENTION

There are multiple inventions disclosed here, they are broken down as follows.

One invention relates to the field of telematics inside and outside the vehicle, namely to the field of integrating information, communication, computing, personal data, personal interest, legal factors, etiquette, environmental factors, geographical factors, temporal factors, professional data, medical data and entertainment technologies into one pervasive integrated system. The field have safety effect in vehicles for civilian or military use. One aspect of the invention particularly relates to safety control systems for vehicles to reduce driver distraction, avoiding potentially dangerous conditions tending to produce accidents. Other aspects relates to utilizing the data generated to automate information processing to monetize such data through services and to provide a mean for traffic safety, vehicle design and development and update and legal enforcement.

BACKGROUND OF THE INVENTION

One potentially dangerous condition is the use of a vehicle telephone by the vehicle driver while driving the vehicle. The use of telematics in general and particularly cellular telephones by drivers while driving has been found to increase the possibility of an accident since such a telephone not only diverts the driver's attention from driving, but also generally requires the use of at least one of the driver's hands and distract the driver's eyes from the road and traffic. In fact, many states and countries have enacted legislation requiring that telephones used in vehicles by drivers while driving must be of the "hands free" type and usually telematics equipment carries a warning to educate and discourage the driver about the risk of using these devices while driving. However, such legislation is difficult to enforce and education is not usually effective in assuring driver compliance. Moreover, even where the vehicle is equipped with a "hands free" telephone, drivers nevertheless still frequently use one hand for holding or dialing the telephone. When one hand is occupied by holding a telephone, the danger of causing an accident in an emergency situation is increased because of the additional reaction time required to properly grip the steering wheel with both hands. Similar danger exists when the driver attempts to control audio and video equipment, e.g. Radio, Music CD, DVD, Books on tape etc., or when the driver attempts to change environmental controls like adjusting the heat or air conditioning, or other vehicle settings.

According to another field, the aspect of selectively blocking glare from driver eyes by using photochromic film controlled electrically with feedback from a camera According to another field, the aspect of writing on a board (e.g. blackboard) without using chalk or markers or any computer managed surface and it can be in Color or Monochrome board using Magnetic or Electrostatic stylus to write.

According to another field, the aspect deals with messaging where on many occasion we receive messages in many different medium marked as urgent or personal, etc. With this invention a Priority Confirmation Dialogue box for incoming messages to score the validity of the prioritization and create a profile about such user and consequently prioritize messages based on receiver criteria and not the sender criteria According to another field, the aspect deals Safety tracking device for children, elderly or anyone who may have problem in getting to where they need to be and it uses a dead man switch system so if a message is not received or validation method such as connection loss can be used as a trigger based on last information received.

According to another field, the aspect deals with Intelligent Delineation of roads and simplifying machine understanding of a road signs. Many lane departure technologies use camera to detect the car position between the lanes but this technology can be defeated by snow and glare. The suggestion is to use metal shaving in the form of a code in the paint to embed information to represent different lanes and delineation function or using them in a coded way so having certain order can mean different things. Similarly for road signs, a coded system can be used universally to identify the sign for machine reading, e.g. Camera or other remote sensing technology, e.g. magnetic field, radar, RFID, etc. to detect the contents and context of the sign without resorting to expensive or sophisticated sensors and algorithms According to another field, the aspect pertain to collecting data from driver Brain wave, neural oscillation, Electroencephalography, Magnetoencephalography or Electromyography to detect driver competence of work load while driving using a specialized Smart Headrest According to another field, the aspect pertain to sharing data with a portable device and another device without having to use the O/S or I/Os of portable device hosting the system. And also deals with sharing portable device internal mobile device components with another external device without using O/S software or middleware to effect the sharing According to another field, the aspect Mobile phone based vehicle interlock where a policy relating to DUI or suspended license or other restrictions are disseminated from a phone Another field deals with Portable telematics built in camera utilization in automotive application so a device with a controller and software can make use of the camera for sensing safety related events or objects within the field of view inside or outside the vehicle Another field deals with Modifiable docking station for portable telematics in that it allows a connection point to be affixed to a certain location and moved when another device is being used by replacing the cable only or by shifting its position Another field Monetizing and rewarding data sharing for drivers' particularly, but is also available for non-driving related activities Another field deals Maximizing the use of Kinetic energy already generated by managing the Potential energy existing in a moving object using foot gesture interpretation and environmental factors Another field deals with Eco Battery where energy generated from Windmills or Solar or Wave or other natural renewable resources can be stored by variable mechanical means if other storage methods are filled to capacity Another field deals Pedestrian Protection by utilizing a full sweep wiper that cleans the entire surface of the Windshield thus eliminating blind spots caused y dirt and snow Another field deals with reducing strength required to push a Bicycle pedal by adding a cam for certain areas of the pedal system Another field deals Walking style detection system to detect changes in behavior or state of competence and identify the person who is walking Another field deals with projected direction on the street so a driver will look ahead instead of onto the screen Another field deals Data and charging stick-on pad for portable devices to convert them from a plug in to a wireless charging, but also provide wireless data connectivity through wired protocol Another field deals Detecting vehicle position in road lanes by detecting 3D objects and calculating distances from them and then recognizing the position of the vehicle within a lane in a 3D world Another field deals with providing a driver E-warning instead of just verbal warning that will turn into a fine and an enforcement tool in case a driver violated a traffic rule as specified Another field deals Collapsible and Stylish Roof Rack that can be folded into the roof so it does not cause drag and wind noise thus saving fuels Another field deals with Automatic mirror adjustment based on driver physiology in real time so the mirrors are set to the right position even if the driver is inexperienced in the correct mirror setting.

Another field deals with Connected Utility station that can supply heating, cooling and other services while parking in inclement weather and services Another field deals with Play one own music while on hold instead of listening to the bad quality music and increasing their annoyance Another field deals Lane departure cameras designed to avoid sun wash, surface glare, etc. by using multiple views of the road or by changing orientation to detect the marking on the road Another field deals Geo Heading/Bearing/Latitude/Longitude/Time of day, Day of week, day of year month of year week of year aware camera, so it can change its analysis algorithm or the lens filter to filter out lighting conditions that can affect its correct detection Another field deals with Interactive menu for phones that uses a screen from a mobile device or from phone Another field deals with evacuating odors from toilet bowls through existing plumbing or through existing vents.

Another field deals with docking multiple portable devices in a vehicle to be accesses conveniently by a driver without taking vision of the road There are other potentially dangerous conditions and inherent risks in driving that depends on the driving act itself, such as rapidly accelerating or decelerating, excessive maneuvering, merging to or exiting a freeway, passing, changing lanes, changing gears, depressing the clutch, driving at high speed, negotiating a turn, braking, reverse-driving, or a stress condition on the part of the driver, that could increase the possibility of an accident should the driver be distracted by activation of the telephone or other signal or device. This inherent risk is also dependent on the driving purpose as well, for example, the risk in driving a police cruiser is inherently riskier then in driving a sedan, and driving a delivery van has different risk than driving the family van. There are other potentially dangerous conditions and inherent risks in driving due to driver poor adjustment of mirrors, or because the driver is busy changing posture back and forth and sideward trying to get a better view of the traffic in a blind spot, or the driver is busy reaching for the sun glasses to avoid glare or bringing down the sun visor or adjusting the temperature because the sun is making his side of the vehicle warm or even reaching to activate the turn signal in an unfamiliar car. All such busy activity adds to the driver workload and cognitive distraction and in some cases to stress and could increase the possibility of an accident by making the driver be distracted and takes his eyes off the road ahead and possibly his hand as well.

So the main function of the invention is to ease the work load and distraction of the driver by using data about the driver, the environment as in location, weather or traffic, the regulation, the vehicle and equipment at least on legal or etiquette aspect and historical aspect relating any of those using predefined data from a web, a LAN/Wan server a cellular service or a portable device with at least one key code allowing a controller to access the predefined data information from a Web, LAN/WAN server, cellular service and respond to real time conditions using such data statistically based on learned or present one or more algorithms known to create a condition where it reduces or eliminate accidents based on distraction and driver workload. This aspect of the invention is to use all collected data about the driver physiology and habit and preferences inside and outside the vehicle is order to provide timely assistance when necessary. It will also identify driver change in habit or physiology or verify driver identity to allow operation of vehicle and accessories based on legal, etiquette, environmental, licensing or temporal factors relating to the driver as an individual or as a subgroup of drivers.

The purpose of such assistance is to reduce such risk by reducing the driver workload, the controller will automatically activate and/or adjust accessories equipment and peripherals based on data collected in real time or on preset data that are required for safe operation of the vehicle if the driver needs such activation based on a preset or learned logic and the controller is also effective to control the output of audible or visual sounds and signals in a manner that does not distract the driver from an ongoing task in a situation where a driver is making use of such changes or adjustment One such dangerous condition can arise when the driver does not have a clear view of the traffic because of blind spots. Blind spot in a vehicle driven over the road refer to areas that are physically blocking the driver view such as the case with the 'A', 'B' or 'C' pillars supporting the roof or more depending on the body design. For example, a shipping van have only 'A' pillar and the 'B' pillar starts at the back of the driver seat and continues to the end of the vehicle body. Another body related blind spot is caused by high trunk lid limiting the view through the rear back lite/ windows and some time without any back window all together. Blind spot in a vehicle driven over the road is caused by rear view and side view devices such as rear view mirrors inside and outside with various optical treatment with Planar type being exactly reflective of the area reflected and convex and andaspheric used to provide the various views based on the location of the driver using the mirror and the need to cover more space than possible with the planar type. Additionally, optical cameras are now being used to eliminate blind spot to the rear of the vehicle and are being considered for other applications around the vehicle as well. Yet, there remains a problem with these devices that are caused by miss positioning and adjustment with respect to the driver physical dimensions.

Herbert et al., U.S. Pat. No. 6,188,315 and Brown, U.S. Pat. No. 6,353,778, disclose systems for avoiding preset potentially dangerous conditions while operating a vehicle having a vehicle telephone, but the systems described in those patents are of relatively limited application, and do not provide for avoiding dangerous conditions or to managing risk and individualizing the warnings to individual driving skills or application and to combinations of events and environmental conditions. Blind spots on vehicles is a known Man Machine Interface or a Human Machine Interface problem and many patents as well as engineering papers and articles have been written about them, their types and how to avoid them. One such prior popular information comes from Wikipedia.org under the article titled Blind spot (vehicle) that was reviewed with an update 26th of Feb. 2013 at 07:40. With the earliest identifiable date of Feb. 22, 2002 regarding a court case involving a boat "State v. Warren Haven". State of Maine. 2002 Feb. 28. Retrieved 2009 Oct. 6. However, the prior art reviewed is basically a definition or a description as in the Wikipedia reference. On the patent side, Kusztos, et al. U.S. Pat. No. 4,746,206, Biondi, et al. U.S. Pat. No. 4,906,089, Sakamoto, et al. U.S. Pat. No. 7,325,936, Su, et al. U.S. Pat. No. 7,012,510, Sakamoto U.S. Pat. No. 7,837,339, Jensen U.S. Pat. No. 5,056,905, Lang, et al. U.S. Pat. No. 6,390,631, Valentino U.S. Pat. No. 6,302,547, Osha U.S. Pat. No. 6,151,175. They all expect the driver to adjust the mirror correctly and aim to adjust the mirror angle based on the vehicle action, for example turning, driving on a slope, towing a trailer etc. Some go a little further by actuating the turn signal to change the view further out to check the traffic. In addition to not assuring a correct setting in the first place, the provide a change in angle only when a driver start changing directions so there is no opportunity to scope the possible blind spot ahead of time and before they start the traffic maneuver.

* Fredricks U.S. Pat. Nos. 5,993,015 and 6,176,587 on the other hand recognized the need for the initial set up and for the need to position the mirrors based on the driver physical dimensions, but he still relied on the driver to adjust the mirror based on his own understanding of where he should sit. For example, in case the driver moved the seat forward excessively, his adjustment method cannot detect an out of parameters settings.

SUMMARY OF THE INVENTION

An object of at least some presently preferred embodiments of the present invention is to provide a safety control system for vehicles tending to reduce the possibility of accidents in one or more of the above respects. Another object of at least some presently preferred embodiments of the invention is to provide a method of reducing or avoiding driver distraction and reducing driver workload during potentially dangerous conditions encountered while operating a vehicle.

According to one aspect of one embodiment of the present invention, a safety control system for vehicles, includes, a communication device having at least one of an input accessible from within the vehicle and an output communicated within the vehicle, at least one sensor operable to sense at least one condition related to vehicle operation, and a controller communicated with the sensor and the communication device to selectively suppress at least one of said input and said output in response to a sensed parameter of said at least one condition being outside of a threshold. When an input is suppressed, the driver is prevented from accessing or inputting information into the communication device. When an output is suppressed, communication between the device and the driver of a vehicle is suppressed to, among other things, avoid distracting the driver during certain driving situations or conditions.

According to one aspect of one embodiment of the present invention, there is provided a safety control system for vehicles including a telephone or other input or output device and one or more sensors for sensing instantaneous driver stimuli and/or a potentially dangerous condition and for automatically disabling or suppressing the telephone or other input or output device when sensing such stimuli and condition. In one form, the sensors include two sensors mounted on a steering member to provide an indication of the presence of the driver's hands on the vehicle steering member, and effective to suspend use of the telephone or other input/output device when the two hands of the driver are not sensed as present on the steering member while the vehicle is in motion. This system is modular, dynamic, interactive, and adaptive to each individualized user. In one implementation, the invention employs a method for automated machine prioritizing to provide assistance to the to driver and optimize the functionality of telematics features accessibility by arranging them according to a user's needs and preferences based on usage frequency of individual features and/or application or as customized individually by the user preferences, skills and events. In another embodiment, sensors on a steering member are used to measure changes in driver physiology. Other methods can be used for sensing driver physiology, e.g. via infrared detection, camera and image/color recognition etc.

Smart Speaker: Incoming calls are routed to a speaker that reflects and bounce sounds of front windshield at driver Look Ahead, Eye Level. Or simulate such action so that a driver focuses or has his/her attention directed toward the windshield just like he would do if he is carrying a conversation with another person.

According to further aspects in the described preferred embodiment, the steering member is a steering wheel, and the sensors include two sensors on opposite sides of the steering wheel located to sense the presence of the driver's hands on the steering wheel. Preferably, the two sensors are located approximately on or between the "two" and "ten" and the "three" and "nine" clock positions of the steering wheel.

It will thus be seen that such a system, requiring both hands to be on the steering wheel in order for the driver to operate the input/output devices, not only requires the vehicle to be equipped with a "hands free" interface for the input/output devices, or a system that can be used as such with an adapter or when docked to the system gateway, but also enforces the use of the "hands free" feature by sensing that the driver actually has both hands placed on the steering member before the input/output devices can be operated accessed or displayed to the driver. Disabling the operation of the device would preferably include not only disabling making outgoing and receiving incoming telephone calls, but also disabling the signal (typically audible tones, vibrations, or visible light) of an incoming call, fax, e-mail, the display of non-urgent vehicle status or warning indicators, since such signals, indicators or displays can distract the driver. Such distractions are problematic at times and conditions wherein operation of the vehicle requires more than usual driver attention and interaction, or when other distractions are already present for the driver.

According to further features in the described preferred embodiment, the vehicle may also include a computer or the driver may also use a portable multi-function telematics device in the vehicle allowing access to the Internet or other network for transmitting and/or receiving faxes or e-mail or browsing the web or accessing a WAN, with the sensors also disabling driver initiated access to such devices when the two hands of the driver are not sensed on the steering member while the vehicle is in motion.

In most cases, the steering member would be a steering wheel as presently included in conventional vehicles. However, in certain applications the steering member could be a joystick, or other type of steering member. In such case, the sensors are placed in areas a driver is recommended or required to grip the steering member to safely control the vehicle.

According to further optional features in the preferred embodiment of the invention described below, the sensors may further include devices for sensing vehicle acceleration, deceleration, merging onto or exiting a freeway, passing, changing lanes, changing gears, depressing the clutch, a reverse-drive condition of the vehicle, the braking of the vehicle, the undue proximity of the vehicle to another vehicle, excessive maneuvering, and/or an unduly high velocity of the vehicle, any one of which conditions, or combination of conditions, may also be effective to disable the operation of the telephone, computer, or other potentially distracting equipment, display or indicator within the vehicle.

According to still further optional features in the preferred embodiment of the invention described below, at least one of the sensors on the steering member also senses a physiological condition of the driver and disables the input/output devices when a predetermined physiological condition is sensed. For example, the physiological conditions sensed could be a predetermined gripping force applied by a hand of the driver while gripping the steering wheel, or a predetermined pulse rate, temperature, blood pressure, blood oxygen level, and/or skin conductivity of the driver. Such physiological conditions may indicate a stress condition of the driver and, when sensed, can lead to disabling or suppressing operation of the input/output devices to avoid aggravating the stressed condition.

The system may also sense a drowsiness condition of the vehicle operator. For example, the system may include a steering direction sensor that actuates a drowsiness alarm when sensing a failure to change the steering direction within a predetermined time, distance interval while accounting for vehicle speed in indicating a possible drowsiness condition in the driver. Additionally, such sensor when monitored with respect to changes over time will indicate jerk reaction, which indicates that the driver was not paying attention and the system will temporarily suspend all telematics to give the driver a chance to recover. Another application for such a sensor is the monitoring of an OFF Zero angle for an extended period of time/distance which can indicate a blind curve or hard curve, and again, here the system will temporarily suspend the telematics and/or input/output devices from interacting with the driver, and vice versa, until normal driving functions are restored.

According to another aspect of the present invention, there is provided a method of avoiding potentially dangerous conditions while operating a vehicle having an input/output device and a steering mechanism including a steering member to be manipulated by the driver, comprising: providing the steering member with two sensors for sensing the presence on the steering member of the two hands of the driver; and disabling the input/output device when the two sensors fail to sense the presence on the steering member of both hands of the driver while the vehicle is in motion.

According to further features in the described preferred embodiment, the input/output devices may also be disabled when the vehicle is traveling in the reverse direction, or is being braked, or is within a predetermined proximity of another vehicle, or is traveling at a high velocity, accelerating, decelerating, merging onto or exiting a freeway, passing, changing lanes, changing gears, depressing the clutch, or a driver is occupied using other accessories in the vehicle or otherwise distracted. Since a high degree of attention of the driver is required under all the foregoing conditions, operation of the vehicle telephone, for example, even the ringing signal of an incoming telephone call, could be highly distracting to the driver and is therefore disabled to avoid the possibility of increasing the risk of an accident.

To assure that the driver and the vehicle as well as on board communication devices as described above are working harmoniously together, one presently preferred embodiment of the system includes the following The Driving Systems, (Man, Machine, Environment, Regulation, and History)
Man: the driver, the passengers, the pedestrians, society;
Machine: the car, the telematics, the infrastructure;
Environment: the driving environment (in the car and outside the car and the infrastructure used)
History: the personal driving experience, the equipment maintenance history
Regulation: the existing laws and common safe driving etiquette into, society and the infrastructure regulation.

All of these elements will be harmonized by the system as it isolates the drivers from non driving related distractions and helps them comply with driving related laws and etiquette via reminders and passive assistance.

driver manual workload assistance by actuating devices connected to the controller directly or indirectly; for example, but not limited to, deploying a sun visor when the driver is about to head into the sun, if the driver as judged by the controller is about to experience sun glare. The Sun location and intensity will be identified from the vehicle map location along with altitude, longitude, latitude, banking, diving or tilting position along with time of day, day of week, day of year and current weather status about visibility, rain, cloudiness, and particulates in the air and similar conditions that may increase or decrease the glare of the sun. or to adjust the rear view mirrors to the correct position as per driver physiology, physical dimensions, posture, mirror size, shape, location inside or outside the vehicle from the Body Line/Center Line, Travel Line or Water Line and the type of vehicle make, model and driving application, so if a driver changed to another vehicle, the basic information about the driver physiology and use them to adjust the vehicle mirrors to optimally match the need of the driver for that car. The system will also consider activating two or more mirrors in concert with each other to achieve a wider viewing angle such as moving the inside and outside rear view mirror to complement each other, especially on the side that is farther from the driver and to some extent on the side of the driver. Mirrors used here are controlled mirrors and can be actuated through control signals from the controller.

Body Line or centerline is a Cartesian line that starts exactly at the front end center of the vehicle and splits the car to right and left. A Travel line also Cartesian line that starts at the front end of the vehicle and travel back through the end of the vehicle. Water line is another Cartesian line that starts at ground level and rises up to the top of the vehicle. Various manufacturers have different names for such dimensional references and some have different starting or ending point, but they are basically the same 3D or XYZ Cartesian coordinates to determine locations of parts and features in a vehicle.

Another way of deploying the mirror to a correct position aside from correct adjustment is by changing the mirror adjustment in real time based by using map data and vehicle location to predicts incomplete rear view, such as when merging on to a freeway as in or when making a turn from at an intersection to a lane heading in the opposite direction to an immediate lane as in FIG. 2 so the controller will move the mirror so the changing blind spot is always covered by one or more rear view mirror.

Yet sometime, even though the mirror is correctly adjusted, a driver may find it necessary to turn his head or lean forward or backward to scan the vicinity of the vehicle before making a lane change. This extra caution from the driver may make the lane changing safer, but it will not help in case of rush hour traffic if the traffic ahead came to a sudden stop of considerable slowdown. In this case, activating the turning signal indicator switch/lever can also act as a blind spot collision avoidance actuator. When a driver actuates the turn signal indicator by moving the turning signal lever in advance of making a turn, the mirror controller will make an automatic sweep to the most outside angle of the vehicle to give the driver full view of other lanes where a driver may be moving into the lane the subject vehicle driver wants to move into. Another version of this solution would be a manual step where subsequent momentary actuation of another function (pull up or push down on the lever or activating another switch preferably mounted on the turn signal lever) will move the corresponding mirror further out to scan the vehicle blind spot, thus the driver can do this on demand in addition to the automatic sweep or as a separate configuration.

Sometime the driver maybe trying to avoid an imminent accident by avoiding an object on the road or a stalled vehicle or a pot hole and take a quick glance at the mirror to see if it is safe to make an emergency maneuver than it is to slam on the brakes. In this case, camera monitoring the direction the driver is looking at will detect the driver looking at the rear view mirror and will perform the automatic sweep at a faster pace, taking into account the speed of the vehicle and proximity to other vehicles, to give the driver quick information about the lanes status to the side of the mirror being observed.

Such use of the camera may not be restricted to rearview mirror actuation and may be used with an electronic display screen that is connected to cameras showing the vehicle in panorama view or showing the forward view, side views and rear view of the vehicle, but the display will stay blank (so as not to distract the driver) until a driver looks to the screen, the camera located on the screen or elsewhere will detect the eyes stare at the screen or at an icon (preferably positioned in the eyes up look ahead view of the driver from driving position) and will give the driver four views or less or more, depending on the type of vehicle and the driving application, and then, it will change views or time-off based on preset time or consequent action by the driver such as activating the turn signal, applying the brakes or pressing on the accelerator to keep up with a certain maneuver that is being attempted by the driver.

Under Certain condition, the controller will not perform the sweep if such sweep will expose the driver to other dangers such as changing the mirror to an angle that will reflect the sun, thus causing the driver to experience strong sun glare. The Sun location and intensity will be identified from the vehicle map location along with altitude, longitude, latitude, banking, diving or tilting position along with time of day, day of week, day of year and current weather status about visibility, rain, cloudiness, and particulates in the air and similar conditions that may increase or decrease the glare of the sun.

The same information can also be used to position the driver seat or the adjustable pedals at an optimal position based on their physical dimensions to allow better control of the steering, the pedals and to allow sufficient distance to an airbag in event of an accident.

Such initialization will help train the driver on the correct use of the vehicle by starting him or her off on the right positioning of equipment.

Further features and advantages of at least some of the embodiments or implementations of the invention will be apparent from the description below.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 23 schematically illustrates regular Birdseye view of a map in a navigation system as it appears in a car for a driver.

FIG. 24 schematically illustrates standard 3D view of a map in a navigation system as it appears in a car for a driver.

FIG. 25 schematically illustrates the proposed system view of a map in a navigation system as it appears in a car for a driver.

FIG. 50 shows the main component of the system and the logic flow for controlling the system FIG. 51 shows sensors used as well as feedback system FIG. 52 shows one data report based on vehicle type FIG. 53 schematically illustrates various inputs into the system FIG. 54. schematically illustrates modular cradle FIG. 55. Schematically illustrates one embodiment of a modular portable devices mounting system that does not use suction cup on the windshield.

DETAILED DESCRIPTION OF THE PREFERRED EMBODIMENTS

Figure 1:
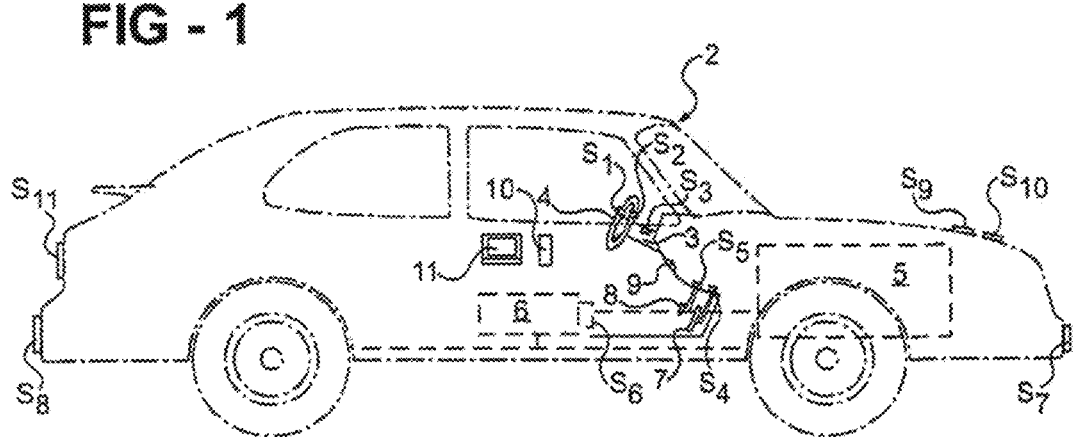
FIG. 1 schematically illustrates one form of a safety control system for vehicles constructed in accordance with the present invention.

FIG. 1 schematically illustrates a vehicle, generally designated 2, equipped with a control system for sensing a variety of risk factors and potentially dangerous conditions and for automatically executing various responses when sensing such conditions in order to avoid hazardous situations tending to increase the possibility of an accident. One response is the disabling or suppression of one or more input or output devices to avoid interaction between the devices and the driver in certain situations and conditions. Another response includes providing a signal to or requiring the driver to take some action to increase driver alertness and/or awareness.

One example of a hazardous situation avoided by the control system illustrated in FIG. 1 is the use of the vehicle telephone in certain situations wherein a making of a telephone call by the vehicle driver, or the receiving of an incoming call, particularly the ringing of such a call, may distract the driver and increase the possibility of an accident when the driver is in a high-risk driving situation. Similar increased risk can result from the driver changing vehicle controls like temperature settings, or interacting (e.g. inputting or receiving output) with other telematics such as e-mail, radio, CD, DVD, navigation system, incoming page or the like. In such cases, the vehicle telephone, other telematics and/or other input/output devices are suppressed and no incoming or outgoing signals are allowed to distract the driver. In case the driver is the party initiating the telematics, a visual indicator and audio feedback can be activated to indicate to the driver that telematics is disabled, supply reason therefore, and even recommend driving modification to enable telematics. Another condition sensed by the system is undue stress in the driver, as indicated by the sensed pulse rate, temperature, blood pressure, skin conductivity (e.g. perspiration), loud voice(s) or stressful sounds in the cabin, such as baby crying, dog barking etc., any combination of one or more of which conditions would also disable incoming telematics. A further condition sensed by the system is the possibility of drowsiness on the part of the driver, in which case an audio alarm would be activated to alert the driver to this condition. Examples without limitation of other alarms to overcome driver drowsiness include vibration in the seat, changing HVAC temperature settings and blower speed to extremes, change of seat position, radio volume or station, CD-track etc. The system will restore operation of the input/output devices when conditions are normalized and will notify driver of all missed activities.

Vehicle 2 illustrated in FIG. 1 is a conventional vehicle including a steering mechanism, generally designated 3, having a steering wheel 4, a propulsion device such as a motor or engine 5 for driving the vehicle via a transmission or other torque converting means schematically indicated 6, an acceleration pedal 7, and a braking pedal 8 for controlling the vehicle. Vehicle 2 further includes one or more visual indicator and audio alarms 9, e.g. mounted within the forward-look ahead viewing or hearing by the driver.

FIG. 1 further schematically illustrates a cellular telephone 10 within the vehicle, and a computer 11 or other multifunction telematic device allowing access to the Internet for transmitting and/or receiving faxes or e-mail, WAN and Web access, or other input/output device. Other input/output devices include vehicle fault/warning lights (battery, temperature, washer fluid, etc.) or other signal or alarm (open door, low fuel level, seat belt monitor, etc.). Vehicle 2 illustrated in FIG. 1 may also include many other components conventionally provided on vehicles at the present time or to be provided in the future.

The safety control system included in vehicle 2 illustrated in FIG. 1 includes a plurality of sensors for sensing various conditions with respect to the vehicle driver, the vehicle itself and/or the environment. These signals are collected via direct tapping to existing or added sensors or via vehicle bus and user specified values. These include sensors S1 and S2 applied to the steering wheel 4 of the vehicle; sensor S3 applied to the steering mechanism 3 of the vehicle to sense changes in the steering direction and/or actuation of the turning indicator. The turning signal indicator switch/lever can also act as a blind spot collision avoidance actuator. When a driver actuates the turn signal indicator by moving the turning signal lever in advance of making a turn, subsequent momentary pull up or momentary push down on the lever will move the corresponding mirror further out to scan the vehicle blind spot.

Other sensors may include sensor S4 sensing the condition of the gas pedal 7 and/or vehicle speed or acceleration; sensor S5 sensing the condition of the braking pedal 8; and sensor S6 sensing the condition of the transmission or other type torque converter 6.

Also schematically illustrated in FIG. 1 are sensors S7 and S8 carried to sense the proximity of the vehicle with respect to another vehicle; sensor S9 sensing darkness or alternatively sensing the activation of the headlight; and sensor S10 sensing weather conditions rain, sleet, snow, ice, temperature and/or sensing the activation of the front or rear wipers or headlight wipers.

As will be described more particularly below, the foregoing sensors (or signals) are generally effective only when the vehicle is moving to sense their respective conditions and to execute certain control functions in order to decrease the possibility of an accident. One important control function is to disable an incoming call from ringing the telephone 10, and the computer or other telematics portable or built in 11 from accessing the Internet or announcing incoming signals, e.g. page, e-mail etc., and to indicate same by actuating a visual indicator and an audio feedback if a driver attempts to initiate telematics during an unsafe or a high risk condition, and may direct a driver to alternative driving habit to gain access to telematics. The system may also suppress delivery of unnecessary external signals such as certain vehicle warning lights or alarms, the system will restore function of the input/output devices when conditions are normalized and will notify driver of all missed activities. In some cases, such as where a drowsiness condition is sensed, an audio alarm 9 is actuated. Other possible alarms to overcome driver drowsiness would include vibration in the seat, changing HVAC temperature settings and blower speed to extremes, etc.

Figure 2:
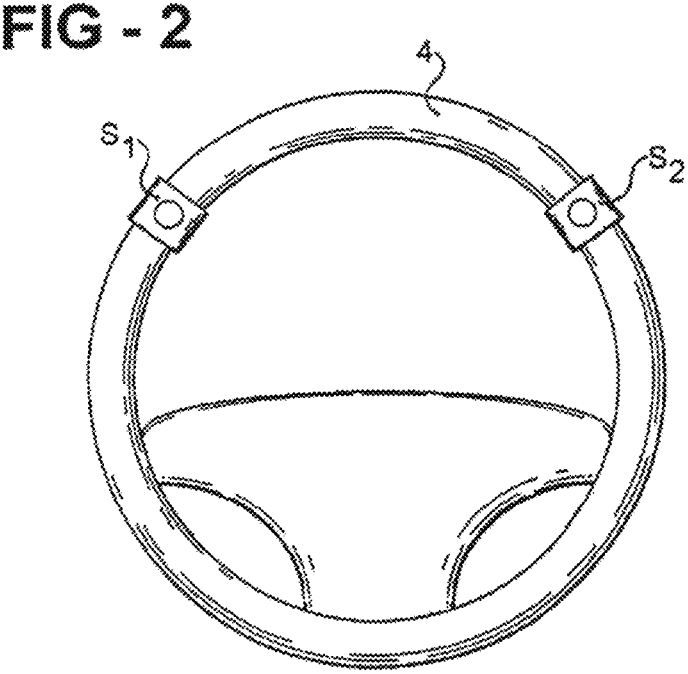
FIG. 2 is an enlarged view illustrating the steering wheel in the vehicle of FIG. 1 and the sensors mounted thereon.

FIG. 2 more particularly illustrates the sensors S1, S2 mounted on the steering wheel 4. As shown in FIG. 2, the two sensors are mounted on or between the "two" and "ten" and the "three" and "nine" clock positions of the steering wheel 4; the "two" and "ten" positions are considered to be the most preferred ones for the two hands of the driver in order to manipulate the steering wheel, but other positions could be employed, such as "nine and fifteen", which provide more clearance for activated airbags. The two sensors S1, S2 thus sense the proper positioning of the two hands of the driver on the steering wheel 4.

The two sensors S1, S2, which may be attached to or embedded in the steering wheel, may be simple electrical switches that are actuated by the respective hand of the driver when properly placed on the steering wheel.

Preferably, however, one or both of the sensors S1, S2 or other sensors are also capable of sensing a physiological condition of the driver, such as the gripping force applied by the driver's hand, or the pulse rate, blood pressure, blood oxygen level, temperature and/or electrical skin conductivity of the driver's hand while gripping the steering wheel. For example, sensor S1 could include a transducer for converting pressure to an electrical signal, such as a spring-type, carbon-type transducer, optical type or semiconductor type. Sensor S2 could include one or more transducers, such as known in finger probes, for sensing pulse rate, temperature, and/or electrical skin conductivity, and for outputting an electrical signal corresponding to the magnitude of the sensed condition, as described for example in U.S. Pat. Nos. 6,319,205; 5,438,986; 5,065,749; 4,860,759; 6,415,176 or 5,897,505, the contents of which are incorporated herein by reference.

As will be described more particularly below, sensors S1 and S2 thus sense that both driver's hands are present on both sides of the steering wheel 4 to enable operation of the telephone 10 and the computer 11 or similar multi-function or standalone telematics or other devices. Thus, the telephone 10 can be permitting "hands free operation" or a telephone/telematics system that can be used as such with an adapter or when docked to the system gateway, as required by-many laws to avoid accidents, but also the driver is permitted to use the telephone only in a "hands free" manner, thereby precluding the driver from gripping a telephone to operate it even though the telephone or the telematics system may have a "hands free" capability. While the presently preferred implementation requires actuation of both sensors S1 and S2, the system could be modified to permit use with only one sensor. This will permit use by drivers having only one hand. Requiring presence of at least one hand on the steering member 3 reduces the likelihood of unintended system activation such as may occur, for example, with voice activated systems that can be activated by any sound within a given range or frequency.

In addition, by providing sensor S1 and/or sensor S2 with the capability of sensing a physiological condition of the driver while gripping the steering wheel, other conditions can be sensed to disable the telephone for further reducing the possibility of an accident. For example, the gripping force applied by one or both hands of the driver may indicate a stress condition of the driver. A stressed condition may be also indicated by the sensed pulse rate, temperature and/or electrical skin conductivity (the latter indicating perspiration) of the driver. If a stress condition is sensed, the telephone 10 is disabled so as to decrease the possibility that the ringing noise of an incoming telephone call will so distract the stressed driver as to create a hazardous condition, or that the making of an outgoing call by the driver will be so distracting to the stressed driver as to create a hazardous condition. Whereas as a matter of standard all alarms are designed to attract attention, e.g. buzzers, ringers, flashing lights, etc., all of these alarms are muted by the gateway and the gateway will communicate all alarms and notification to the driver via driver selected method, e.g. visual, audio or both.

The provision of a grip sensor on the steering wheel also enables the system to sense drowsiness or dozing of the driver, as in U.S. Pat. No. 4,485,375, incorporated herein by reference. Thus, if the gripping force sensed by sensor S1 and/or sensor S2 drops while the vehicle is in motion, this could indicate a drowsiness condition. If such a condition is sensed, the audio alarm 9, which may be a separate alarm or a radio volume control or hvac blower and temperature control, or alternatively a vibrator, may be activated, together with a visual indicator in an attempt to arouse the driver and to alert the driver to the drowsiness condition. When drowsiness is sensed, the telephone 10 would not be disabled since the ringing of an incoming call may be further effective to arouse the driver. Other alarms to overcome driver drowsiness would include vibration in the seat, changing HVAC temperature settings and/or blower speed to extremes, etc.

The sensors S1 and S2 are preferably located at the ten o'clock and two o'clock positions but may be alternatively located in other positions such as the nine o'clock and three o'clock positions. The mechanisms of the switch include, by way of examples without limitation, mechanical, optical or resistive sensors or switches, a jog dial or switch (e.g. of the type that can be rotated to scroll amongst choices and depressed to select a choice), slide switch and a rocker switch. The sensors can be arranged to be actuated either in the thumbs-up position or the thumbs-down position. The sensors are tested for integrity by the microprocessor 20 during start up and are designed to reduce the likelihood of accidental activation. Preferably, the integrity check determines if the switches can be activated and deactivated to ensure that the switches are not stuck in one state. The switches may become stuck unintentionally, or may be purposefully placed in the activated state to override the safety switches and permit actuation of the control system without having one or both hands present on the steering member. The detection of failed switches will cause the microprocessor to block operation of the system. Hence, the integrity check prevents a user from effectively overriding the safety switches to ensure that use of the control system occurs only when the drivers hand or hands are present on the steering member 3.

Sensor S3 is coupled to the steering mechanism 3 so as to sense changes in the steering direction. For example, an alert driver constantly makes minor changes in the steering direction automatically, but not so with respect to a drowsy or dozing driver. Accordingly, if sensor S3 fails to sense a change in the steering direction within a predetermined time interval, this would indicate a possible drowsiness condition in the driver, and therefore the audio alarm 9 would be activated in an attempt to arouse the driver and alert him to that condition.

Sensor S4 senses the depression of the gas pedal 7, and/or vehicle speed or acceleration sensor S5 senses the depression of the brake pedal 8, and sensor S6 senses the condition of the transmission 6 and/or also the velocity of the vehicle. For example, if the transmission is in reverse gear, the driver should not be distracted by receiving or making a telephone call, or by other devices or signals and therefore these things should be disabled. If desired, the same could apply in any gear other than the normal drive gear. Also, if the vehicle is moving at a relatively high velocity, is rapidly accelerating a decelerating, is engaged in turning or otherwise rapidly maneuvering, such that any unnecessary distraction of the driver should be avoided, the devices and signals could likewise be disabled.

Sensor S7 mounted at the front of the vehicle senses its proximity to a vehicle ahead of it; sensor S8 mounted at the rear of the vehicle senses the proximity of a vehicle behind it; sensor S9 senses the darkness level of the road on which the vehicle is traveling (e.g., whether day or night, whether the road is brightly illuminated); sensor S10 senses a rain condition; and sensor S11 senses whether either of the turn indicators of the vehicle is operating to signal for a turn or a change of lanes.

The conditions sensed by sensors S7-S11 are also such that a hazard may be produced if, during the existence of such a condition, the full attention of the driver would be diverted by the ringing of the telephone or by the use of the telephone for making an outgoing call. Accordingly, under such conditions, the telephone 10 is disabled from operation. Similarly, the computer 11, if present, is disabled from operation to preclude access to the Internet for transmitting and/or receiving faxes or e-mail, which could also result in a similar distraction increasing the possibility of causing an accident. And further, other devices, including telematic devices, vehicle signals or alarms, and the like can be suppressed or disabled to avoid or limit distractions to the driver under certain conditions.

Figure 3:
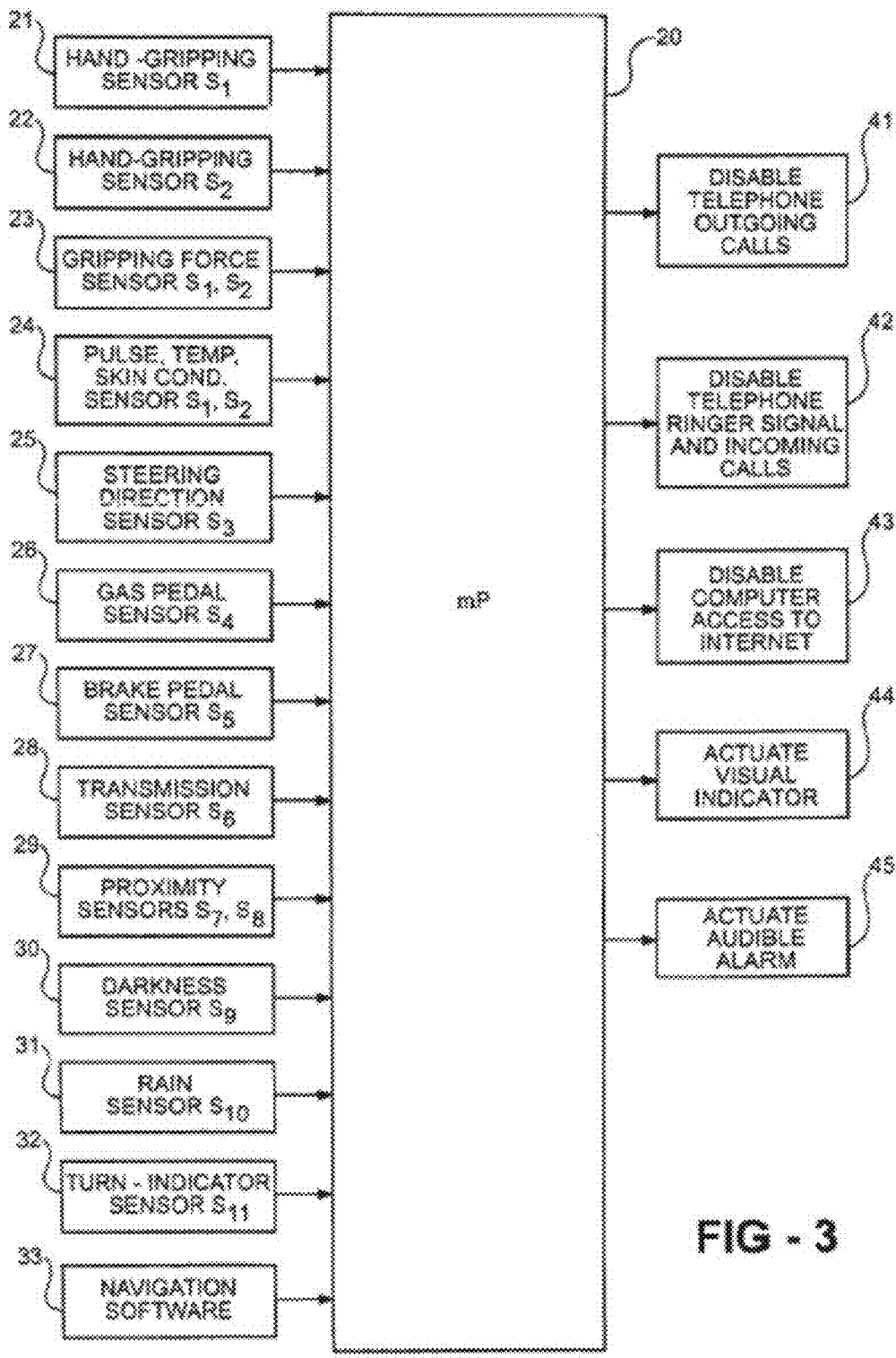
FIG. 3 is a block diagram illustrating the main components in the system of FIG. 1.

FIG. 3 is a block diagram schematically illustrating a microprocessor, generally designated 20, included in the vehicle safety control system of FIG. 1, together with its inputs schematically indicated by blocks 21-33, and the outputs schematically indicated by blocks 41-45.

Thus, as shown in FIG. 3, microprocessor 20 includes inputs 21 and 22 from the steering wheel sensors S1, S2, to indicate whether driver's hands are on the steering wheel. Microprocessor 20 further includes an input 23 indicating the gripping force applied by one or both of the hands to the sensors S1, S2, and an input 24, also from one or both of the sensors S1, S2, indicating the heart pulse rate, skin conductivity, temperature, blood pressure, blood oxygen level, and/or other physiological condition of the driver having a bearing on proneness of the driver to accidents or instantaneous driver stress level or general physical well-being. As indicated earlier, these inputs indicate particularly whether the driver is in a stressed condition, drowsy, or in an alternate embodiment, when an optional breath alcohol sensor is activated. In addition to or in place of the sensors S1 and S2, the physiological conditions can be monitored by other sensors mounted elsewhere in the vehicle including on other locations or the entire surface area of the steering wheel. These sensors may be actuated by direct contact with the driver, or by infrared (for example, to sense increased body temperature and the like), or camera (for example, to sense increased driver agitation, flushed facial appearance, by way of examples without limitation).

Another input into microprocessor 20 is from the steering direction sensor S3, as indicated by block 25. This input is helpful in indicating the alertness of the driver, particularly whether the driver may be in a drowsy or even a dozing state, which would be indicated if this input shows no change in the steering direction within a predetermined period of time. The sensor S3 can also determine rate of change of steering direction, and can provide information used to suppress driver distraction signals when the vehicle is turning sharply, negotiating a long curve that may be blind or of limited sight distance, or during a slalom maneuver.

Another input to the microprocessor would be from a sensor associated with the vehicle cup holder to indicate when a cup which was initially disposed in the holder has been removed, as for drinking. The sensor might include a weight indicator to determine whether the cup was empty when lifted or a temperature sensor to sense heated beverages. This sensor may also sense food on a food tray or elsewhere in the vehicle.

Further inputs into microprocessor 20 include signals from the gas pedal sensor S4 to indicate high acceleration (block 26); the braking pedal sensor S5 to indicate braking (block 27); the transmission sensor S6 to indicate high vehicle speed or reverse drive (block 28); the proximity sensors S7, S8 at the opposite ends of the vehicle to indicate the proximity of the vehicle to other vehicles (block 29); the darkness sensor S9 (block 30); the weather sensor S10 (block 31); and turn-indicator sensors S11 (block 32), and other sensors such as vehicle speed.

FIG. 3 illustrates a further input from navigation software (block 33) with which the vehicle may be equipped in order to assist the driver in navigating the vehicle to various desired locations. For example, the navigation software could be pre-programmed to output a signal to microprocessor 20 at certain locations, such as at heavily-trafficked roads, intersections, bridges, tunnels, etc., where the full concentration of the driver is sufficiently critical to avoid distractions as may be caused by a telephone call or other communication to or initiated from the driver. The system could also provide an alarm to the driver indicating an approaching obstacle or condition that will require the driver's attention, including sharp turns, traffic-jams, intersections, bridges, tunnels, railroad crossings, school zones, traffic lights, construction zones, etc. Such locations could also be programmed by the driver by inputting a place mark when such an obstacle or condition is encountered as a reminder to the driver the next time that obstacle or condition is approaching or encountered. Place marks can be automatically applied by the system when certain threshold conditions are met, for example without limitation, unusual steering or swerving, hard braking or deceleration, and the like. Such place marks can be indicative of "near misses" and may represent areas or locations where the driver needs added caution. Any of the place marks can be incorporated or ignored by the driver as they are made, or at any time thereafter, according to the preferences or profile of the driver. The driver can also set as a preference what criteria the system uses for automatic place marks, or if such place marks are generated at all.

It will be appreciated that other sensors could be provided as inputs into microprocessor 20 wherein similar conditions may occur, either on the part of the driver, the vehicle, and/or the environment, in which, for purposes of safety, external distractions are to be avoided such as may be caused by making or receiving a telephone call, or being alerted by a vehicle signal or alarm, or by any other input/output device.

In the preferred embodiment of the invention, the microprocessor 20, among other functions, acts as a "state machine" to define, arrange and prioritize features and functionalities of the system. In other applications this function can be performed by standalone which interconnects with a microprocessor 20. The state machine aspect of the microprocessor may make telematic control decisions on a variety of criteria such as: (a) the frequency of use of the application, the frequency in which a number, e-mail or URL is contacted; (b) based on safety/urgency priorities, e.g. cruise or CD changer, cell messages or other telematics, or music played on the radio; (c) as preset by the operator; (d) optionally, based on other collected information from the driving system, the microprocessor will initiate calls at predetermined times out of voice mail as, for example, when the driver completes backing out of a driveway and begins a trip. More frequently used applications can be placed higher in the order of applications than others so they can be more quickly and easily accessed, thereby reducing driver involvement in selecting and activating such applications. Further, active applications or most recently used applications can be placed higher in the order of applications so that they can be more quickly and easily accessed. And priority can be given to driving related features or controls over convenience or communication based controls. For example without limitation, if the vehicle cruise control system is active, the first application made available to the driver upon actuation of the control system is preferably the cruise control so that the driver can make any changes to the current cruise control settings, preferably by toggling through and selecting various options/features/settings with the safety switches on the steering wheel. Similarly, if an incoming telematic communication is announced by the system and the system determines it safe to inform driver of such communication, such communication is immediately available for the driver, even if such communication is normally low on the driver priority level.

The user provides signals to the state machine to block features or incoming telematics based on ID, location of phone numbers, e-mail addresses or URL. The blocked or stored telematics will be announced to the driver or stored for use in controlling the system in the future.

The state machine employs an assessment of the incoming calls and places them in categories such as: (a) likely and/or known to cause distraction and accidents; (b) likely but not known to cause distraction and accidents; (c) may cause distraction or accidents; (d) not likely and not known to cause distraction and accidents. These categories will be used to determine the effect of the incoming signals on the telematic system in accordance with the following Table 1:

TABLE 1

Device/Feature assessment.
Copyright © 1982-2002 Applikompt,
Applied Computer Technologies, Inc.

| Categories | Rank | | | |
|---|---|---|---|---|
| Effect | A | B | C | D |
| 1 Likely AND/OR Known to cause distraction AND accidents | X | ? | ? | ? |
| 2 Likely BUT NOT Known to cause distraction AND accidents | ? | X | ? | ? |
| 3 May Cause distraction or accident | ? | ? | X | ? |
| 4 NOT Likely AND NOT Known to cause distraction AND Accident | ? | ? | ? | X |

Application usage Assessment
Copyright © 1987-2002

| 01-clearly separating what's: | 1a-Important for safe driving | Class A |
|---|---|---|
| | 1a.1-Subject Vehicle | Class A-S |
| | 1a.2-Other Vehicles | Class A-O |
| | 1b-Important to drivers | Class B |
| | 1c-"Nice to Have" for drivers | Class C |
| | 1d-"Important/Nice to Have" for passengers | Class D |

TABLE 1-continued

User interface requirement Assessment
Copyright © 1987-2002

| 02- Assuring driver intent | Class A |
|---|---|
| 03: Simplicity | Class A |
| 04: Accessibility | Class A |
| 05: High Availability | Class B |
| 06: Universality | Class B |

Self customization/individualization requirement Assessment

| 07: Portability | Class B |
|---|---|
| 08: adaptive | Class A |
| 09: Privacy | Class B |

Owner requirement Assessment

| 10: cost | Class C |
|---|---|
| 11: Interchangeability | Class A |

Classification A B or C need to be addressed. D can be totally ignored.

The outputs from microprocessor 20 include control signals as shown by the following blocks: block 41, effective to disable the telephone or other telematics from making outgoing calls; block 42, effective to disable the telephone or other telematics from receiving incoming calls and from actuating the ringing signal; block 43, effective to disable the computer, if provided, from accessing the Internet to make or receive e-mail, faxes, etc. or to disable any other signal to be otherwise communicated to the driver; block 44, effective to actuate a visual indicator viewable by the driver; and block 45, effective to actuate an audible alarm.

These blocks are representative of a wide range of outputs that may be utilized. For example, while block 41 is nominally listed as disabling outgoing telephone calls, the system may disable (via output 41 or some other output) all communications or input devices to prevent the driver from inputting or initiating activities or communications from them. In addition to disabling incoming telephone calls, output 42 or some other output can disable the output of any or all input/output devices to prevent communication to the driver of the particular output signals from these devices. Hence, the system may disable or suppress the output alarms or signals of a computer, PDA, pager, navigation system, and vehicle alarms or fault indicators (e.g. low fuel level, low washer fluid level, open door, unfastened seat belt indicators, etc). The outputs 44, 45 nominally set forth as actuating visual or audible alarms, can also be used to actuate one or more mechanisms within the vehicle. For example, without limitation, the outputs 44, 45 or other output(s) may be operable to move one or more rear view mirrors on the vehicle under certain conditions to change the field of view of the mirrors and aid the driver in maneuvering the vehicle, such as during a lane change at vehicle speed.

Outputs 44 and 45 can activate visual and/or audible alarms to draw the driver's attention to desired locations in the vehicle. This may be useful, for example, to draw the driver's attention to the rear-view mirror within the vehicle when a vehicle behind the driver's vehicle is sensed as being too close to the driver's vehicle for the relative speeds of the vehicles. Here, flashing a light or activating some other visible or audible alarm causing the driver to look in the rear-view mirror can aid the driver in avoiding a potential rear-end collision. Similar lights or alarms can be activated on or adjacent to the outside rear-view mirrors to draw the driver's attention to a particular side of the car. In this latter example, activation of a turn-signal indicating the driver is going to turn in one direction or switch lanes in that direction, may cause a visual alarm to be activated if a vehicle is sensed in sufficiently close proximity to the driver's vehicle in the generally intended direction of travel. In this scenario, the outside rear-view mirror may also be moved automatically by the system to change the field of vision the driver has through that mirror and thereby locate any vehicles in the "blind spot" of that mirror prior to its adjustment.

Additionally, the visual, audible, tactile or other alarms may be activated to increase the driver's attention and/or alertness during certain situations. A drowsy driver may be aroused or have his road alertness increased by flashing or otherwise illuminated or activated (e.g. audible or tactile) alarms. One widely available audible alarm includes the vehicle radio wherein the system can change the volume of the radio to arouse a drowsy driver. A driver engaged in a lengthy telephone conversation, or a lengthy internet usage session, or other lengthy communication session, may become overly focused on the communication and less focused on driving. In such situations, at least some people become focused straight forward, and lack awareness of the peripheral environment, exhibiting so-called "tunnel vision." Activating visual or audible alarms can cause the driver to look away from straight ahead and thereby increase the driver's awareness of the surrounding environment. The output signals may interrupt or override conflicting signals (e.g. audible signals may override the radio) unless the conflicting signals are safety related, or doing so is likely to increase driver distraction. The output signals are preferably adjusted automatically to overcome existing environmental conditions. For example, audible output signals may be louder if the noise level detected within the vehicle is high (e.g. wind noise from a window rolled down), and visual signals may be adjusted in intensity to better accommodate night or daytime viewing.

Operation

Figure 4:
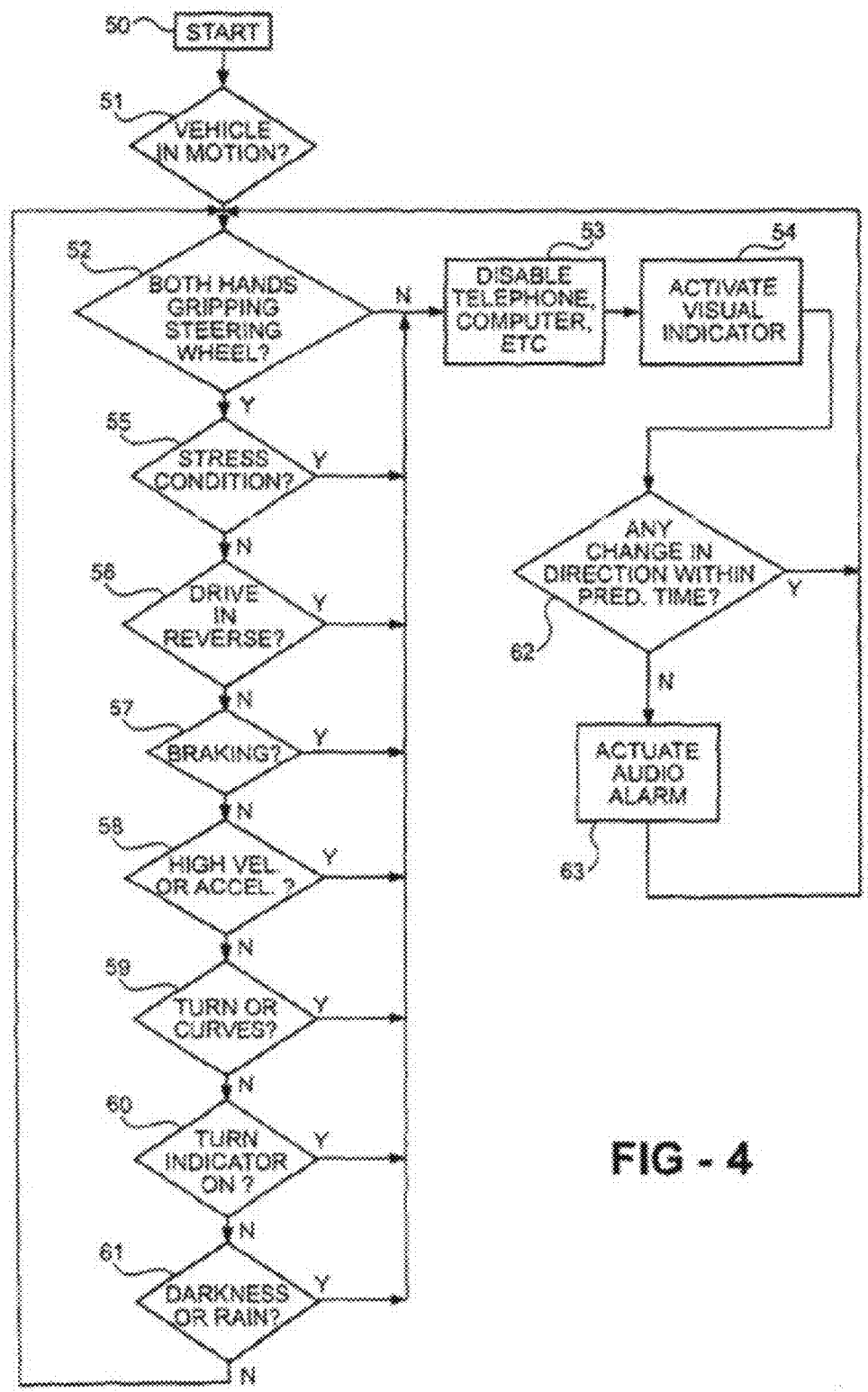
FIG. 4 is a flowchart illustrating the operation of the system of FIG. 1.

FIG. 4 is a flowchart illustrating an example of the operation of the system of FIGS. 1-3.

Thus, as shown in FIG. 4, the control system is made operational when the vehicle is in motion (blocks 50, 51). When the vehicle is in motion, a microprocessor 20 outputs signals 41, 42 and 43 (FIG. 3) disabling the vehicle telephone, computer, etc. within the vehicle (block 53), and also signal 44 actuating a visual indicator within the vehicle to indicate this condition (block 54).

If, on the other hand, both hands of the driver are properly sensed on the steering wheel 4 so as to actuate the two sensors 51, S2, one or both of the sensors is used to sense a physiological condition of the driver that might indicate a stress condition (block 55). For example, such a stress condition could be indicated by an unduly high gripping force applied by one or both of the hands of the driver to the steering wheel, or by an unduly high pulse rate of the driver or skin conductivity of the driver indicating a high degree of perspiration. If such a stress condition is indicated as being present, the telephone, computer, vehicle alarm or signal, etc. are also disabled (block 53), and a visual indicator activated (block 54) to indicate this condition.

Next, the system checks to determine the condition of the vehicle, e.g. whether the vehicle: is traveling in reverse, as indicated by sensor S6 (block 56); is being braked, as indicated by sensor S5 (block 57); is traveling at or over a predetermined high velocity or high acceleration, as indicated by sensor S6 (block 58); is executing a curve or turn, as indicated by steering mechanism sensor S3 (block 59); is about to execute a turn, as indicated by turn indicator sensor S11 (block 60); or is traveling in the dark or in the rain, as indicated by sensor S9 or sensor S10 (block 61). If any of these conditions is sensed, the telephone and the Internet access by the computer are also disabled (block 53), and a visual indicator is actuated to indicate this condition (block 54).

As further shown in FIG. 4, if while the vehicle is in motion no change in steering direction has been sensed within a predetermined time interval (block 62), an audible, visual or other alarm or vibrator is also activated (block 63) to alert the driver to a possible drowsiness or dozing condition. Other alarms to overcome driver drowsiness would include vibration in the seat, changing HVAC temperature settings and/or blower speed to extremes, etc.

If desired, a manual override switch can be provided to enable the driver to manually override any of these controls, preferably except for the control of block 52 assuring that both hands of the driver are properly received on the steering wheel.

Setup Scenario:

Driver set up a portable Telematic device such as a cell phone, blackberry, PDA, etc. with driver preferences:

(1) Control preferences, e.g. Hands always Vs Hands on for Telematics only, and/or both hands required on sensors S1, S2 for duration of telematics usage, or both hands needed to initiate telematics, and only one hand required on one of S1 and S2 to continue use of telematics, (2) Annoyance items: Baby crying, Dog barking, smokers in car etc.

(3) Telematics option: Preferred application to use, preferred priority system etc.

(4) Emergency and identifying information.

(5) A driver enters a vehicle
   a. docks all electronic communication equipment, e.g. pager, cell phone, PDA, etc., to the control system wirelessly or physically, thus identifies him/herself to the vehicle
   b. System mutes all Telematics but keeps them active
   c. Driver initiates his/her trip.

Scenario One (Driver Initiated)

The driver wants to make a call, review pages, read e-mail, connect to the Internet, use navigation system, etc. (1) The driver will activate the safety switches by placing both hands on the designated areas of the steering wheel and then, after the system acknowledges safety switch activation by providing the driver with a beep or voice or visual feedback, the driver with his/her hand on the actuated safety switch will toggle through options with the toggle switch until he gets to a selection that is needed, then using the toggle switch will confirm selection and proceed with the desired action. This could be multiple layers of options and applications, and can be accomplished with one or both of the toggle switches as desired by the driver. The toggle switches preferably can be activated with the thumbs of the driver permitting the hands to remain on the steering wheel. The actuation of the toggle switches can be simplified by a common scheme known as thumb gesture interpretation where a thumbs up (usually indicated by moving a switch upwardly with the thumb or moving the thumb upwardly relative to a switch or sensor) means yes and a thumbs down (usually indicated by moving a switch downwardly with the thumb or moving the thumb downwardly relative to a switch or sensor) means no, such as pushing one or both of the toggle switches upwardly to accept a setting or available option, and pushing one or both toggle switches downwardly to reject a setting or available option. The options can be provided on a HUD or via voice. Even if devices can be activated by voice control, they still need to have the safety switch or switches depressed to ensure driver intention and not an erroneous sound from the radio or a passenger or a malfunction of devices.

During this time the driver's hands must remain at the 10 and 2 position (also called 10:10). The driver must maintain the steering wheel within a specific angle which is calculated based on the following inputs: (1) weather condition, (2) speed of vehicle, (3) proximity of vehicle to others (front/back), feedback from ABS, ESP, traction control, etc. This angle (for example) is about 30 degrees either side of zero if the speed is 40 mph, but it is less when the speed is higher and more when the speed is lower. The driver will also be allowed to temporarily take his hands off the 10:10 position to, for example, make a sharp turn but will have to put them back at 10:10 to continue the previous activity. This amount of time is again dependent on speed, weather, vehicle proximity to others and feedback from ABS, ESP and traction control. In addition to use of a telephone or other telematic device, the switches on the steering member 3 can also be used to control the radio, CD player, cruise control, and environmental settings in the vehicle such as the interior temperature, and blower and heat/AC settings. The switches can be further used to initiate an emergency phone call. In one implementation, an emergency phone call (e.g. dialing 911) can be placed by pushing both toggle buttons in one direction, such as upwardly, and holding them for a period of time. The emergency phone call may activate the phone, or may automatically send by e-mail, voice data or other method information relating to the vehicle position, any airbag deployment, fire or smoke in the vehicle, number of passengers, presence of dogs or other notable things, recent vehicle operational characteristics, and the like. A call to another phone number can be placed by pressing both toggle switches in the other direction and holding them for a desired time.

Scenario Two (Incoming)

Incoming information will be customized by the driver, in accordance with Table A, to select what he/she wants to receive and in what priority. Once incoming information is detected by the system, the system will go through a checklist to verify feedback from steering about position and about speed and ABS and ESP and traction control and weather condition. When all conditions are met, the system will announce the incoming information to the driver who will have to press the safety control switch and accept the communication by holding the toggle buttons momentarily up. While using the toggle switch to accept the incoming information, the remainder of the controls will be as per outgoing, including hands at 10:10.

It will thus be seen that the illustrated system is effective to disable the operation of the telephone, telematic, or other input/output device (and/or access to the Internet by a computer) within the vehicle when any of the above-described conditions is sensed, to thereby avoid a distraction which may cause accidents. The fact that both hands of the driver must be present on the steering wheel in order to enable the operation of the telephone (and/or computer, telematic or other devices) not only requires that the vehicle must be equipped with a "hands free" capability, but that the driver must actually use this "hands free" capability created by the system gateway in order to make or receive telephone calls or other telematics activities. In addition, other sensors could also be provided to disable a vehicle telephone or a multi-function telematics system or Internet access provided by a vehicle computer in response to other conditions, such as the detection within the vehicle of the sounds of an emergency siren in an approaching vehicle, a child crying within the vehicle, the driver handling of a drink or food item from a monitored cup holder or a monitored food tray, or the activities such as modifying the cabin temperature, changing the volume on the radio, extending the sun visor etc.

The monitoring of all such signals, sensors, data and conditions is done by a modular dynamic plug and play state machine that integrates, prioritizes, enables, blocks or mutes telematics application and telematics functionalities based on priorities determined by learning frequency and characteristics of use or by driver preset preferences.

Such machine may be a hardware based, a software embedded in a dedicated hardware or a software/protocol embedded in one or more telematic equipment and it may act as a node on a network of telematic equipment and the vehicle bus, or as a hub for all telematics and a gateway to the vehicle, or any combination of the above.

The state machine can allow driver to set their preferences on a portable telematics device such as a cellular phone, or a WAN, Web site or via a FTP and e-mail. Such set up can be transferred to the vehicle in use when the driver docks the cell phone or other portable telematics devices to the system gateway. The downloaded profile will be updated with driving skills, driver habits and geographical/time/date based notes added by the driver while driving. The updated profile will be uploaded back to the source when the vehicle comes to a final stop, or ongoing as driving is being carried out. Such data may be direct values and status or a statistical representation of a driving experience. Therefore, the driver profile, preferences, history and other relevant data can be transferred to other vehicles by subsequent use of the source within another vehicle. In this manner, the driver's information can be coupled with data particular to the subsequently used vehicle to create another matrix of condition and factor parameters monitored and controlled in use of the vehicle. The information may be stored in any suitable form on any suitable device including on a telematic device (e.g. telephone, PDA, computer, and the like), on a disc, CD, magnetic drive or the like, on a portable digital storage device like those used with digital devices (e.g. compactflash cards, memory sticks, flash drives and the like). The information may also be transmitted to another source, for example, to an internet web space from where it can be later accessed and used as needed. Vehicle data or information may also be stored either on or in the same source as the driver information, or separately. The vehicle data may stay within the vehicle, or may be transmitted to another location. For example, certain vehicle data may be sent to the vehicle manufacturer or other source to provide information on the performance of the vehicle, consumer use habits, service history, and the like. It should be easy to control access to information stored or generated by the system without the need for a second party. Also, no real time data access is possible to second party without explicit/implicit authorization or high level of sophisticated technology. This protects a drivers profile and other information, including at least the emergency contact information and the like.

The preferences included by the driver will range from telematics management options, e.g. preset priorities or automatic based on learning by frequency of use, tags of time, location and physiology. Preset priorities will allow a driver to assign sequence of access to telematics and telematics functionalities or to block certain activities based on time of day or source of telematics or geography at will. Automatic based learning condition, on the other hand, for example, if the driver physiology shows stress during a telephone conversation with a certain number, such number will be tagged and will be treated as a source of high risk and will be blocked during unusually risky conditions so a driver does not engage in additional cognitive hungry activities. Additionally, if a driver uses telematics device A more often the C which is used more often then B, the access to such devices will be based on the mostly used first. In this case, A is followed by C and C is followed by B. Similar frequency based access priorities are applied to function of such telematics and also prioritized based on time, geography etc.

Other preferences set by the driver can include emergency contacts, medical record summary or identification, etc. to be used along with telemetry data when automatically reporting an accident via text to speech and via e-mail. This will help emergency dispatch understand and prepare the correct type of help needed, e.g. number of passengers, fire in cabin, impact speed, driver physiology and the driving telemetry before and during the impact. The trigger for an accident occurred reporting is preferably by one or more of the following signals: Distance and/or time from speed to zero is smaller than expected (taking into account weather, service monitor, vehicle capabilities, etc.), G-force too high for normal maneuvers, staling after hard breaking, airbag deployment, rollover indication, fire/smoke detected in vehicle.

The decisions to block, enable etc are accomplished by algorithms that share the hosts of signals provided to monitor for specific conditions that are encountered. These algorithms also update the driver profile to include skills and habits for further relaxing or restricting telematics. For example, a driver that drives frequently on expressways and in close proximity to other vehicles will be allowed more leeway then a person that hardly drives on the expressway. Similar monitoring occurs for nighttime driving, adverse weather driving and so on.

Figure 5:
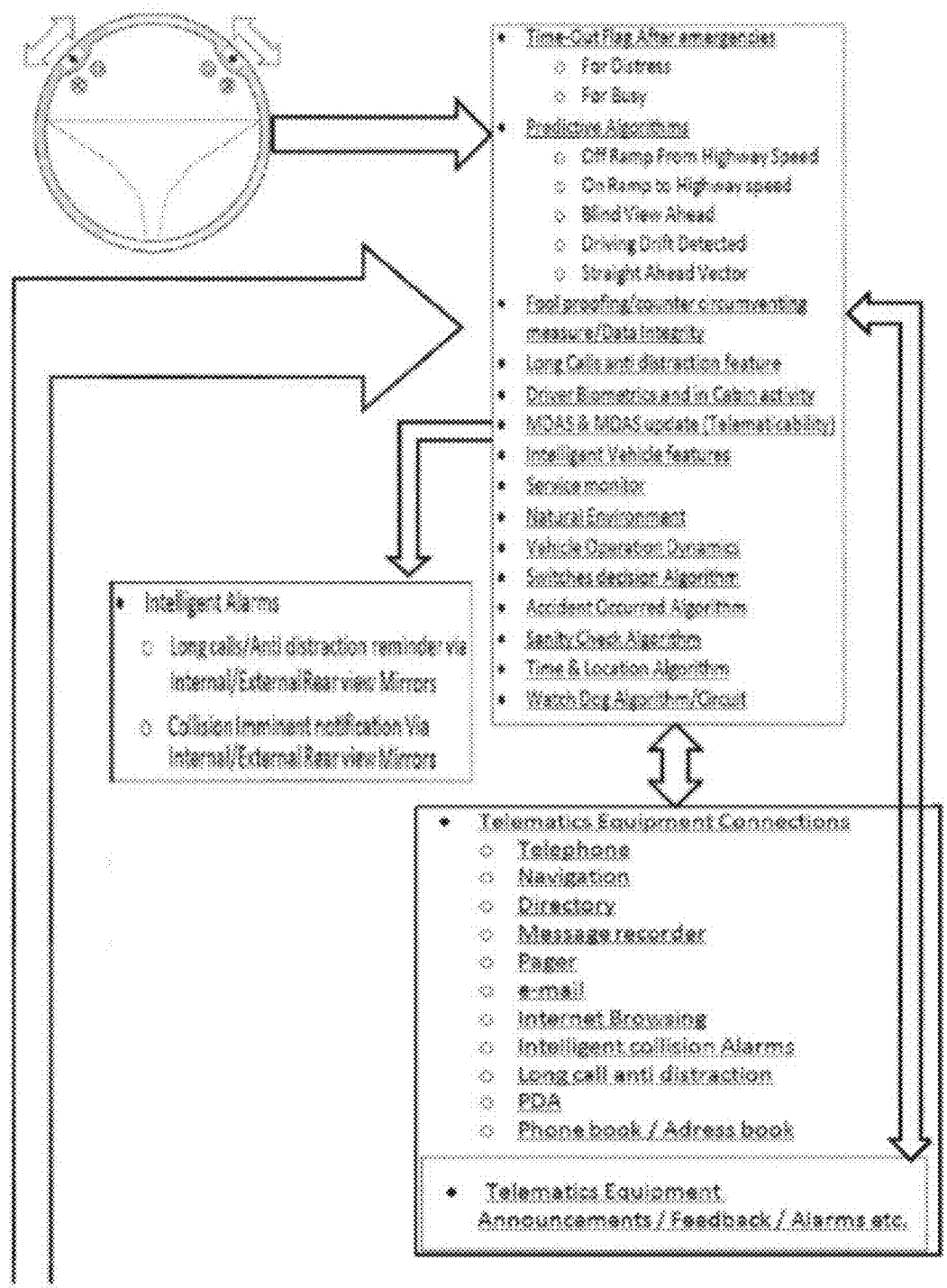
FIG. 5A is a block diagram illustrating non inclusive the nature and the flow of signals and algorithms used in one presently preferred embodiment of the system of the present invention. It shows a suggested controls for driver input on the steering wheel along with non-inclusive lists of algorithms, equipment interfaced with the system and output signals generated by the system.
FIG. 5B is a block diagram illustrating the nature and the flow of signals and algorithms used in one presently preferred embodiment of the system of the present invention. It includes non-inclusive list of signals used by the system to detect danger and present a control signal to the docked equipment and an alarm/verbal signal to the driver.
Figure 6:
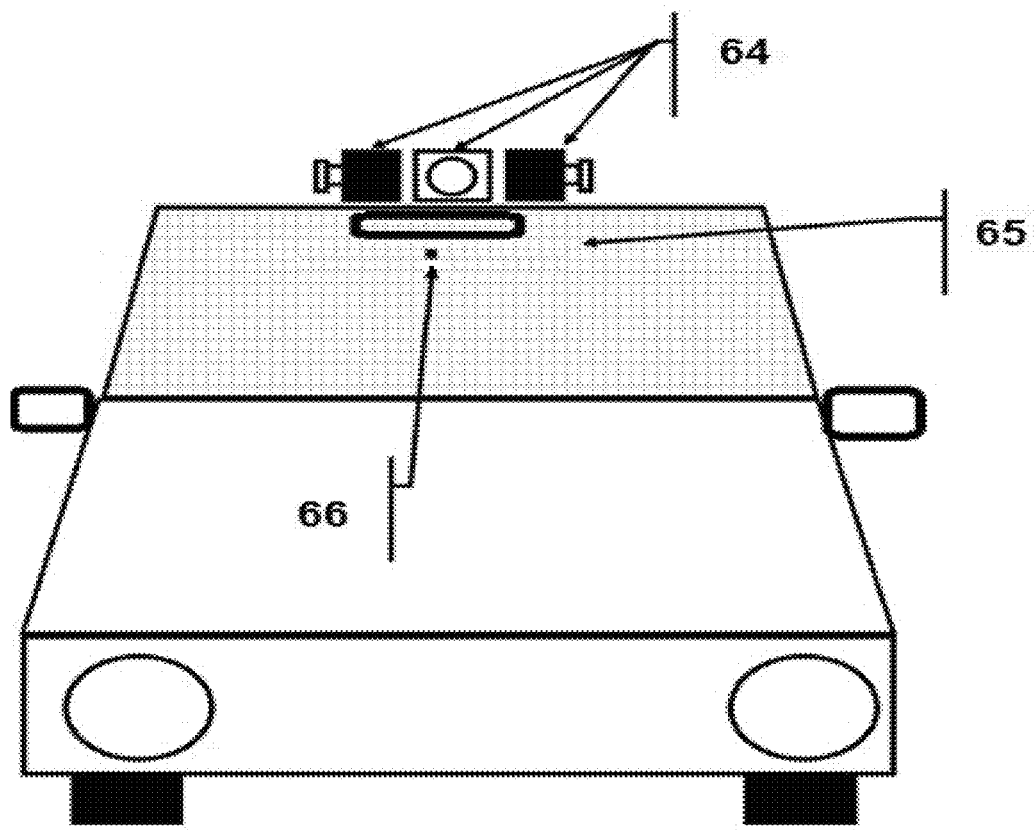
FIG. 6 schematically illustrates one Front view of a vehicle form of a safety control system for vehicles constructed in accordance with the invention selective blocking of individual areas of a windshield to avoid glare due to sun rays or other sources of light FIG. 7 Shows Side view of the board showing the construction, back panel, tubes, cartridges in tubes and front clear shield FIG. 8 Shows structure of ECD in off-state, Structure of ECD in on-state.
Figure 7:
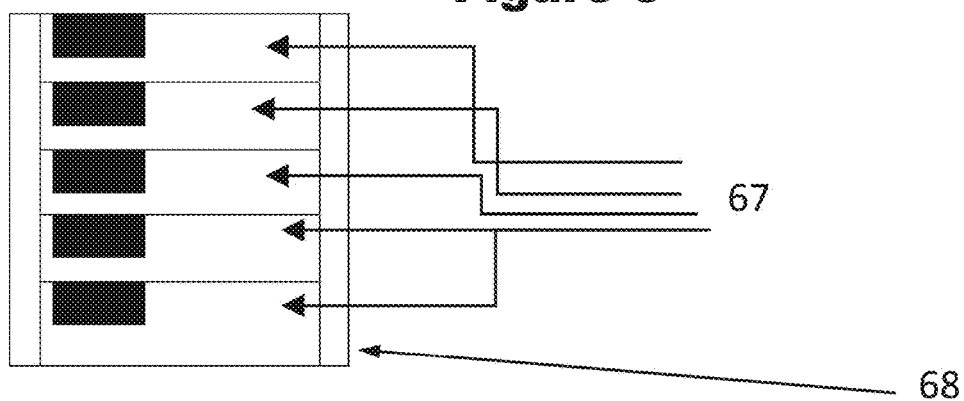
Figure 8:
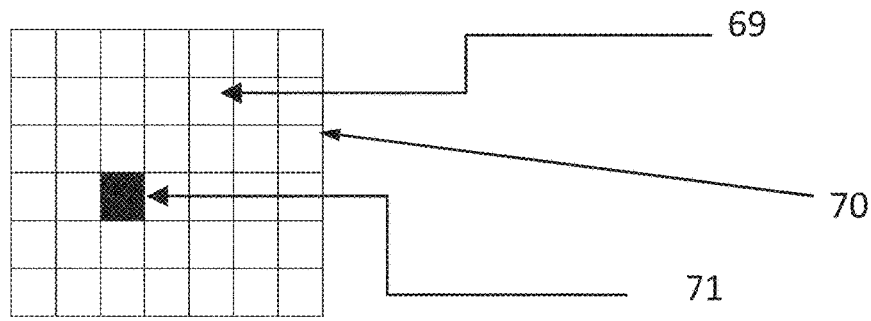

In one preferred implementation, as shown in FIG. 5, the system monitors and analyzes a plurality of factors that can affect the safe travel of the vehicle, either alone or in combination with one or more other factors. Such factors relate generally to the vehicle, the driver, and the environment. The driver has various communication factors, physiological factors, and preferences/habits, skills and historical factors. The vehicle has instantaneous operational factors, and base and historical factors both associated and independent of a driver. The environment includes the interior vehicle environment, the exterior environment, geographic location, and regulatory factors.

Representative examples of driver communications factors include signals and information communicated to the driver such as vehicle warning indicators like low windshield washer fluid, low battery voltage, engine temperature, oil pressure, seat belt usage monitors, and the like. And further examples include input and output features of various devices communicated with the driver such as telephones, pagers, PDA's, computers, fax machines, GPS devices, navigation systems and displays, radios, CD players, CB's, video monitors, and other telematic or informational devices. These devices can be termed communications devices since they permit or provide one-way or two-way communication with a driver of some information or signal. The devices can also be considered input/output devices since some permit or accept driver input and some permit or provide output to the driver. The term input/output devices is not intended to limit application to only devices having both an input and an output, any device permitting or providing either an input or an output, or both, may be used.

Representative examples of driver physiological factors have already been set forth, and include skin conductivity, pulse rate, blood pressure, blood oxygen level, grip pressure, alcohol sensed on driver's breath body temperature and the like. Other examples of driver physiological factors include driver seat position, seat belt usage, seat belt position (used in part to determine if driver is fully seated or leaning forward, etc), and driver position within the seat, driver seat reclining position and the steering member position such as tilt/telescoping adjustment. Drivers also have base and/or historical factors such as driver experience indicators (e.g. normal driving patterns, preferences, skill level, relevant training and safety record), Representative examples of factors relating to the vehicle and its operation include whether the vehicle is in reverse, in park, accelerating, decelerating, traveling at high speed, negotiating a turn, swerving, making an extended length turn, turning at relatively high velocity, traveling without direction correction (one possible indication of a drowsy driver as noted previously), whether there is fire or smoke in the vehicle, and whether the engine has stalled (as may be indicated by movement of the vehicle without continuing engine operation), tire pressure, whether the vehicle has rolled-over or been inverted, is climbing or descending a hill, if the airbags have deployed, and if the ABS, traction control, or stability systems have been activated. Base or historical vehicle factors include whether the vehicle has driver assistance systems like ABS, adaptive cruise control, traction control, ESP/stability or other electronic steering assist, four-wheel drive, all-wheel drive and the like, as well as historical data indicative of service condition, tire wear, brake wear, and habits/skills of the driver within said vehicle, driving application (e.g. recognizing difference in usage between a family sedan and a police cruiser), minimum braking distance, maintenance history.

Representative examples of environmental factors include exterior conditions such as weather (rain, snow, bright sunshine, etc), time of day (e.g. night or day), road conditions (e.g. wet, icy, etc), proximity to other vehicles, proximity to known obstacles, and the like. Further representative examples of environmental factors preferably also include interior conditions such as loud noises like a crying baby or barking dog, and the presence of cigarette smoke in the vehicle which can be an irritant to at least some drivers.

Representative examples of regulatory factors include speed limits, traffic signals, and specified rules for certain roads and the like.

The factors are monitored and compared to set or determined thresholds to determine the level of driver attention required to safely control the vehicle. The system controls all machine to man communications (e.g. phone, vehicle alarms/indicators, computer, PDA, etc) to and from the driver as a function of the monitored factors that provide an indication of the level of attention required by the driver to safely operate and control the vehicle. Conditions and factors that require a higher level of driver attention cause the system to permit less or no communication to and from the driver. This reduces driver distraction and frees the driver's senses so that they may be employed to ensure safe vehicle operation. The factors and conditions are assessed, rated and/or compared to threshold values. A single factor over a threshold value may be sufficient to cause the system to restrict, suppress or disable communications to and from the driver. Also, several factors, even if no single factor is over its threshold value, can cause the system to restrict communications to and from the driver. In other words, the relative severity of a combination of individual conditions encountered by the driver can cause an aggregate value over a threshold wherein further driver distraction is not desirable, so the system prevents communications to and from the driver in such situations. For example, the presence of water on the driving surface may not by itself be enough to cause the computer to restrict communications to and from the driver, but wet roads in combination with another condition like unusual driver physiological symptoms indicating increased driver stress, may be enough to cause the system to restrict or prevent communications with the driver. In this manner, the factors and conditions signals can be considered to be rated or valued with the ratings and values weighted and combined, or otherwise statistically rendered to provide an overall assessment of the driving conditions. Further, certain of the factors can be made dependent on other factors. For example, without limitation, the presence of water or ice on the road may be used to alter the threshold value or level relating to proximity to other vehicles since an increased stopping distance may be required when driving in such road conditions. Such diminished road conditions can also lower the acceptable speed or acceleration parameters.

Certain of the thresholds may be set or predetermined prior to installation of the system, and other thresholds may be learned or determined through use of the system in accordance with driver experience, history, preferences, as well as vehicle features, information and history. For example, one vehicle may be able to stop faster than another, so the threshold for the proximity to other vehicles can be different between the vehicles as the one vehicle can travel closer to other vehicles and safely stop in an emergency. Likewise, a driver that frequently travels on expressways at relatively high speeds in relatively close proximity to other vehicles may be permitted more leeway for communications in such conditions than a driver that rarely or never travels in that manner. Likewise, a driver that frequents a certain geographic region may be given more leeway for communications in that region than a driver outside of his normal driving region since that driver may be distracted trying to navigate in unknown regions. Likewise, drivers in vehicles with ABS, or other advanced safety features may be permitted greater leeway in communications that drivers in vehicles without such features in situations and conditions where these features improve the vehicle response and safety. Accordingly, the thresholds for individual driving factors and conditions, or combinations of factors and conditions, can be customized based on the driver and the vehicle. If desired, the driver profile can be continually updated based on feedback obtained as to the driver's driving habits, and such profile updates can be made based on real-time data, or statistical analysis.

Additionally, the various communications or inputs/outputs to and from the devices in the vehicle may detract differently from the driver's attention and ability to safely control the vehicle. Making a phone call may involve searching a database of names and phone numbers, dialing numbers, using voice activation or other tasks, and may be more driver intensive than answering a phone call of being alerted of a vehicle fault (like low washer fluid, low fuel level, etc). The level of driver involvement and/or potential distraction from the various communications devices, both when initiated by the driver and when communicated to the driver (where appropriate), is another factor that can be assessed to determine the level and timing of any restriction of the driver communications. So under at least some conditions certain communications to and from the driver may be restricted or suppressed while others are permitted.

When the assessed risk to the driver and other vehicles and things, is borderline (i.e. higher than normal risk, but not severe), the system may provide recommendations to the driver as to how to overcome any communications restriction, if doing so will not cause undue driver distraction. For example, without limitation, if the vehicle is traveling too fast to safely receive an incoming or make an outgoing telephone call, the system may inform the driver (either audibly or visually) to slow down to enable the telephone. Hence, the driver is permitted access to the communications if corrective action is taken (avoiding swerving, slowing down, driving within speed limit, increasing distance between adjacent vehicles, etc). Similarly, a time-delay may be initiated after certain conditions are sensed, like unusually rapid braking, or swerving, or the like to prevent immediate inputs to or outputs from the device as soon as the vehicle and driver factors are within allowable limits. This time-delay permits the driver to regain composure and assess the current situation prior to use of or interruption from the various input/output devices.

The system preferably permits significant customization by the driver. The driver can preferably select the type of feedback provided by the system (audible, visual, tactile, etc), and when the feedback is provided (e.g. not during telephone calls, etc). The driver can also preferably customize the voice used in any voice feedback, or the tones, tactile response, or visual display, if any. This customization helps to reduce distraction or annoyance caused to the driver by the system feedback, and thereby helps to maintain driver concentration and awareness of the vehicle and the environment.

The system preferably also provides a cross-check of at least some sensed conditions, such as vehicle operational conditions, to ensure that individually but related conditions are in agreement. For example, the system may compare sensed RPM or engine rotational speed with the throttle or velocity sensor and transmission sensor to ensure the sensed vehicle operating characteristics are all in agreement. If they are not, it could indicate a vehicle fault (e.g. slippage of the transmission or the tires on the road) and the system applies a more stringent restriction of the input/output devices as appropriate. The control system can be disabled by the user, but preferably, to do so requires the user to activate some signal viewable by others that indicates the vehicle is operating out of normal constraints. One readily available mechanism that satisfies the above is the emergency or hazard lights provided on most vehicles and operable to cause several exterior lights to repeatedly flash indicating vehicle distress. Accordingly, in some implementations, the control system may be overridden by activating the vehicle emergency lights.

The system preferably includes a learning mode wherein certain routine or unusual events, conditions, locations, phone numbers and the like are stored for later access. In the learning mode the microprocessor or other controller may accept an input from a driver to store an address of a particular location, or may inquire if the driver wants the address stored wherein the driver may respond no or yes by activating the toggle switches on the steering member. The address can be stored as a function of its geographic location (latitude/longitude) for later access to, for example, facilitate finding that location at a later date, perhaps with the assistance of a navigation system. The learning mode could also be used to call out other features the driver may want to be reminded or warned of in the future, such as school zones, railroad crossings, changing speed limits, etc. The system could prompt or notify the driver when the vehicle is approaching such stored features as a function of the vehicle heading and geographic location. The learning mode provides increased customization ability to the driver, and can help build the driver's profile/driving habits and characteristics. The learning mode can be activated and deactivated by the driver, and may be preset for automatic use upon initial use of the system and for a certain time thereafter, subject to the ability of the driver to manually override such setting.

The system preferably also has a training mode wherein the system provides increased assistance to a driver to familiarize the driver with usage and various characteristics and features of the system. In training mode, the system may assist driver selection of applications by instructing or notifying the driver of the manner by which applications can be selected, as well as choices within an application. Training mode may also provide increased feedback of the reasons for suppression of any input/output device, and perhaps, ways to avoid such suppression (reduce vehicle speed, avoid harsh accelerations, etc). The training mode can be activated and deactivated by the driver, and may be preset for automatic use upon initial use of the system and for a certain time thereafter, subject to the ability of the driver to manually override such setting.

Predictive algorithms can be used to determine certain driving conditions based on driver habits and history, as well as data from research, or other drivers and the like. For example, the vehicle may perform certain maneuvers prior to exiting from a freeway to an off-ramp, or entering a freeway from an on-ramp. The vehicle may decelerate and gradually turn onto an off-ramp, and then further decelerate and negotiate a sharp turn on the off-ramp, or preform some other maneuvers from which the system can predict that the driver is exiting a freeway. From this prediction, the system may increase the restriction of telematics or other communications with the driver. Similar predictive behaviors or maneuvers may be detected for entering a freeway, and the system may likewise increase restrictions of communications.

Therefore, in at least one presently preferred embodiment of the safety control system for vehicles, the system includes a communication device having at least one of an input accessible from within the vehicle and an output communicated within the vehicle, at least one sensor operable to sense at least one condition related to vehicle operation, and a controller communicated with the sensor and the communication device to selectively suppress at least one of said input and said output in response to a sensed parameter of said at least one condition being outside of a threshold. The communication device can be at least any of those previously mentioned herein, for example without limitation, a telephone, PDA, computer, vehicle alarm or indicator, navigation system, DVD player/recorder, CD player/recorder, and other electronic and/or telematic or other input/output devices accessible by the driver, and/or providing information or some communication to the driver. The sensors can also be at least any of those previously mentioned herein, for example without limitation, the physiological sensors, safety switches, toggle switches, vehicle operational sensors (e.g. steering, acceleration, deceleration, etc). And the controller can be at least any of those previously mentioned, for example without limitation, a stand alone unit with built-in microprocessor, an existing vehicle processor or control unit, and the like, and can be arranged to communicate with the driver and/or other devices as set forth herein.

While it will be appreciated, therefore, that while the invention has been described with respect to one preferred embodiment, many other variations, modifications and applications of the invention may be made. For example, without limitation, while the preferred embodiment requires the driver to maintain both hands on the steering wheel to initiate, receive and maintain communications or system access, other schemes may be used. For example, the system may require presence of two hands on the steering wheel to initially activate the system, and perhaps provide initial input (e.g. to place a telephone call and the like), but after such activation or initial input, the system may permit one hand to be removed from the steering wheel. This would facilitate, among other things, shifting a manual transmission. Shifting a manual transmission can be accommodated in the scheme requiring both hands on the steering wheel by permitting one hand to leave the steering wheel when the clutch is sensed as being activated to shift gears. Of course, other modifications, substitutions and applications can be accomplished in view of this disclosure.

Another invention involves blocking glare from sun or other cars, signs or street lights etc. To accomplish this goal, the vehicle windshield, windows and back window will be made with one of athermochromic, photochromic, electro-optic, electrochromic, liquid crystal, OLED or electrochemichromic technology, see references, here an after referred to as light throughput control (LTC), designed to be addressable and controllable on a pixel or small surface level to turn it on, off or change color or the intensity of the display at least one camera to detect the glare, and at least one controller to address and control the individual surface and a power source to power the surfaces using the technology referred to. Glare detection system using camera (64), One inactive Addressable individual electrically excitable cell on a Windshield with Addressable electrically excitable cells (65), One active Addressable individual (66)

As a glare comes into the driver eyesight, the camera will detect it and will calculate the projection of the glare onto the driver line of sight and his periphery using at least one of angle, distance, intensity changes or the glare wave frequency as the glare source with reference to the driver sight as it approaches the subject vehicle or as it changes position with respect to the vehicle or as the vehicle changes its position with respect to the glare or any combination thereof The parameters are updated in real time with frequency that is based on the speed of the changes in orientation and fed to a controller to calculate the projection general area using Cartesian, Vector or other spatial calculation method and then the controller feed the controller controlling the surface with the parameters required to activate the correct surface location so the glare source is mitigated with the LTC technology by at least one of effect the degree of translucence or opaqueness of the specific area by applying the correct current or voltage so as to mitigate the glare or by countering its frequency with its inverse wave so as to eliminate the visible part of the glare projected onto the driver site As described in Wikipedia, "Electrochromism is the phenomenon displayed by some materials of reversibly changing color when a burst of charge is applied. Various types of materials and structures can be used to construct electrochromic devices, depending on the specific applications. One good example of an electrochromic material is polyaniline which can be formed either by the electrochemical or chemical oxidation of aniline. If an electrode is immersed in hydrochloric acid which contains a small concentration of aniline, then a film of polyaniline can be grown on the electrode. Depending on the oxidation state, polyaniline can either be pale yellow or dark green/black. Other electrochromic materials that have found technological application include the viologens and polyoxotungstates. Other electrochromic materials include tungsten oxide (WO3), which is the main chemical used in the production of electrochromic windows or smart glass. Polymer-based solutions have recently been developed by John Reynolds and colleagues at the University of Florida. These promise to provide flexible and cheap electrochromics in a variety of colours, going all the way up to black. As the color change is persistent and energy need only be applied to effect a change, electrochromic materials are used to control the amount of light and heat allowed to pass through windows ("smart windows"), and has also been applied in the automobile industry to automatically tint rear-view mirrors in various lighting conditions. Viologen is used in conjunction with titanium dioxide (TiO2) in the creation of small digital displays. It is hoped that these will replace liquid crystal displays as the viologen, which is typically dark blue, has a high contrast compared to the bright white of the titania, thereby providing the display high visibility. ICE 3 high speed trains use electrochromatic glass panels between the passenger compartment and the driver's cabin. The standard mode is clear, and can be switched by the driver to frosted/translucent, mainly to conceal "unwanted sights" from passengers' view, for example in the case of (human) obstacles." End of Wikipedia description Further description of Electrochromism is described in the following tutorial found on http://lcp.elis.ugent.be/tutorials/tut_echrom and written by Electrochromic tutorial written by Matthias Marescaux. "This tutorial gives a short introduction to the field of Electrochromic Displays. The tutorial is divided in 5 sections: Introduction, The chromic effect, Molecular dyes, Advantages of electrochromic devices, Some interesting links Introduction.

Since time immemorial, mankind has been fascinated by light and how to manipulate it. Some big inventions, like the breaking of light on a prism, the photograph, and the television, have only sharpened the curiosity of scientists. That is why up till now, a lot of research happens in the field of display technology and integration of colours in displays. Nowadays, we have already tens or maybe hundreds of different sorts of displays. Some of the most famous are: cathode ray tube (CRT: television or computer screen), liquid crystal displays (LCD), electrophoretic displays (E-INK), (organic) light-emitting diodes ((O) LED), electro chromic displays (ECD) . . . . In this section, we present you a survey of what chromic, and in particular, electrochromic materials are and what they are used for.

The Chromic Effect:

Chromic materials have the possibility of changing their colour reversibly when they are placed in a different environment. Every day, new materials are discovered with chromic properties. To classify all these chromic materials, we put them in groups along their stimuli. For instance: thermochromic materials are materials that change their colour when the temperature of the environment is raised or lowered. This effect is called thermochromism and examples of such materials are bianthrones and cobalt hexacyanoferrate. Besides this chromic effect, you have photochromism (exposure to electromagnetic radiation changes the colour of the material), halochromism (a change in pH of the solution), solvatochromism (a reversible change of colour induced by the present of solvents) . . . .

One of the most useful forms of chromism is electrochromism. In this case, a material is able to reversibly change its colour when it is placed in a different electronic state. So by absorbing an electron (the materials is reduced) or by ejecting one (the material is oxidised), the material is able to change its colour.

Electrochromism was discovered in 1968 by S. K. Deb and J. A. Chopoorian and has a broad range of commercial applications. Some of those applications are smart windows and mirrors (e.g. darkening a window to control the inlet of sun light), active optical filters (e.g. sunglasses), displays and computer data storage.

Electrochromes (electrochromic materials) can be classified in different groups depending on their physical state at room temperature. This way, three different types of electrochromes can by distinguished. Type I electrochromic materials are soluble and remain in the solution during usage. Type II electrochromic materials are soluble in their neutral state and form a solid on the electrode after electron transfer, whereas type III electrochromic materials are solid and remain solid during usage. In reality, three big groups of electrochromes are popular in making electrochromic devices (ECD's): metal oxide films (inorganic type III), conducting polymers (organic type III) and molecular dyes (type I). The research in our group is mainly on all-solution systems, better known as the molecular dyes.

Figure 9:
FIG. 9 Shows a stylus
Figure 10:
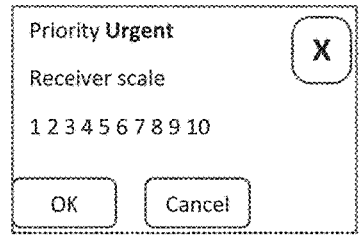
FIG. 10 Dialogue box as an optional control to re-prioritize in a voice or written electronic message FIG. 11 schematically illustrates one possible structure of system & method proposed FIG. 12 schematically illustrates a typical two way road with embedded code in the paint FIG. 13 schematically illustrates road sign with standardized code that can be recognized optically from a limited set of codes FIG. 14 schematically illustrates the headrest on a set from front and side view FIG. 15 schematically illustrates one view the Helmet with sensors FIG. 16A schematically illustrates current design of a portable telematic device and the current ports FIG. 16B schematically illustrates the outer view of the attachment proposed with locating/docking holes and added bus connector FIG. 16C schematically illustrates the components and connection of the attachment proposed with locating/docking holes and added bus connector FIG. 16D schematically illustrates the relationship of the current design to connection of the attachment proposed FIG. 17 schematically illustrates the flow of information in an adaptive system to adjust the purpose of the vehicle equipment and accessories to achieve a specific goal.
Figure 11:
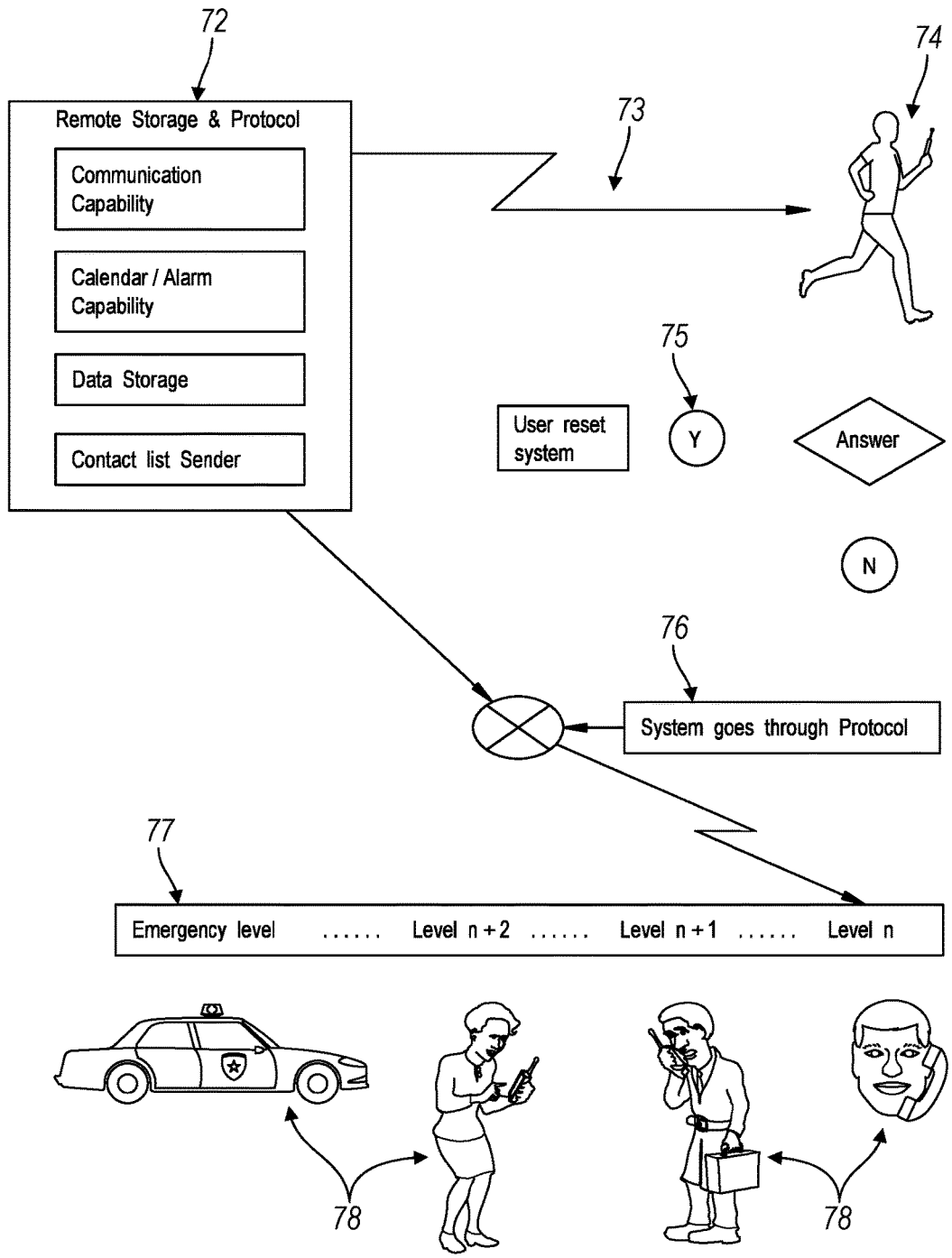
Figure 12:
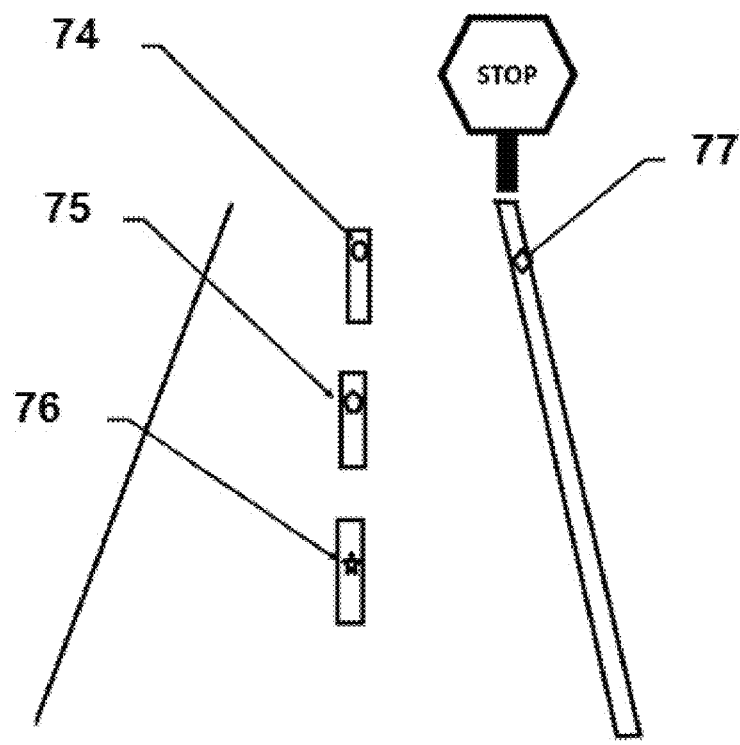
Figure 13:
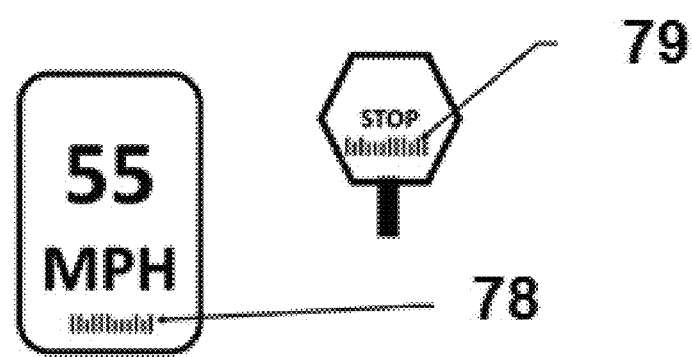
Figure 14:
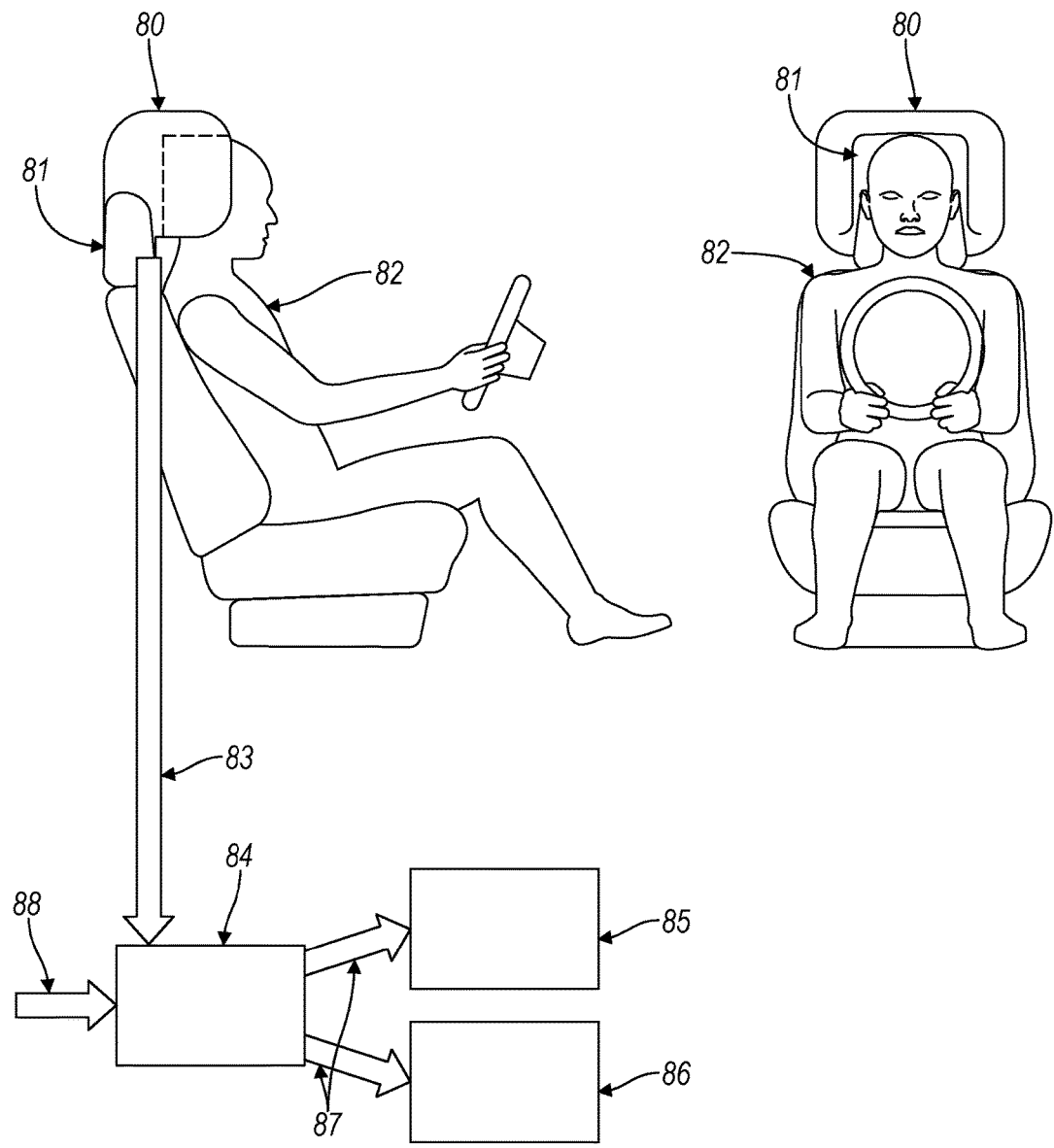
Figure 15:
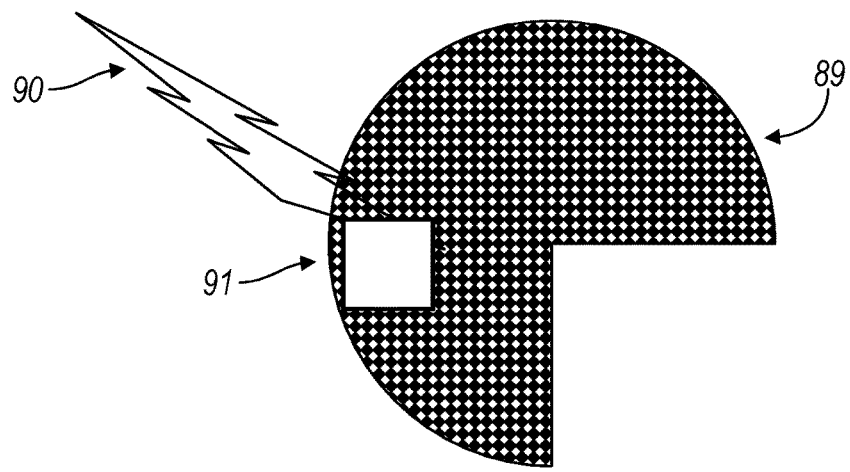
Figure 16A:
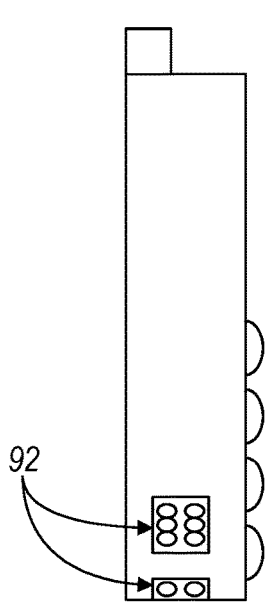
Figure 16B:
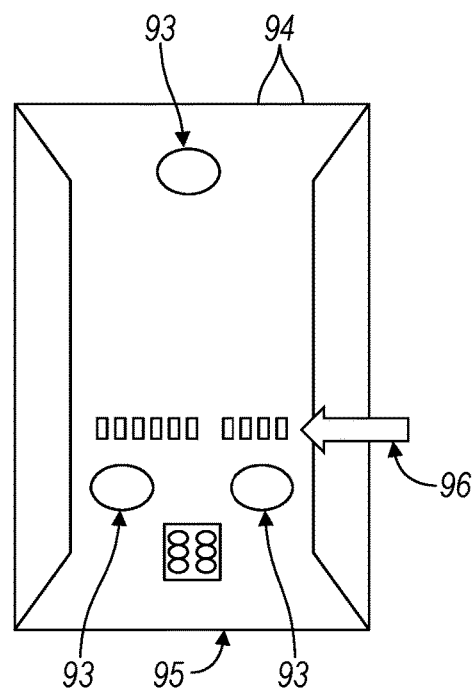

Molecular Dyes:

The technology for making a working electrochromic cell is very similar to the technology used in LCD displays. One way of making a working cell is by placing the electrochromic material between two transparent electrodes (preferentially Indium Tin Oxide, better known as ITO). The colouring of the EC-material results from changing the potential of the cell by charging the electrodes. Structure of ECD Structure of ECD. Structure of ECD in off-state, Structure of ECD in on-state. (FIG. 9)

http://homepage.ntlworld.com/colin.pratt/Chromism.pdf, http://iopscience.iop.org/1468-6996/9/1/014104/pdf/stam8_1_014104.pdf, https://etd.ohiolink.edu/rws_etd/document/get/kent1207869606/inline, http://www.extremetech.com/extreme/74496-digital-ink-prototype-uses-nanotech, and an article on http://informity.com/ about Siemens flexible display."

While it will be appreciated, therefore, that while the invention has been described with respect to one preferred embodiment, many other variations, modifications and applications of the invention may be made. Chalk less-Marker less Blackboard CL-ML-BB Another invention is A board for writing without using a marker or chalk but using a stylus with magnetic or static charge to pull cartridges located in tubes or cluster of tubes from the back of the tube to the front of the tube so it is visible through the front clear shield a powerless/and not computer based system. It contains a cluster of tubes of any shape that are painted internally and externally in one solid color and are at an up incline. The tube contains one or more cartridge that are magnetically or electrostatically controllable and have a different color then the tube color. The surface is a see through glass or plastic that retains the cartridges. Tube that will contain cartridges (Side View) (67), Clear surface covering the opening of the tubes (Front View—not visible) (68), Tube who's some of its cartridges accumulated toward the front to show light gray (69), Clear surface covering the opening of the tubes (Front View—not visible) (70), Tube who's cartridges accumulated toward the front to show BLACK (71).

When a charged/magnetized stylus is introduced to the vicinity of the surface of the tube, the cartridge slide toward the outer tube edge revealing a contrasting color to the solid color, e.g. black vs. white, etc. and thus appear as a writing.

On the other hand, when a different strength of stylus is used and the cartridges respond to different strength, several layers of cartridges can accumulate to create the appearance of color at the location which is a composite of several layers.

To erase a reverse charge/pole is introduced via the stylus to selectively erase the board. Alternately, a sheet on the back that can be charged or magnetized with the appropriate polarity to pull back the entire content to clear the entire board Alternately three different items can be in a sub cluster with each having a Red, Green and a Blue cartridges with different inertia and by using a styles with different electrostatic or magnetic field strength in a combination of these colors or individual one of them will be pulled in to create a color display Another invention is for Priority confirmation dialog box After reading or listening to a message the user will rate the sending entity's "priority setting" as good, bad, too low, too high and will put in some restrictions or enhancement by Sender, By content, by key words, by subject matter. The benefit is communication management by user and not by sender. This is again for voice and written electronic e-mail. Remote Storage & Protocol (72), User receives communication (73), Another field de c medium marked as urgent or personal, etc. With this invention a Priority Confirmation Dialogue box for incoming messages to score the validity of the prioritization and create a profile about such user and consequently prioritize messages based on receiver criteria and not the sender criteria. The dialogue box can also be in the form of a voice prompt for voice based messaging such as voice mail.

Re-prioritization will be context sensitive based on various field of a communication, their contents, attachment, attachment contents, the conversation links or any conversation thereof While it will be appreciated, therefore, that while the invention has been described with respect to one preferred embodiment, many other variations, modifications and applications of the invention may be made for Priority Confirmation Dialogue box for incoming messages that will allow the person receiving the message to rate the sender prioritization and a controller to store the classification and through statistical means create a statistical score for the sender to moderate his prioritization to suit the need and expectation of the receiving party.

Another invention focuses around preventing tragic deaths such as that of James Kim in Oregon. I have driven in Oregon before along back roads trying to save time (coming back from Mount Hood), and I have also experienced dead cell phone zones on my way to Utah in summer of 2004 and felt the emptiness and anxiousness brought about by the lack of connectivity. Seeing the fire fighters trucks passing me along the roads did not inspire any additional confidence; however, that did not inspire a solution, just the need for one. However, it took the death of Mr. Kim and the pictures of him with his family to shake my brain to action. This is a tribute to his bravery. Remote Storage & Protocol (72),
User Receives Communication (73)

The Dead Man Switch is a system that consists of a Remote storage of information accessed via phones or PC of any type. The remote storage accepts data in any format, voice, image, and numbers addresses etc. The remote storage also contains addresses and contacts and the means to communicate with these addresses and contact. The remote storage also contains a calendar function with an escalated alarm. The escalated alarm contact different destination with different messages as set up by the user.

The user about to take a trip (Possibly a cab in a high crime city) or a trip through an uncharted wilderness or even an airliner on a scheduled regular trio. The user will set up the alarm on the system stating his where about his destination, his route and his ETA. He may even supplement with a picture of the cab license plate, driver, road sign, shortcut road, etc. At the ETA time, the system will contact the user who in case has arrived safely or still OK, the user then can dismiss the alarm or can extend it (e.g. stuck in traffic, Delayed flight, etc.) In case the system could not get a hold of the user, the system will issue a first level alarm to the contact information assigned to such alarm. As the next deadline approaches, the system will again try to contact the user. In case the user answered, he will be informed of all previous alerts sent and he will then have choices to send counter messages to calm the fears created by the previous alarms. In case the user did not answer, the system will send a higher level alarm to the higher level assignee, and so on. The system can be configured to constantly hunt, connect and collect information about the user and from the user actively or passively and store that information for use if and when the user fails to respond to an ETA check. This is useful when a cell phone signal is intermittent and the user can poo in and out of the scan with or without his knowledge.

In case a search need to be conducted for the user, the information supplied by the user actively or passively will be given to the Search and Rescue for analysis and quicker focused action.

The advantage here is 1: Privacy, no one need to know where a person is unless he needs help 2: Unlike an ONSTAR system that does not communicate a problem unless it occurs, this system will report a problem when an assurance that there is No problem occurs.

While it will be appreciated, therefore, that while the invention has been described with respect to one preferred embodiment, many other variations, modifications and applications of the invention may be made Safety tracking device for children, elderly or anyone who may have problem in getting to where they need to be and it uses a dead man switch system so if a message is not received or validation method such as connection loss can be used as a trigger an alert based on last information received.
Another invention Intelligent Delineation of roads and signs Many lane departure technologies use camera to detect the car position between the lanes but this technology can be defeated by snow and glare. The suggestion is to use metal shaving in the form of a code in the paint to embed information to represent different lanes and delineation function or using them in a coded way so having certain order can mean different things. Coded metal shaving for center line before stop sign (74), Coded metal shaving for center line indicating Latitude and Longitude (75), Coded metal shaving for center line indicating speed limit (76), Coded metal shaving for right shoulder marking (77)

The use of RFID or metal powder under roads lane marking to guide vehicles. Machine to a program & apply the RFID while painting the lanes.

RFID or the metal shaving can be programmed with Physical & Location characteristics such as Lane location, GPS association, Most right, most left, 1 of 2, turn lane, lane ends in X feet etc. . . . , Lane ends etc. . . . , RFID can be programmed with Legal Characteristics, Speed limit, Passing, One way, RFID Readers on the car Computer to process information from reader & to accept driving preferences from driver and issue communication to other drivers via Wireless communication to the Internet/WAN/LAN, Actuators to move the cars as necessary in response to driver preferences and under Computer Control, Remote computer accessed wirelessly, To share data and experiences between the car and other. Cars, to act as a supplement to hard written data, e.g. "construction today" or accident ahead.

This can be accomplished via Machine to apply metal shaving in the form of a code using different material or different layout while painting the lanes. Machine can be layout the shavings as code with Physical & Location characteristics such as Lane location GPS info, Most right, most left, 1 of 2, turn lane, lane ends in X feet etc., Lane ends etc., shaving can also be laid out as coded Legal Characteristics, Speed limit, Passing, One way, metal shaving Readers on the car, Computer to process information from reader & to accept driving preferences from driver and issue communication to other drivers, Wireless communication to the Internet/WAN/LAN, Actuators to move the cars as necessary in response to driver preferences and under Computer Control, Remote computer accessed wirelessly, To share data and experiences between the car and other. cars, To act as a supplement to hard written data, e.g. construction today or accident ahead Similarly for road signs, a coded system can be used universally to identify the sign for machine reading, e.g. Camera or other remote sensing technology, e.g. magnetic field, radar, RFID, etc. to detect the contents and context of the sign without resorting to expensive or sophisticated sensors and algorithms -1. A coded system for road lanes use metal shaving in the form of a code in the paint to embed information to represent different lanes and delineation function or using them in a coded way so having certain order can mean different things to give information to a sensor in the car about the infrastructure and regulation.

-2. A coded system for road signs can be used universally to identify the sign for machine reading, e.g. Camera or other remote sensing technology, e.g. magnetic field, radar, RFID, etc. to detect the contents and context of the sign without resorting to expensive or sophisticated sensors and algorithms. Bar code indicating speed limit (78), Bar code indicating stop sign (79).

While it will be appreciated, therefore, that while the invention has been described with respect to one preferred embodiment, many other variations, modifications and applications of the invention may be made.

Another invention pertain to collecting data from driver Brain wave, neural oscillation, Electroencephalography, Magnetoencephalography or Electromyography to detect driver competence of work load while driving using a specialized Smart Headrest. Head rest Assembly (80), Electroencephalography sensors (81), Data & Power Cable (81), Driver (82), Data stream from sensors (83), Main Controller (84), External Signal processor (85), Internal Signal processor (86), Data Streams between signal analyzers and the main controller (87), Power source (88), Helmet (89), Data transmission (90), Power Source (91)

Headrest with embed EKG probes in a manner that touch or hovers very close to the skull or the neck in at least the back, the sides and the top* (in case of the skull only)

The flaps hosing the side and top EKG probes may be solid surface or may have openings to improve peripheral vision The EKG sensors maybe touch type or may be field sensing type The Flaps may be connected to the headrest physically and the headrest connects to the controller physically or wirelessly The Flaps maybe a helmet that connects to the monitoring controller physically or wirelessly The CONTROLLER will monitor signals and decide if a NORMAL was breached The controller will then issue a signal detected within and outside the vehicle The signal within the vehicle is audible, visual or electronic to other controllers or actuators The signal outside the vehicle is to other drivers, other vehicles, infrastructure or to a remote computer or dispatch in electronic form, digital form, text to speech form or e-mail form Use of electroencephalogram rhythms to sense differences in driver concentration Use of electroencephalogram rhythms to sense if the driver head is moving away from the headrest Use of electroencephalogram rhythms to detect NREM Use of electroencephalogram rhythms to detect Sleep spindles may represent periods where the brain is inhibiting processing to keep the sleeper in a tranquil state. Along with K-complexes they are defining characteristics of stage II sleep. Sleep spindles (also called sigma waves) indicate the onset of Stage II sleep. They are often tapered at both ends and frequently seen over the central head regions. They may or may not be synchronous, but they should be symmetrical and bilateral. (or the lack of their off)

Use of electroencephalogram rhythms to detect A K-complex is an EEG waveform that occurs during stage 2 sleep. It consists of a brief high-voltage peak, usually greater than 100 μV, and lasts for longer than 0.5 seconds. K-complexes are often followed by bursts of sleep spindles. K-complexes occur randomly throughout stage 2 sleep, but may also occur in response to auditory stimuli. It is the response to auditory stimuli that likely lead to the origin of the term K-complex. Original research in the mid-1900s showed that K-complexes would arise when researchers would knock on the door of a sleeping subject. (or the lack of their off)

Use of electroencephalogram rhythms to detect Cyclical Alternating Pattern occurs in sleep. Characterized as periodic episodes of aroused EEG activity (more Sleep spindles and K-complexes) followed by a period of more quiet sleep. Both these periodic activities, when combined, are considered the CAP period. (or the lack of their off)

Reference materials from http://www.wikipedia.org/ about sleep stages

Stage 1—occurs in the beginning of sleep, with slow eye movements. Disappearance of alpha waves and appearance of the theta wave. People in this stage often believe that they are fully awake. During the transition into Stage 1 sleep, it is common to experience a hypnic jerk.

Stage 2—the person is unconscious [verification needed], though awakened easily. No eye movements occur, and dreaming is very rare during this stage. EEG recordings tend to show characteristic "sleep spindles" and "K-complexes" during this stage.

Stage 3—transition between stage 2 and stage 4. Delta waves begin to occur which are associated with "deep" sleep.

Stage 4—slow-wave sleep referred to the "deepest" stage of sleep in which there is a continuation of the delta wave. Dreaming is more common in this stage than in other stages of NREM sleep though not as common as in REM sleep. The content of SWS dreams tends to be disconnected and not as vivid as those that occur during REM sleep. This is also the most common stage in which parasomnias occur. End of Reference materials from http://www.wikipedia.org/

Reference materials from http://www.wikipedia.org/ "10-20" system (EEG)

The "10-20" system is a widely used method to describe the location of scalp electrodes in the context of an EEG experiment. It ensures reproducibility of such tests. This system is based on the relationship between the location of an electrode and the underlying area of cerebral cortex. The "10" and "20" refer to the fact that the actual distances between adjacent electrodes are either 10% or 20% of the total front-back or right-left distance of the skull.

Each site has a letter to identify the lobe and a number to identify the hemisphere location. The letters F, T, C, P and O stand for Frontal, Temporal, Central, Parietal and occipital respectively. Note that there exists no central lobe, the "C" letter is only used for identification purposes only. A "z" refers to an electrode placed on the midline. Even numbers (2, 4, 6, 8) refer to electrode positions on the right hemisphere, whereas odd numbers (1, 3, 5, 7) refer to those on the left hemisphere.

Two anatomical landmarks are used for the essential positioning of the EEG electrodes: first, the nasion which is the point between the forehead and the nose; second, the inion which is the lowest point of the skull from the back of the head and is normally indicated by a prominent bump.

When recording a more detailed EEG with more electrodes, extra electrodes are added utilizing the spaces in-between the existing 10-20 system. This new electrode-naming-system is more complicated giving rise to the Modified Combinatorial Nomenclature (MCN). This MCN system uses 1, 3, 5, 7, 9 for the left hemisphere which represents 10%, 20%, 30%, 40%, 50% of the inion-to-nasion distance respectively. The introduction of extra letters allows the naming of extra electrode sites. Note that these new letters do not necessarily refer to an area on the underlying cerebral cortex.

In mammals, the measurement of eye movement during sleep is used to divide sleep into two broad types: rapid eye movement (REM) and non-rapid eye movement (NREM) sleep. Each type has a distinct set of associated physiological, neurological and psychological features.

Sleep proceeds in cycles of REM and NREM phases. In humans, this cycle is approximately 90 to 110 minutes. Each phase may have a distinct physiological function. Drugs such as alcohol and sleeping pills can suppress certain stages of sleep (see Sleep deprivation). This can result in a sleep that exhibits loss of consciousness but does not fulfil its physiological functions.

In REM, the brain is active and the body inactive, and this is when most dreaming occurs. REM sleep is characterized by an electroencephalography (EEG) that has low voltage and mixed frequency, similar in appearance to the wakeful EEG. During REM sleep there is loss of skeletal muscle tone, and an active sympathetic nervous system.

In NREM sleep, the body is active and the brain inactive, and there is relatively little dreaming. Non-REM encompasses four stages; stages 1 and 2 are considered 'light sleep', and 3 and 4 'deep sleep'. They are differentiated solely using EEG, unlike REM sleep which is characterized by rapid eye movements and relative absence of muscle tone. There are often limb movements, and parasomnia sleep walking occurs in non-REM sleep. A cyclical alternating pattern may sometimes be observed during a stage.

Rechtschaffen and Kales originally outlined the criteria for staging sleep in 1969. The American Academy of Sleep Medicine (AASM) updated the staging rules in 2007.

Both REM sleep and NREM sleep stages 3 and 4 are homeostatically driven; that is, if a human is selectively deprived of one of these, it rebounds once the person is allowed to sleep. This suggests that both are essential in the sleep process and its many functions.

NREM: NREM accounts for 75-80% of total sleep time in normal human adults, and consists of four stages according to the 2007 AASM standards:

During Stage N1 the brain transitions from alpha waves (common to people who are awake and having a frequency of 8 to 13 Hz) to theta waves (frequency of 4 to 7 Hz). This stage is sometimes referred to as somnolence, or "drowsy sleep". Associated with the onset of sleep during N1 may be sudden twitches and hypnic jerks. These are normal. As is an increased instance of flatulence. Other people may also experience hypnagogic hallucinations during this stage, which can be more troublesome. During N1 the subject loses some muscle tone, and conscious awareness of the external environment.

Stage N2, is characterized by "sleep spindles" (12 to 16 Hz) and "K-complexes." During this stage the electromyography (EMG) lowers, and conscious awareness of the external environment disappears. This occupies 45 to 55% of total sleep.

In Stage N3, the delta waves, also called delta rhythms (0.5 to 4 Hz) make up less than 50% of the total wave-patterns. This is considered part of the slow-wave sleep (SWS) and functions primarily as a transition into stage N4. Overall it occupies 3 to 8% of total sleep time. This is the stage in which night terrors, bed wetting, sleepwalking, and sleep-talking occur.

In Stage N4, delta-waves make up more than 50% of the wave-patterns. Stages N3 and N4 are the deepest forms of sleep; N4 is effectively a deeper version of N3, in which the deep-sleep characteristic, such as delta-waves, are more pronounced. End of Reference materials from http://www.wikipedia.org/

While it will be appreciated, therefore, that while the invention collecting data from driver Brain wave, neural oscillation, Electroencephalography, Magnetoencephalography or Electromyography to detect driver competence of work load while driving using a specialized Smart Headrest has been described with respect to one preferred embodiment, many other variations, modifications and applications of the invention may be made.

Another invention: externally portable data in conjunction with portable device and external accessibility to internal mobile device component Sharing data with a portable device and another device without having to use the O/S or I/Os of portable device hosting the system. And also deals with sharing portable device internal mobile device components with another external device without using O/S software or middleware to effect the sharing by providing direct connection to replicate their pins but with a switching hub so the resource is shared selectively Example of current connectors on portable telematic device. Locator pins to hold the phone to a cradle and to optionally power the phone (Not shown)(93), alternate data connection from the phone to the new attachment circuit and then to the cradle (94), Replacement to the standard connector, (95), Data connections between various components of the internal circuitry and between circuitry and the external connectors (96), Data connections between various components of the internal circuitry and between circuitry and the external connectors (97), Data connections between current connectors on portable telematic device and the internal circuitry of the attachment (98), Memory Reader (99), Memory stick (100), Wireless transceiver (101), CPU (102)

The problem with lack of standards in portable Telematic devices as it relates to:

1: Portability, sharing of data
2: Using the same universal Connector
3: Affixing the device securely while driving/charging/transporting.

Each device have unique connectors. The other problem is that they do not have sufficient memory to carry additional data that is needed by the user so the user end up carrying a bunch of USB Drives and similar devices to transfer take his data along. And last but not least, they have different ways to mount the devices securely in a car.

What we propose is a standard format for such devices that will allow Standard port for universal data, power speaker and antennas connectivity (including a replicator for existing phones in the aftermarket) Place in that connector for USB hub or other protocol hub and Memory medium reader (USB, SD or other) Have a standard physical/mechanical method located within standard dimensions to mount the device in a car universally without any awkwardness While it will be appreciated, therefore, that while the invention Sharing data with a portable device and another device without having to use the O/S or I/Os of portable device hosting the system. And also deals with sharing portable device internal components such as SIM or SD card with another external device without using O/S software or middleware to effect the sharing by providing direct connection to replicate their pins but with a switching hub so the resource is shared selectively has been described with respect to one preferred embodiment, many other variations, modifications and applications of the invention may be made.

Another invention: Mobile phone based vehicle interlock

Based on our filed, granted and pending IP are U.S. Granted Patent (U.S. Pat. No. 6,731,925), U.S. Pending Patent (Ser. No. 10/838,708), as well as application 20120283894 we referred to the DrivingSystem™ as an integrated Man, Machine, Environment, History and REGULATION We further explained that our IP specify the Mobile phone or other potable device that is part of a telematic system that carries the driver applications and informations. Primary inputs to the DrivingSystem, Man, Machine, Environment, History, Regulation (103), Variable factors due to driving purpose or similar factors (104), Safety and Application Evaluating Processor (105), Central Processor (Local or Remote) (106), Predictive/Adaptive Algorithms (107), Modular Operating System (108), Adaptive feedback (109), Output (Digital data or control instruction) (110), Memory (Local and/or remote) (111), Data and preferences input (Local and/or remote) (112), Application Update (Local and/or Remote) (113), Operating System Upgrades (Local and/or Remote) (114).

We further identified that the information in the phone identify the driver preferences and raw data related to, Machine, Environment, History and REGULATION.

This amendment is to further detail and clarify our claim and intent to specify how the portable device will be used as an interlock to permit drivers to access vehicles within allowed REGULATION. Currently such clarification is limited to DUI but expressed in general for the other limitations, DUI, SUSPENDED, Operator license vs. Chauffer license vs. TRUCK license vs. Motorcycle, etc. . . . , permitted time of operation, weather condition, length of operation, or any combination thereof.

The permit maybe updated via web LAN WAN at the driver request, suspended from the web LAN WAN with regulatory authority, limit the access by time region and other factors from the web LAN WAN with regulatory authority, The driver identification is as per current granted and pending IP and maybe further detailed with the specific addition of fingerprints and other physiological optical and voice digitization While it will be appreciated, therefore, that while the invention Cell Phone will be used as an interlock to permit drivers to access vehicles within allowed REGULATION. for DUI, SUSPENDED Operator license vs. Chauffer license vs. TRUCK license vs. Motorcycle, limit the access by time region and other factors from the web LAN WAN with regulatory authority etc -2. The permit maybe updated via web LAN WAN at the driver request -3. Suspended from the web LAN WAN with regulatory authority -4. The driver identification maybe further detailed with the specific addition of fingerprints and other physiological optical and voice digitization has been described with respect to one preferred embodiment, many other variations, modifications and applications of the invention may be made.

Another invention a multipurpose vehicle pedal or multiple pedals with expanded functionality in that at least one is monitored by a controller that is connected to different soft or mechanical actuators that can control at least power train and vehicle speed Changes role based on context and said controller is effective to actuate different actuators based on such context where such context include at least one of: Internal OR external signal where such signal includes at least one of implicit or explicit Data OR signal from LAN, WAN, Internet, PAN or proximity sensors (optical, laser or radar like) about infrastructure or other vehicles in the immediate vicinity or in remote location, Data OR signal from LAN, WAN, Internet, PAN about infrastructure or other vehicles in the immediate time frame or historical time frame, Data OR signal about a pedestrian in the immediate vicinity or in remote location, Data OR signal about a pedestrian in the in the immediate time frame or historical time frame, Data OR signal about other vehicle in the immediate vicinity or in remote location, Navigation software on board or remotely or map data only, Operator action as associated with the immediate vicinity or upcoming vicinity, Operator action as associated with the immediate time frame or historical time frame, Data about the environment, Data about the road condition, Data about traffic, External signal where such signal includes at least one of one of implicit or explicit, Data signal from LAN, WAN, Internet, PAN about infrastructure or other vehicles in the immediate time frame or historical time frame, Data about the environment, Data about the road condition, Data about traffic, Driving purpose, Vehicle type, Energy recovery or storage device status, Trip context including destination, Data OR signal from a portable device in the possession of the driver, passenger, Vehicle speed or momentum, Driving policy as set by at least one of a Regulatory factor, Legal factor, Laws, Driver preferences or vehicle owner settings, Where preferences are set explicitly or implicitly When the controller translates the context into action to maximize the benefit of the potential energy present in the vehicle at the time at least one context and one pedal is actuated. The system for energy conservation and allocation that uses at least one controller that is monitoring multiple factors status and then it is effective to change the mechanical linkage of the power train to maximize the use of the potential energy stored in the vehicle due to its current momentum by deciding if such energy is better used to perpetuate the vehicle travel or to store it in an energy recovery device While it will be appreciated, therefore, that while the invention has been described with respect to one preferred embodiment, many other variations, modifications and applications of the invention may be made.

Figure 18:
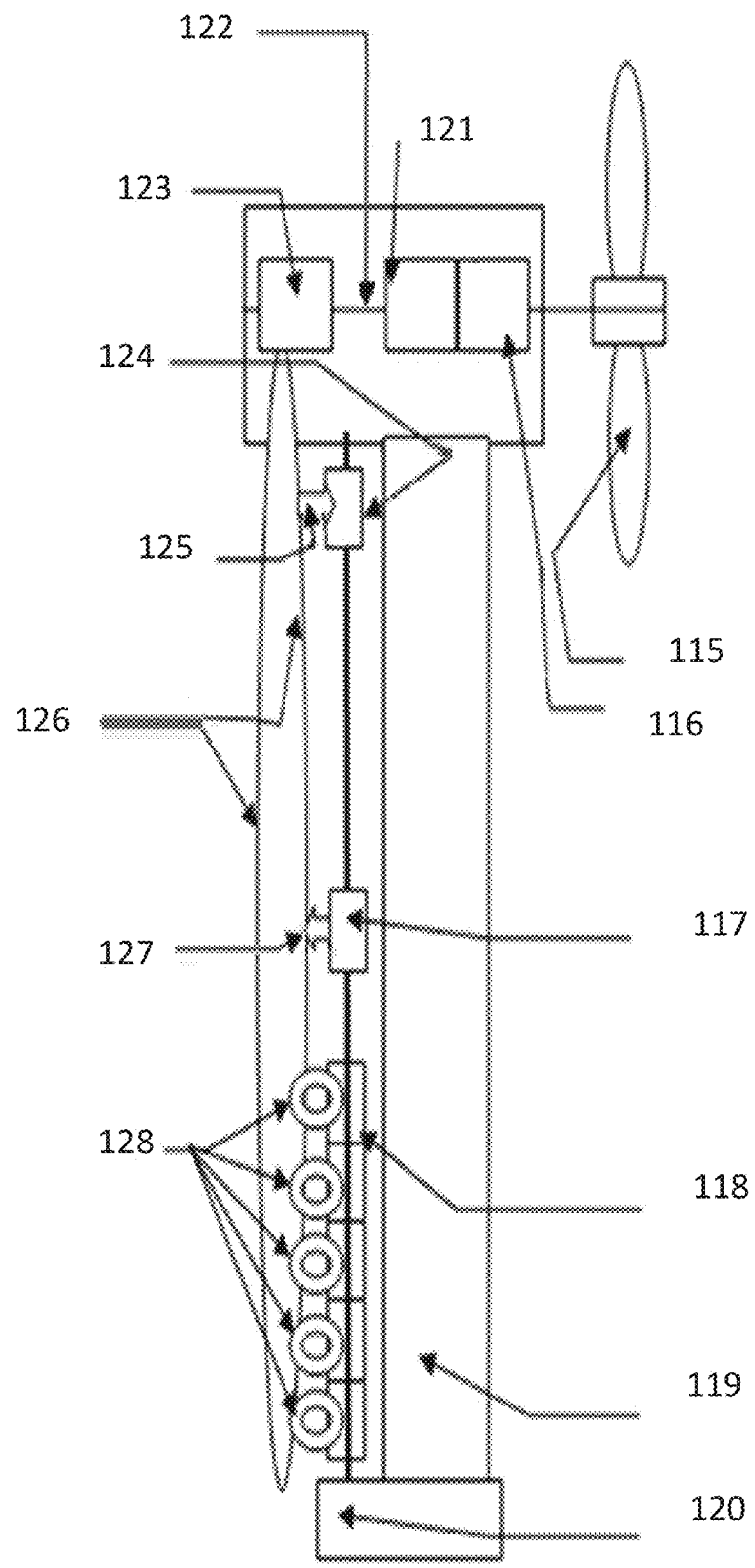
FIG. 18 schematically illustrates one mechanical energy storage system using weight to store energy that cannot be stored because storage medium is full FIG. 19 schematically illustrates current wiping technology.
Figure 19:
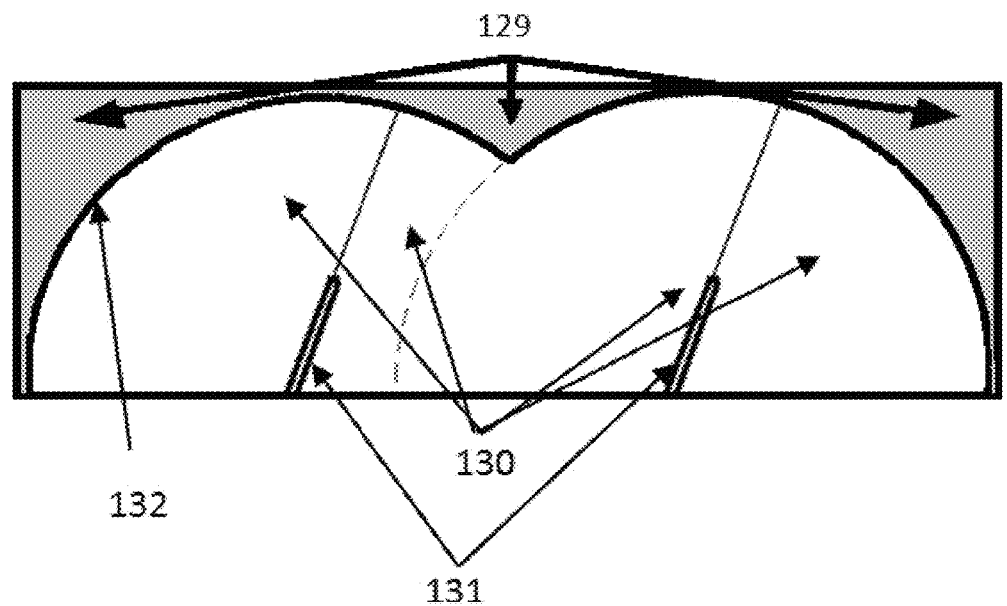
Figure 20:
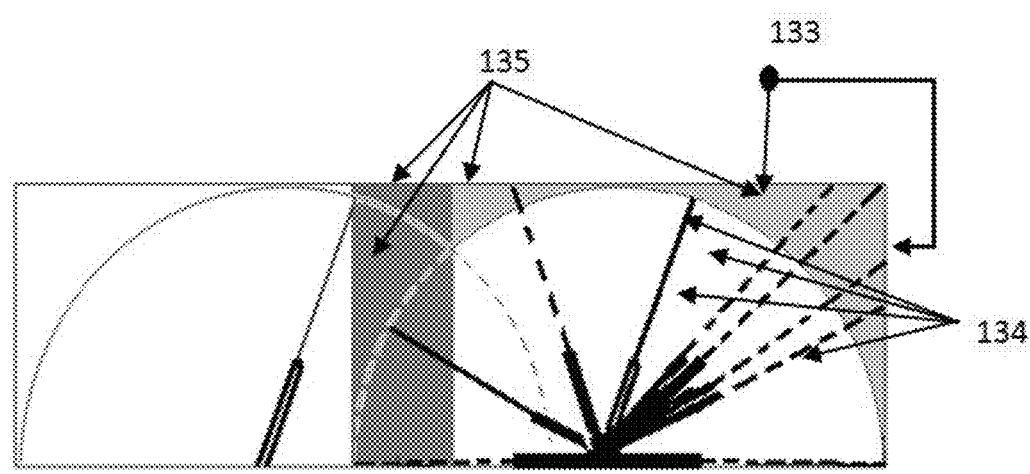
FIG. 20 schematically illustrates improvement in wipe space.
Figure 21:
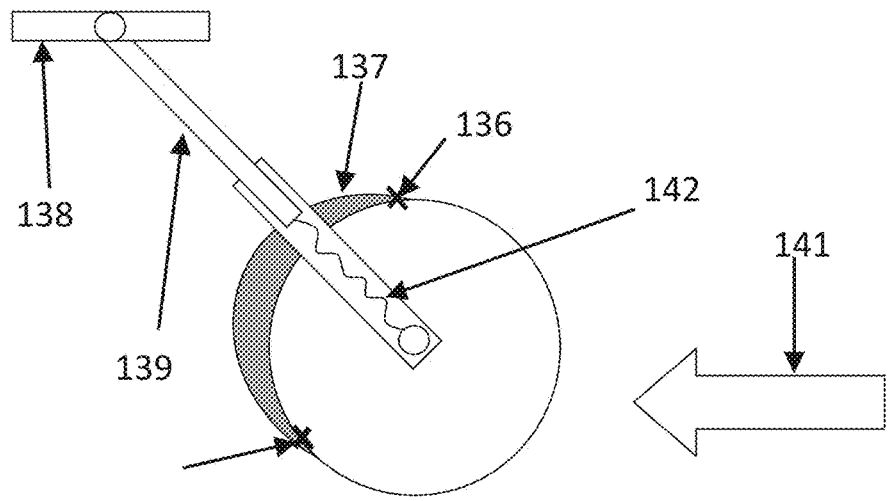
FIG. 21 schematically illustrates one embodiment using a physical CAM and spring to retract pedal. The Cam can be a variably adjustable.
Figure 22:
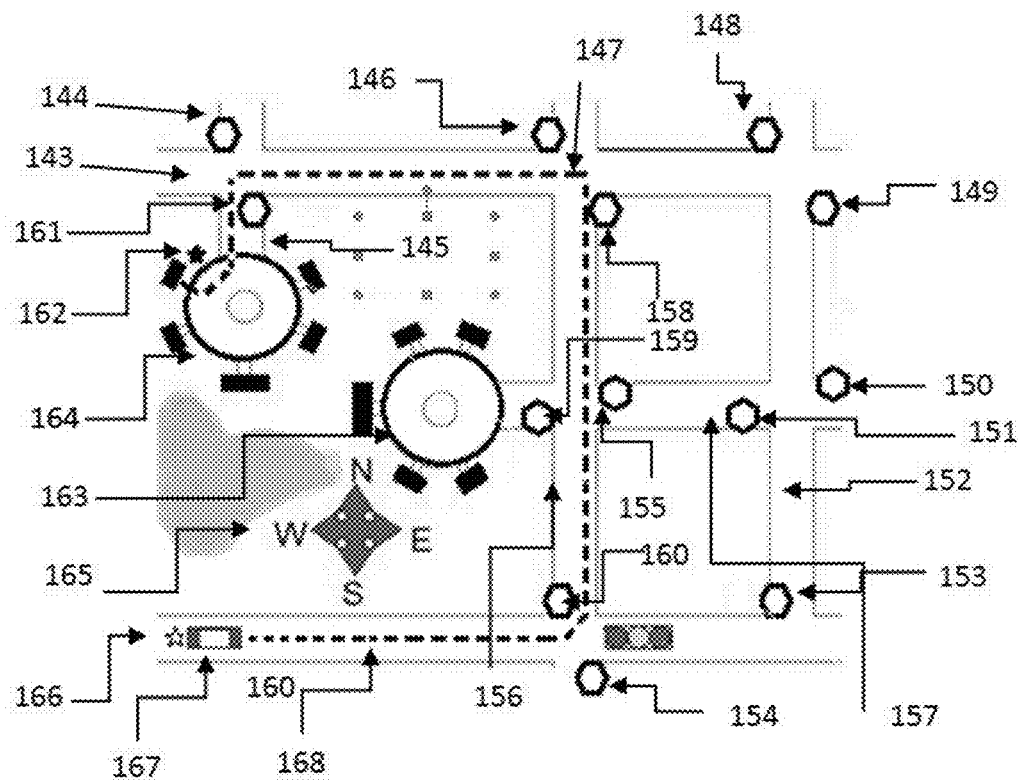
FIG. 22 schematically illustrates regular Birdseye view of a map in a navigation system.
Figure 26:
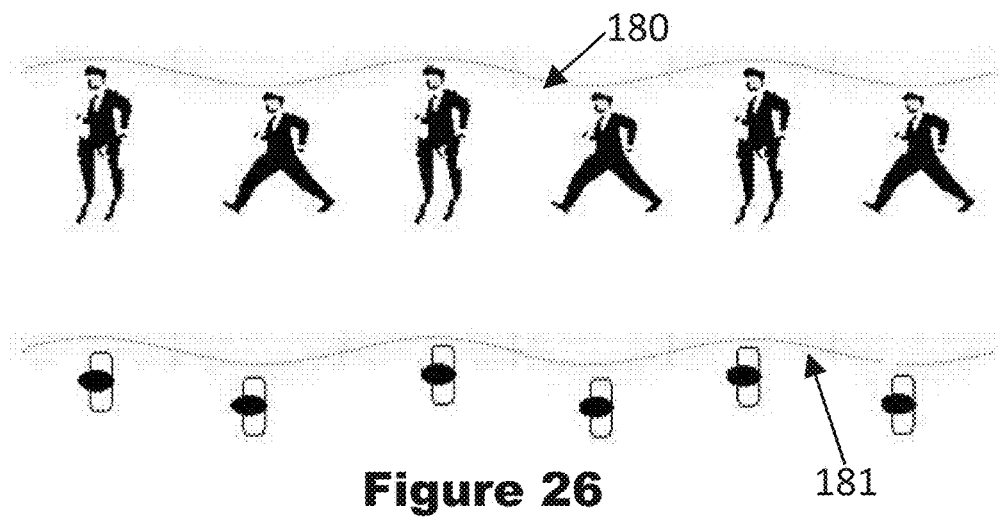
FIG. 26 shows natural walking rhythm of a healthy human with healthy limbs.
Figure 27:
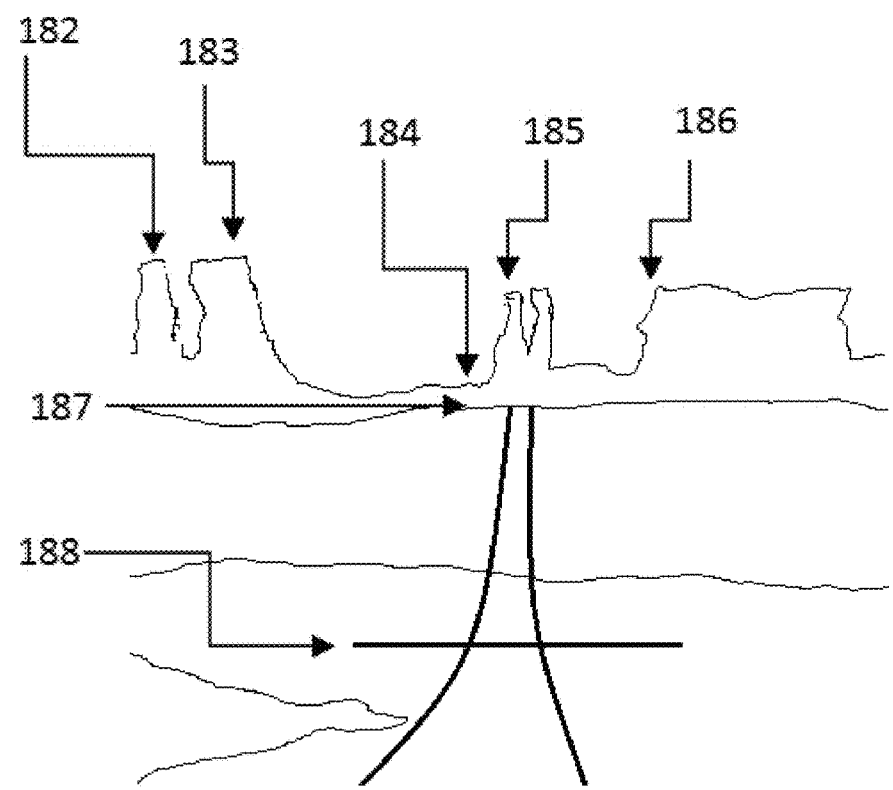
FIG. 27 a road outside urban area with features that can be used by a camera to calculate exact position FIG. 28 a road outside the city with manmade and artificial features that can be used by a camera to calculate exact position FIG. 29 schematically illustrates the proposed rack fully erect in side view FIG. 30 schematically illustrates the proposed rack fully erect in front view FIG. 31 schematically illustrates the proposed rack fully retracted inside view FIG. 32 schematically illustrates the proposed rack fully retracted in front view FIG. 33 schematically illustrates Top view of a vehicle equipped with multi view camera system FIG. 34 schematically illustrates Side view of a vehicle equipped with multi view camera system FIG. 35 schematically illustrates Front view of a vehicle equipped with multi view camera system FIG. 36 schematically illustrates rear view mirror and the blind spot resulting in most cases, particularly from a wrong adjustment FIG. 37 schematically illustrates rear view mirror and the dynamically changing view when moving the outside rear view mirror to sweep the lanes to the right side and to show the benefit of having both inside and outside rear view mirrors to move in concert to create a wider field of view.
Figure 28:
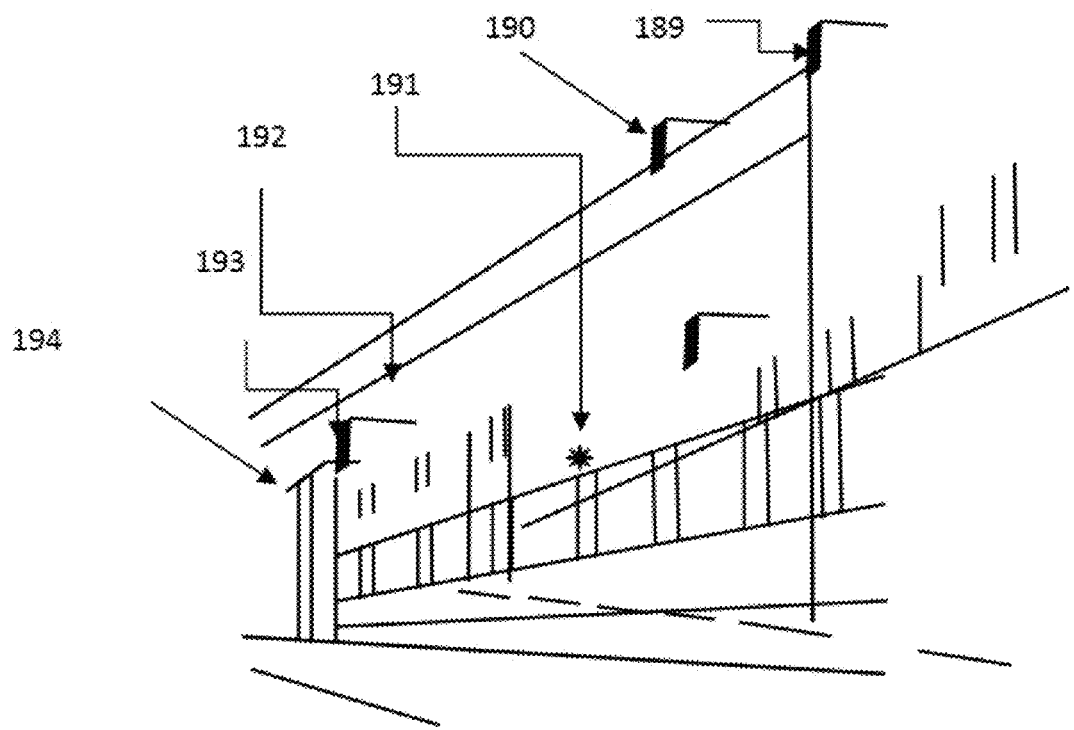
Figure 29:
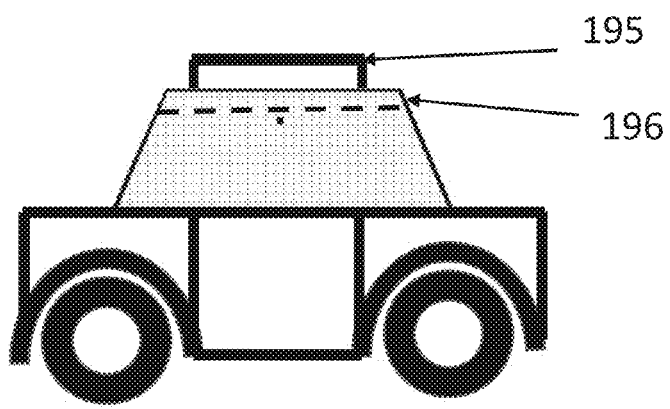
Figure 30:
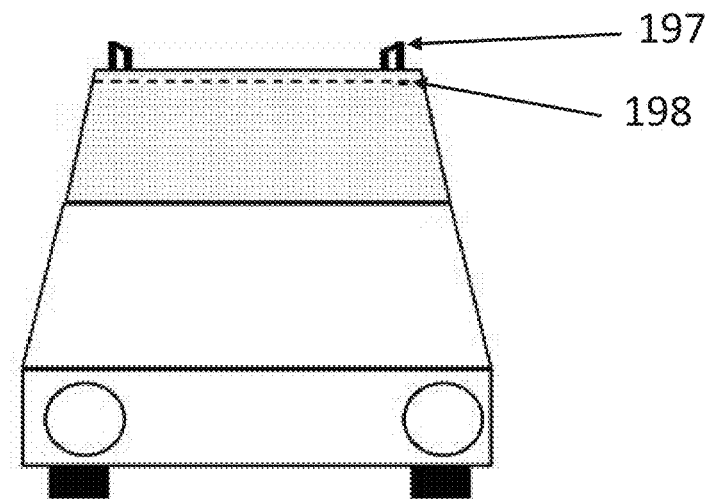
Figure 31:
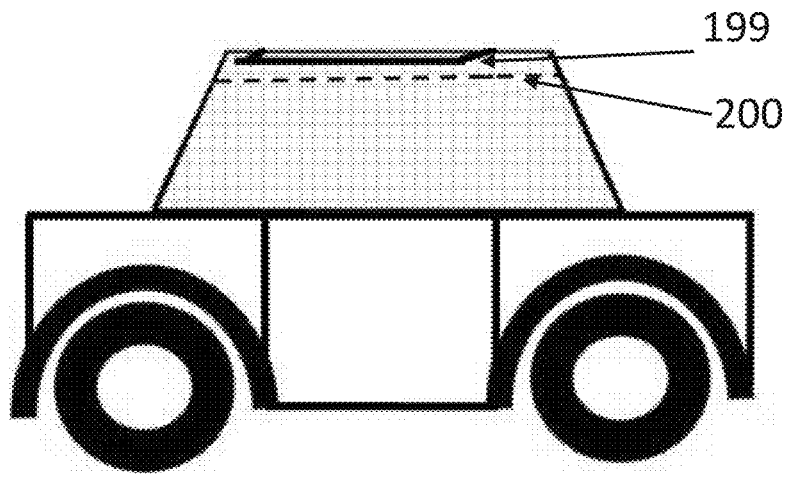
Figure 32:
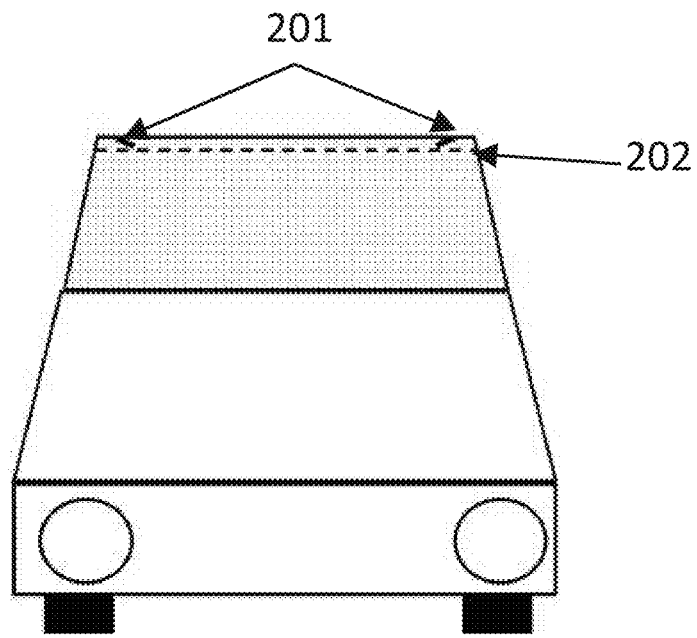
Figure 33:
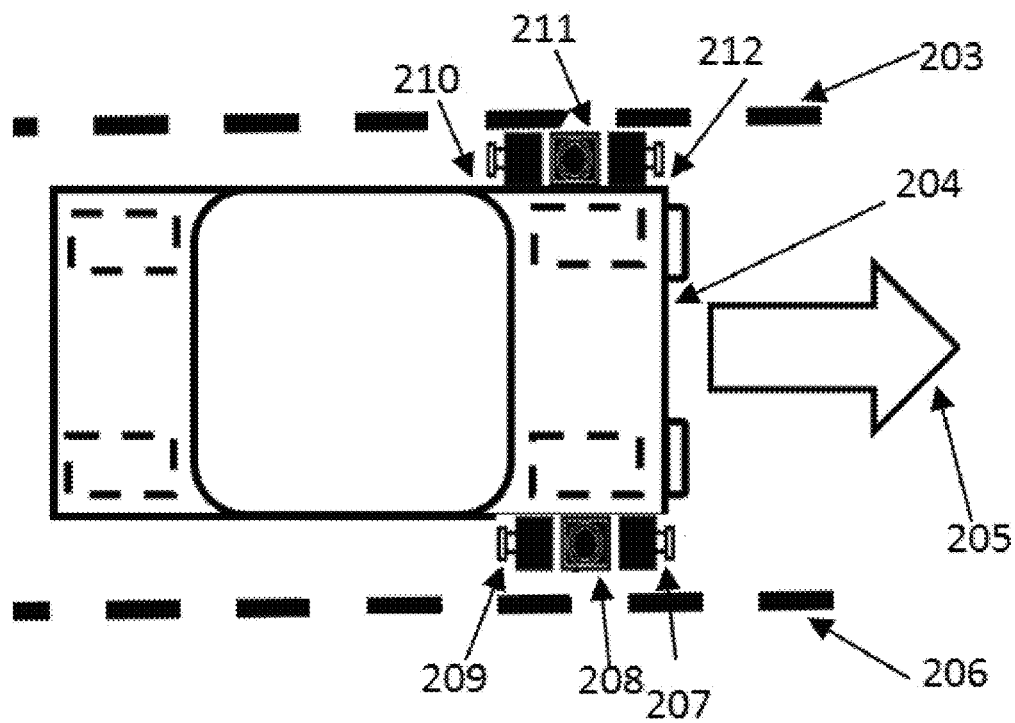
Figure 34:
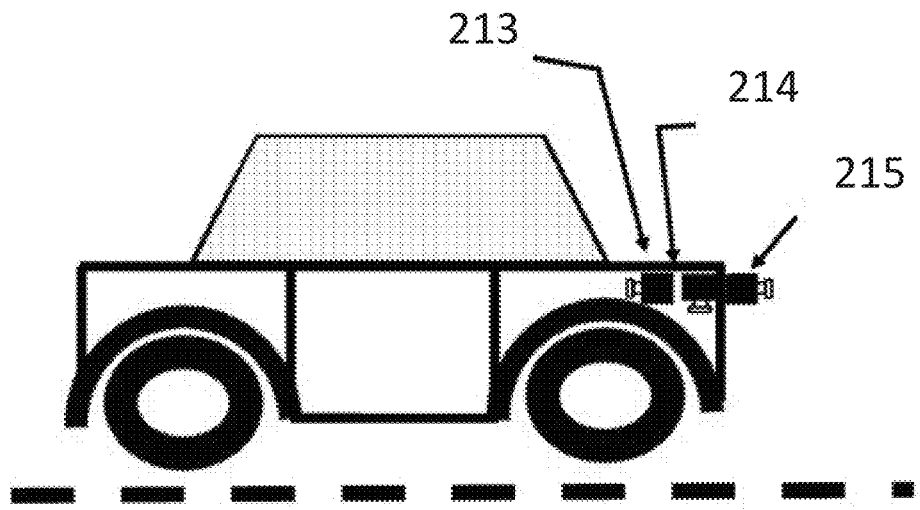
Figure 35:
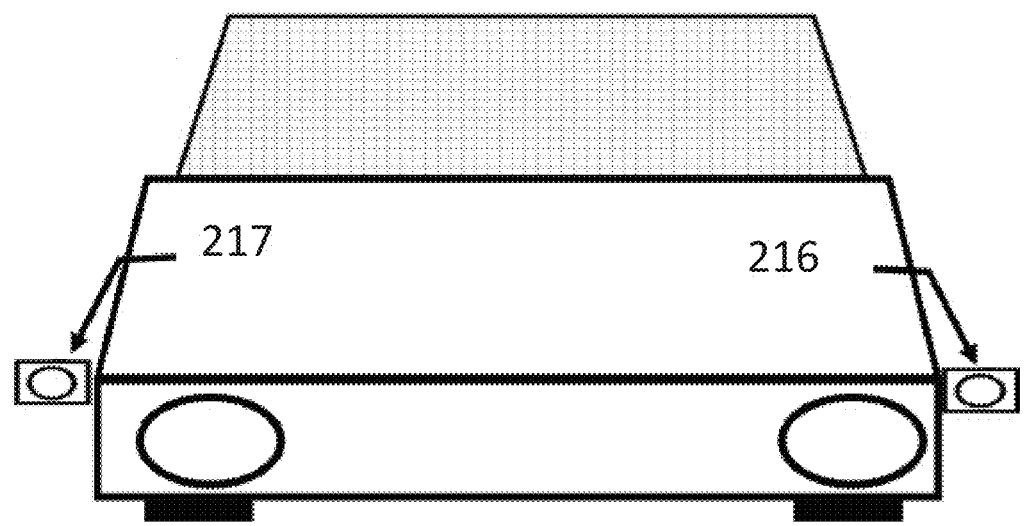
Figure 36:
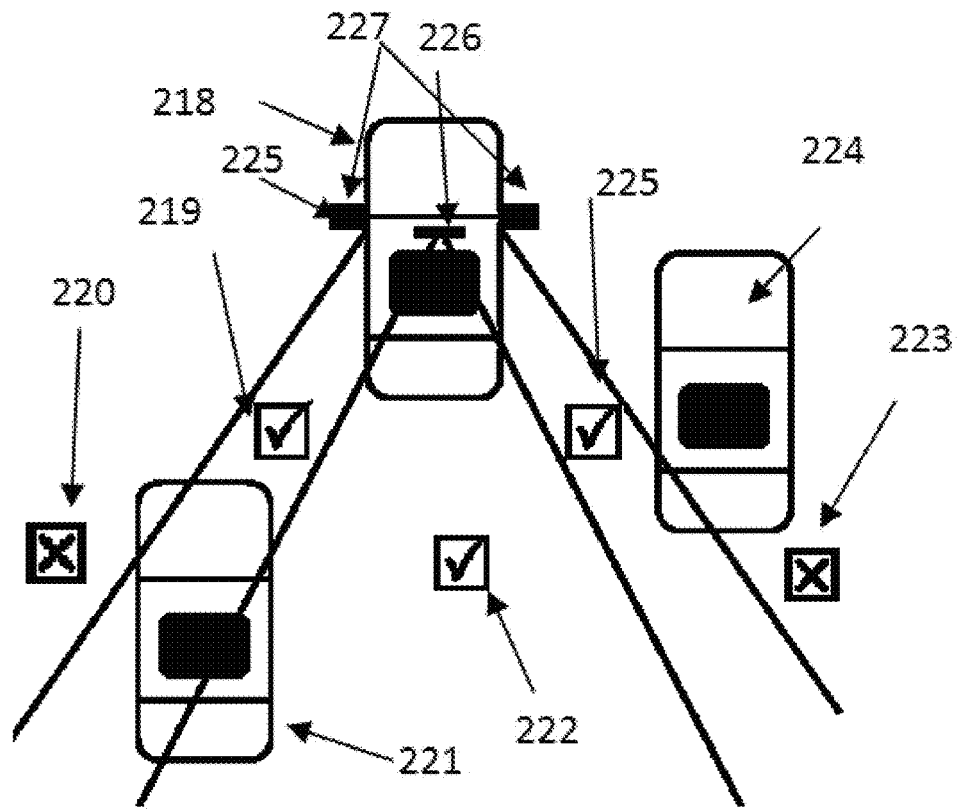
Figure 37:
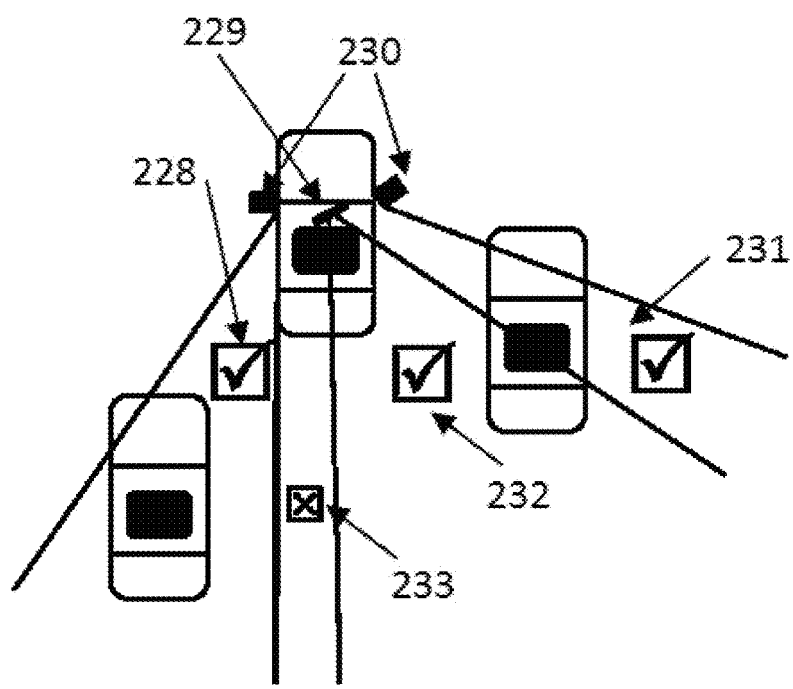
Figure 38:
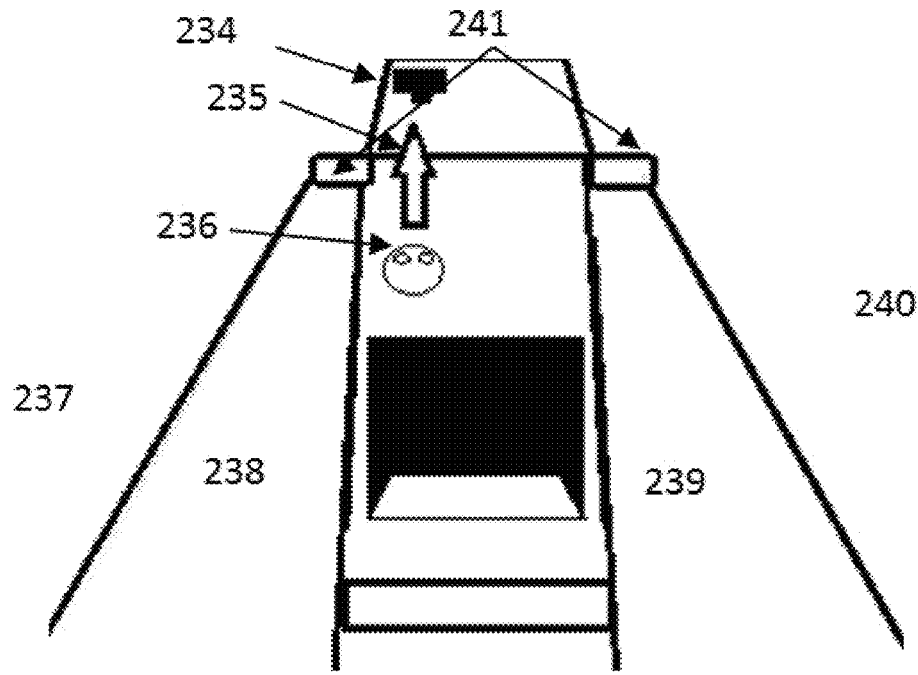
FIG. 38 schematically illustrates rear view mirrors and a camera to monitor the driver eyes and relay information to controller (Not shown)
Figure 39:
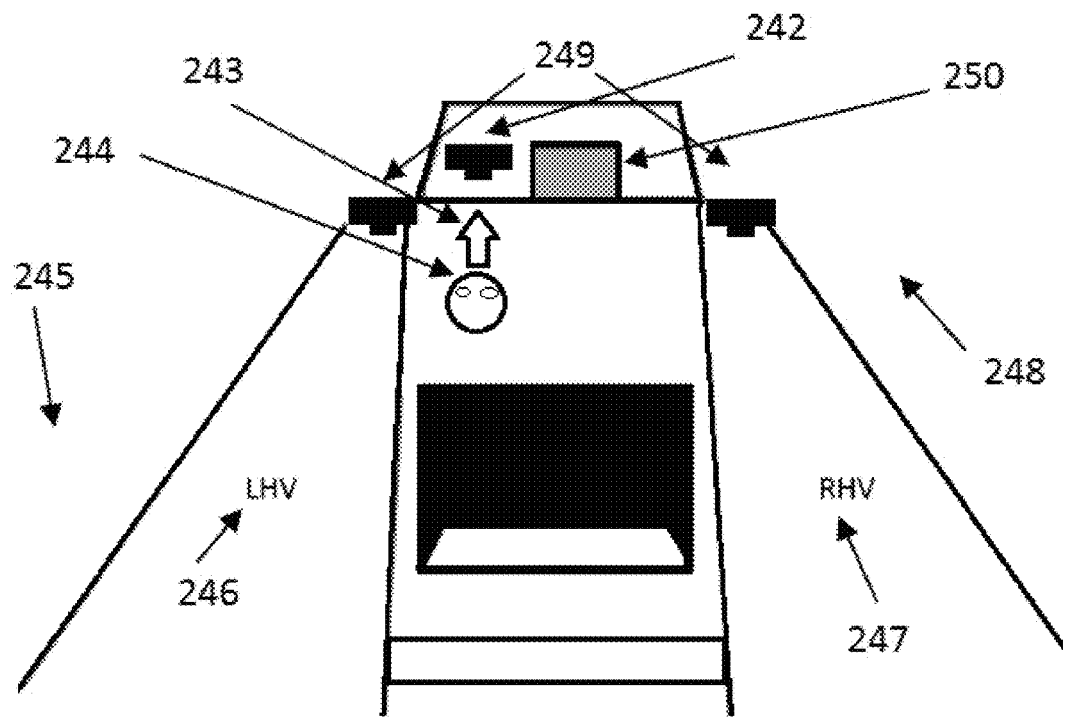
FIG. 39 schematically illustrates rear view mirror and a camera to monitor the driver eyes and relay information to controller (Not shown) then dynamically change the viewing angle of the mirror being looked at to scan the entire lanes for that side FIG. 40 schematically illustrates rear view cameras in place of mirrors, a screen and a camera to monitor the driver eyes and relay information to controller (Not shown) and a driver whose eyes are looking straight ahead FIG. 41 schematically illustrates rear view cameras in place of mirrors, a blank screen and a camera to monitor the driver eyes and relay information to controller (Not shown) and a driver whose eyes are looking to the left. The controller monitoring the eyes will then use the external right camera to capture the LHS view and displays it to on the screen FIG. 42 schematically illustrates rear view cameras in place of mirrors, a blank screen and a camera to monitor the driver eyes and relay information to controller (Not shown) and a driver whose eyes are looking to the right. The controller monitoring the eyes will then use the external right camera to capture the RHS view and displays it to on the screen FIG. 43 schematically illustrates top half of a haptic wheel with magnet installed around the peripheries FIG. 44 schematically illustrates lower half of a haptic wheel with magnet of opposite polarities installed around the peripheries FIG. 45 schematically illustrates an assembled haptic wheel from the side view in a casing FIG. 46 schematically illustrates an assembled haptic wheel from the side view in a casing with two other motion options, Push in and rocking motion to be carried by momentary switches, not shown, or detected from variation in the magnetic field on the lower disk is constructed from an electromagnet instead of permanent magnet.
Figure 40:
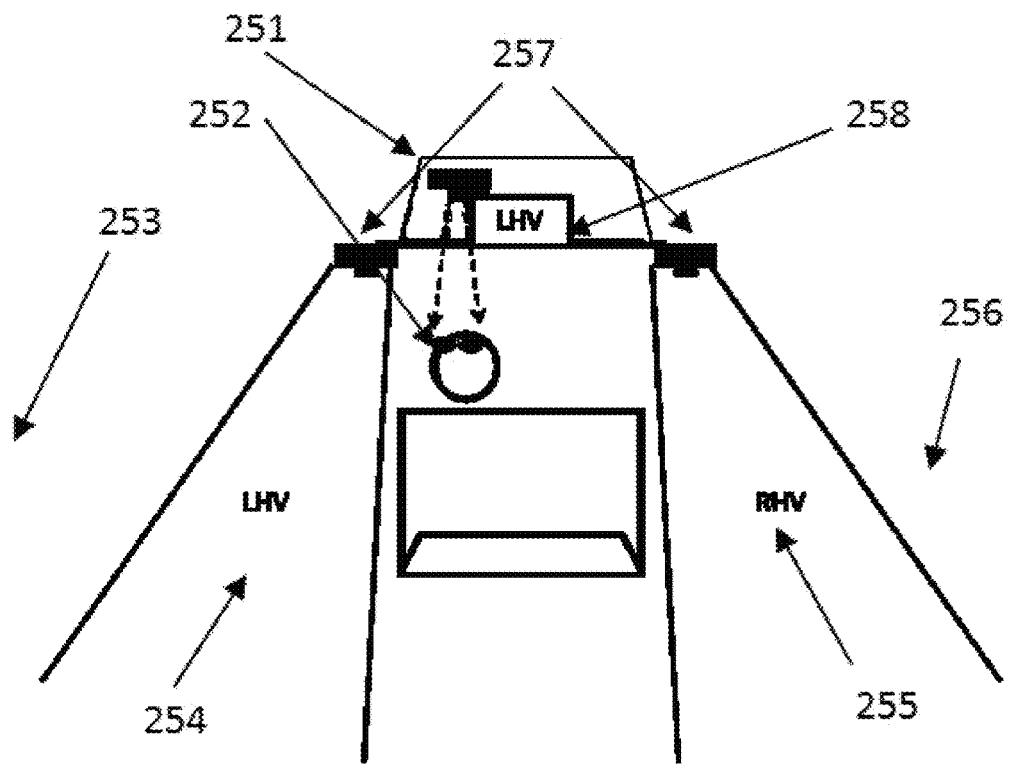
Figure 41:
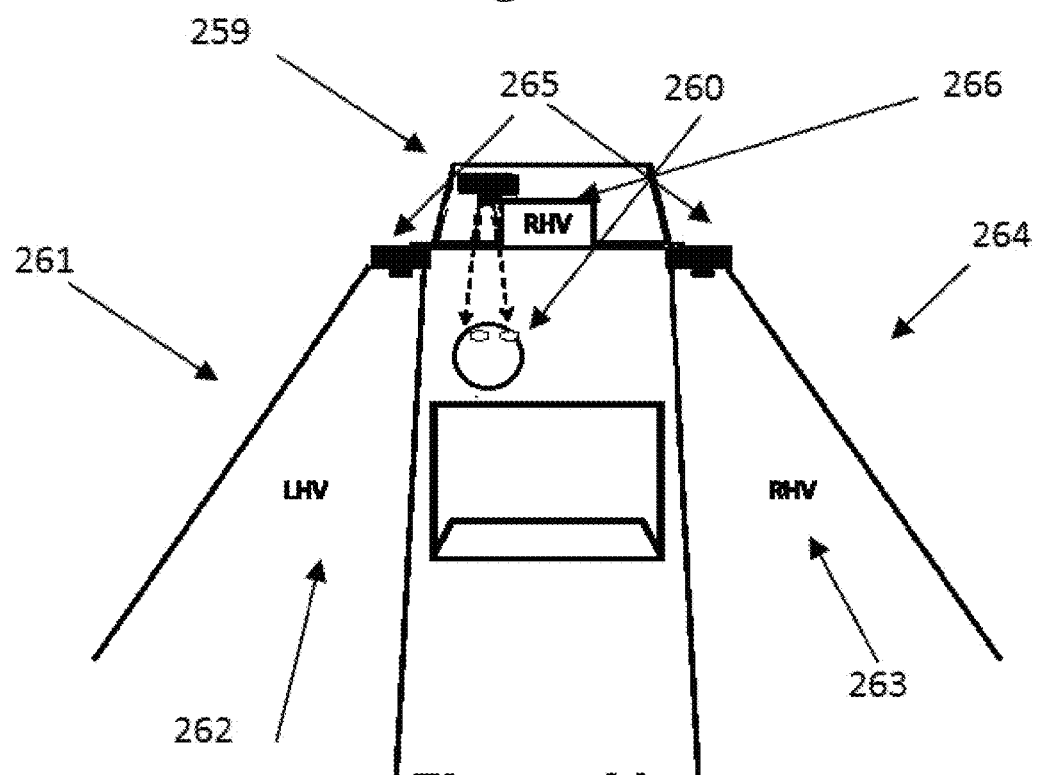
Figure 42:
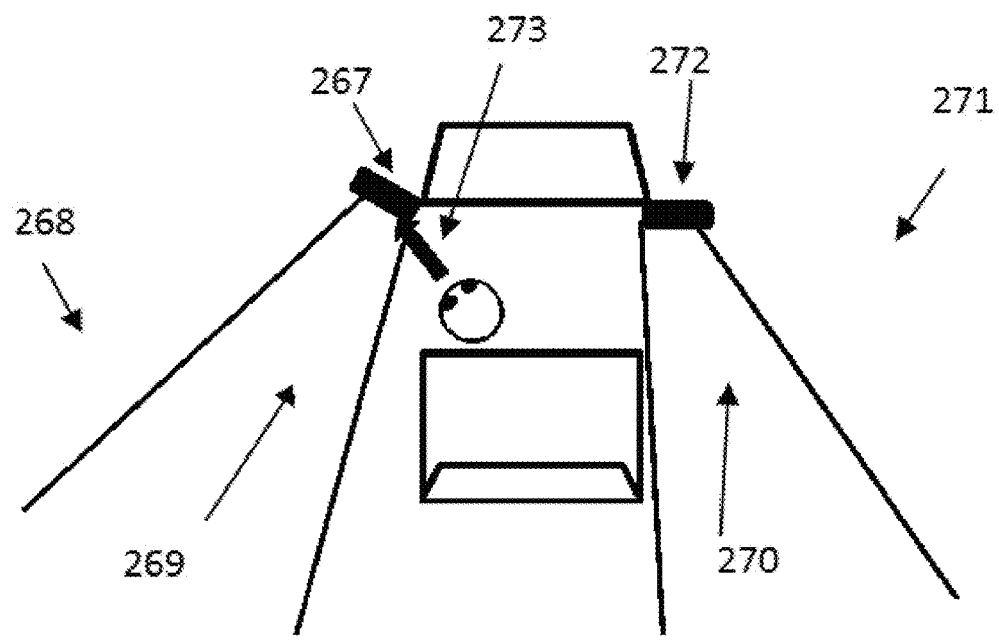
Figure 43:
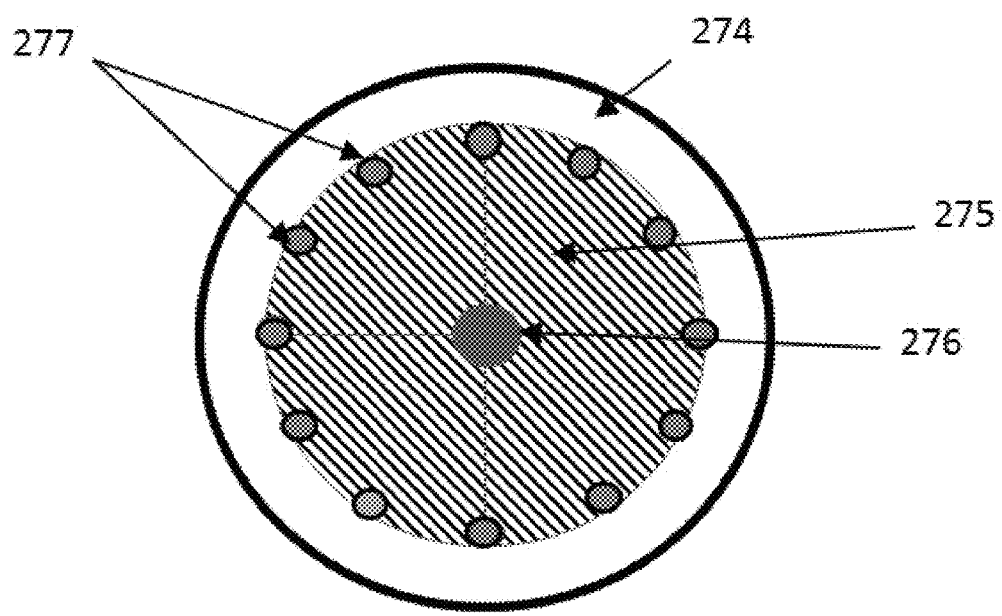
Figure 44:
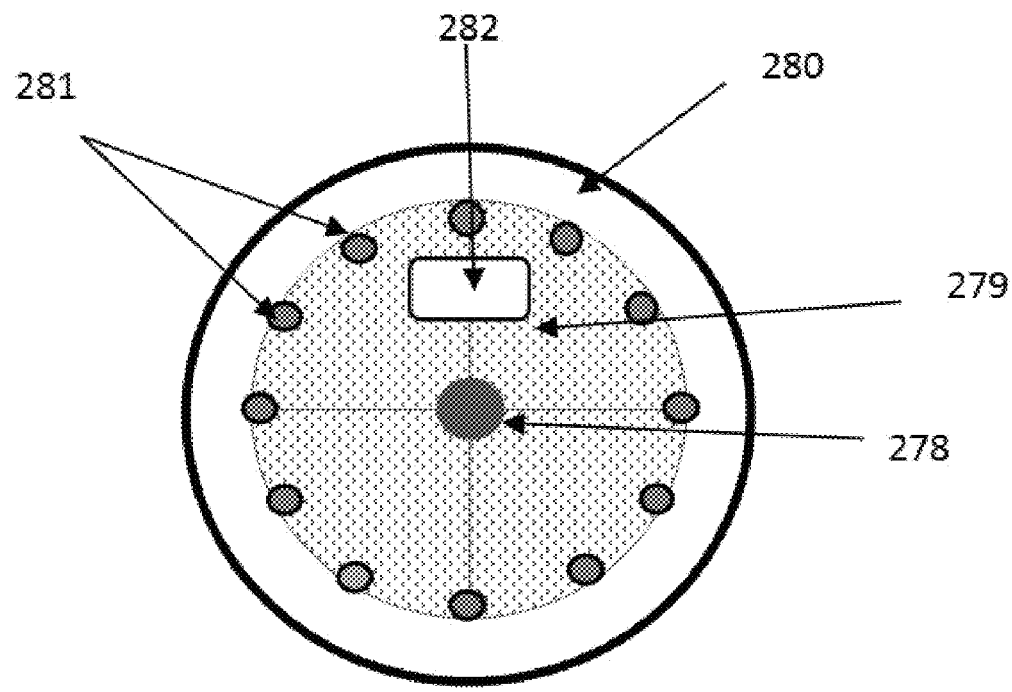
Figure 45:
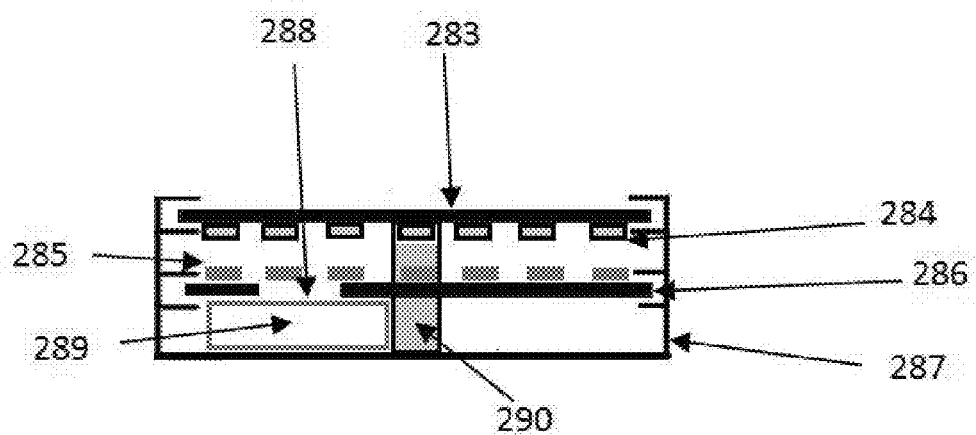
Figure 46:
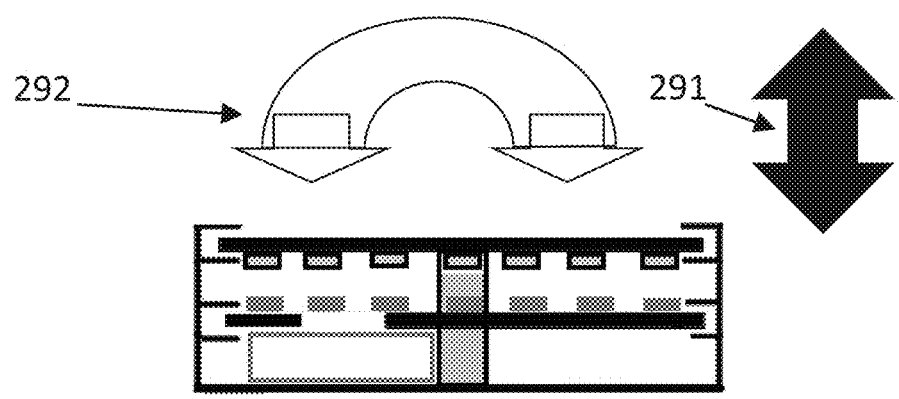
Figure 47:
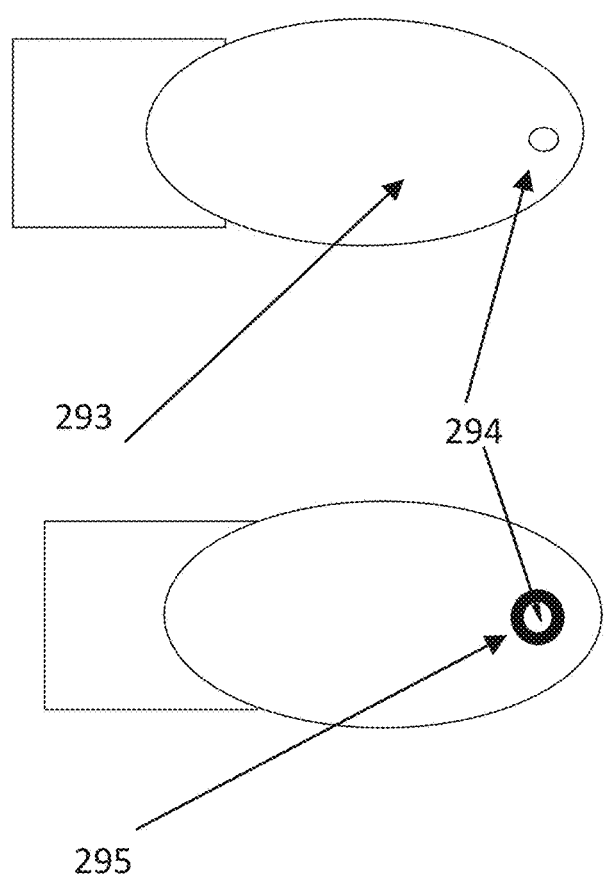
FIG. 47 schematically illustrates a rear view mirror with an indicator light usually used for blind spot alarm. The schematic also shows the same indicator light surrounded with non reflective surface FIG. 48 schematically illustrates one of two embodiments to evacuate fume from a toilet bowl FIG. 49 schematically illustrates a system and a method for Maximizing the use of Kinetic energy already generated by a moving vehicle
Figure 48:
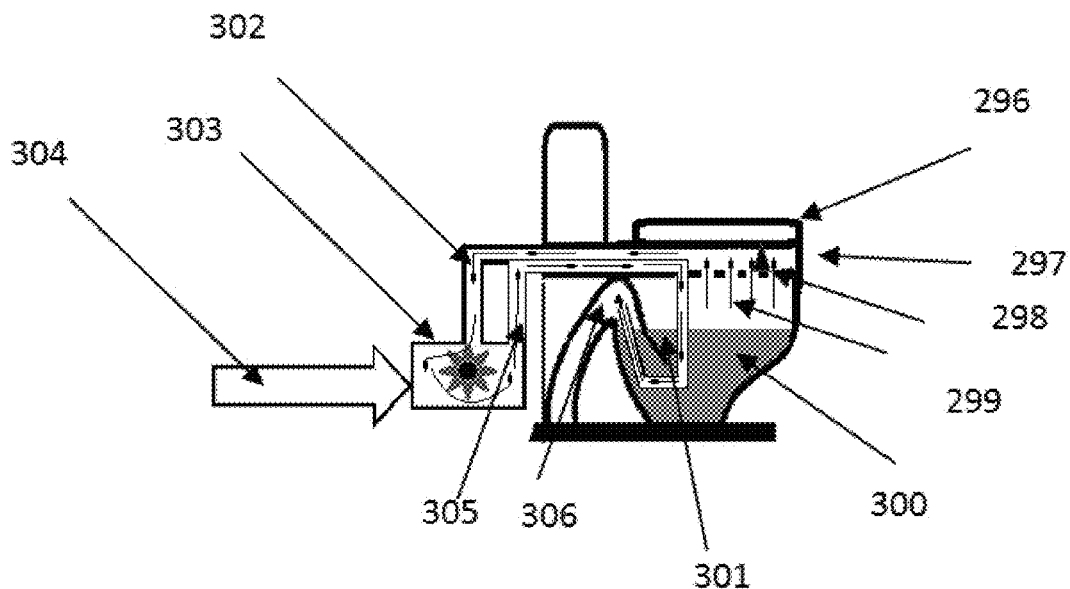
Figure 49:
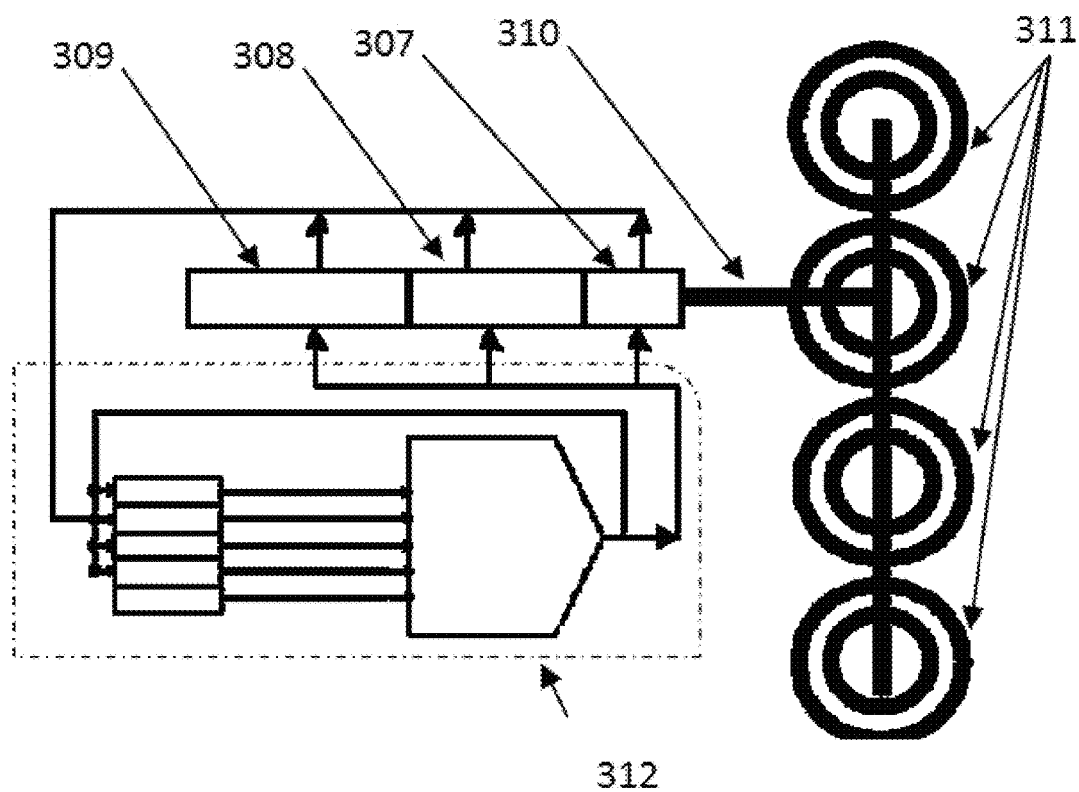
Figure 54:
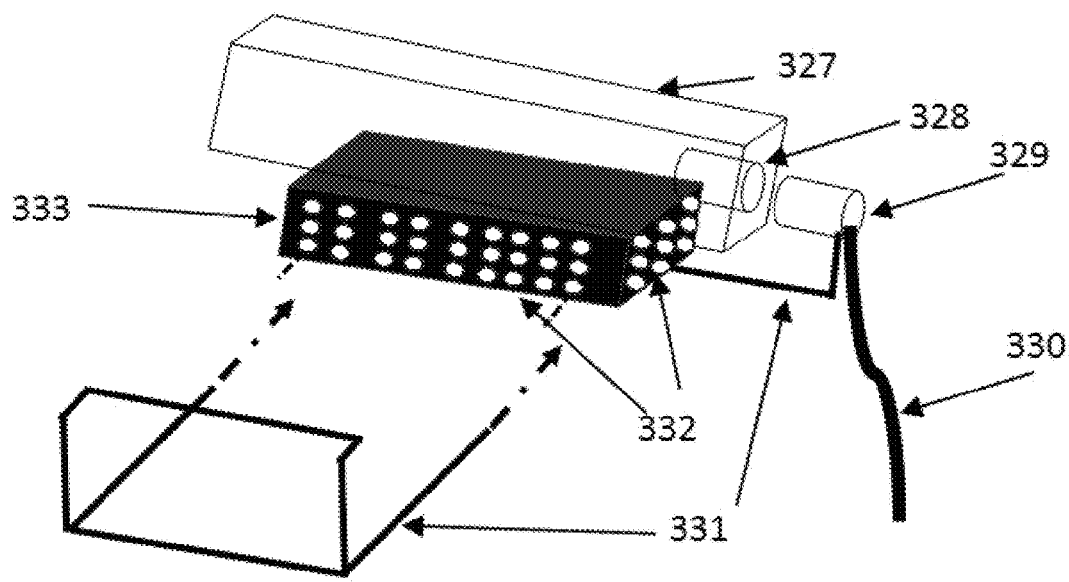
Figure 55:
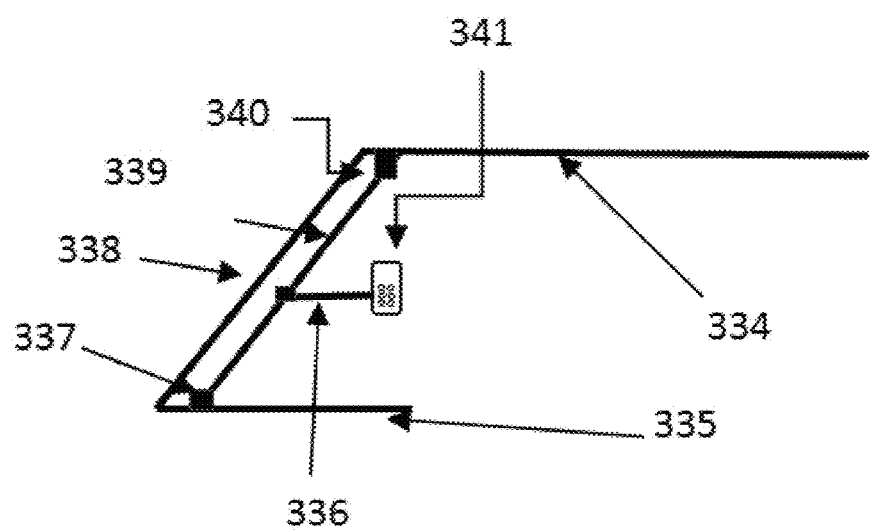

Another invention deals with Eco Battery for use with Windmills and other natural energy harnessing systems. It is basically using excess kinetic energy to store as potential energy for later use. The technology is spreading as a renewable energy source. The short coming here is when the wind is low or when the wind is high or when the demand on energy is low, these devices are shut down. Our proposed solution is for an environmentally safe storage solution of this power instead of turning off the system. From FIGS. 18: 115, 116, 117, 118, 119, 120, 121, 122, 123, 124, 125, 126, 127 and 128.

The solution consist of taking advantage of high wind to store the extra energy generated by the windmill instead of shutting it down as is currently done. The obvious solution is to use electrical battery of some sort (Capacitive, Chemical, Etc.) to store access power and then use the battery when the wind is low to generate electricity and supply the grid. The solution is obvious but not scalable (Battery implemented is all you get), not environmentally friendly (pollution/recycling/etc.) and the batteries will lose efficiency charging and discharging and as they age.

This invention can be applied to any energy harnessing system, but we will use the windmill as an example, but we are not limiting the embodiment to just windmills. The proposed solution consists of taking the existing windmill device and coupling it to an elevator carrying a container that can be of fixed or adjustable mass. The coupling is electrically to an electrical motor or mechanically to the elevator mechanism that may include a Gear arrangement/transmission to control the torque outputted by the windmill blades to match the amount of WORK required to lift the container.

Based on forecast of wind speed, the container can be filled or emptied so the amount of work required to lift it up to the top of the tower or to any specified height is equal to the amount of torque that can be generated by the expected high wind.

As the wind go back to normal speed or if the wind goes down to too low speed, the weight lifted will now be released and the gear arrangement between the elevator and the windmill and the elevator will disengage from the mechanics of the windmill and connect to the electrical generating part of the windmill thus causing the generator to turn as the weight descends to ground level.

The container can be of fixed mass or of variable capacity and of multiple separate containers. E.g. as container 1 reaches the top height another container can be added to the elevator cable and gets lifted to the top and the lifting will continue as long as the wind is too strong for the generator capacity.

The storing of the kinetic energy does not necessarily depend on the lifting weight, but it can also be in the form or winding steel spring or pressurizing spring coils or hydraulic fluid or any type of energy storage that can be converted back to mechanical energy without the need to process through a chemical conversion such as chemical batteries. This mean that we have an ecofriendly battery that have indefinite life While it will be appreciated, therefore, that while the invention has been described with respect to one preferred embodiment, many other variations, modifications and applications of the invention may be made.

Another invention is aimed at improved visibility to drivers to increase pedestrian protection and signs recognition. Windshield wiper does not have a perfect reach to clean the entire windshield. The result is dirty windshield or snow accumulation to a degree that a blind spot may for while driving during bad weather conditions.

This blind spot size is very considerable as compared to the "A" pillar The resultant blind spot can be a contributor to the "PERFECT STORM" that can cause a pedestrian to be hit by the driver car or mirror or to miss a special instruction sign or a countless other situation that can face a driver due to lack of clear line of sight to the surrounding. Classical wiper blind spot (129), Classical wiper clean spot (130), Classical wipers (131), Classical Wipe Line (132), New Wipe Line (133), Extendable Wiper (134), New Wipe Area (135)

The system/method recommended below may be used on a single blade windshield wiping system, or a multiple wiper system moving in both opposing directions CW for one wiper & CCW for the other wiper or in synchronous CW to CCW direction The windshield wiper mast or blade is made to expand its reach, at certain location on the windshield, and retract on others. The result is to cover the entire windshield service and not leave any part of the windshield un-wiped. The expanded reach can be accomplished via one or a combination of the following:

Multiple hinging that can retract at certain angle and expand on others, hydraulic actuator, pneumatic actuator, electromechanical means as in motor or electromagnetic repulsion/attraction Mechanical mean as in a Cam with a shape that can expand the blade/arm reach, at certain location on the windshield, and retract on others and a mechanism to retract the reach when needed using mechanical pull spring/vacuum/magnetic repulsion or attraction.

The CAM is an actual mechanical piece or a virtual software to effect a change in the amount of (outreach or retraction) actuation by a pneumatic or electromechanical actuator, such as a magnetic solenoid being used to change the length, or by a stepper motor and rack or a motor driving a screw thread.

The entire system can be activated any time a wiper is activated In city driving or heavy traffic as inferred by one or more or a combination of the following speed limit, vehicle memory navigation software, map data, other location based system such as using any type of wireless broadcasts with triangulation methods. The system can also be activated at the driver command using added functionality switching mechanism.

While it will be appreciated, therefore, that while the invention has been described with respect to one preferred embodiment, many other variations, modifications and applications of the invention may be made.

Another invention aims at squeezing more leverage from bicycle pedal by adding a CAM that causes the pedal arm to expand in length thus minimizing rider effort. 0 North Degree (136), Cam (137), Pedal (138), Proposed two pieces Expandable Crank with retractable mechanism (139), Disengage Point (140), Direction of travel (141), Spring/Retraction —Actuation Mechanism (142).

Bicycle pedal arms are of fixed length and the riders have to switch gears each time they want to improve their pedaling performance to overcome a hill or to reduce the effort of speeding up What is proposed here is an automatic lengthening of the pedal arm to various length based on the amount of torque needed or to a specific fixed length based on the current gear position to a standard fixed length always.

The elongation will start at the top of the cycle of rotation (NORTH) and continues based on the individual rider style or to a pre specified angle. The rotation angle is always calculated from north in the forward travel direction (to the front) Clockwise if looking at the bike from the RHS moving forward or Counter Clock wise if looking at the bike moving forward from the LHS The elongation can happen in at least the following ways: 1: Cam on each side of bicycle that pushes the movable portion of the pedal when it reaches the Zero North angle and retracts it with the help of a vacuum, or spring, sling or motorized mean. 2: Pedal Angle monitor that triggers an actuator top elongate the pedal when the Zero North Angle is reached and retracts it at an optimal angle based on the riders pedaling habit. 3: The pedal is designed to elongate automatically under slight tension from vacuum, spring or a sling depending on how much pressure a rider applies to the pedal.

While it will be appreciated, therefore, that while the invention has been described with respect to one preferred embodiment, many other variations, modifications and applications of the invention may be made, for example, the pedal arm may be powered by an electromechanical mean with a sensor at the rider foot contact with the pedal that detects increased pressure and automatically elongates the pedal arm to reduce the amount of effort being expanded by the driver while increasing the torque.

Another invention deals with projecting navigation information on the full road ahead. What is proposed here is two technologies to accomplish this.

The first technology proposes a HUD on the full size windshield so reality is merged with visualization, also known as augmented reality. The underlying technology used can be Clear display technology that can be mated to the intricate curvature of the windshield such as "Curved OLED", AMOLED, Flexible OLED, Thin Film Transistors (TFTs), Self-Aligned Imprint Lithography (SAIL) technology or other type of Organic user interface (OUI), or a projection onto the windshield using LASER or other type of projection technology. Street r4 (143), Stop sign (144), Street r5 (145), Stop sign (146), Designated routing (147), Stop sign (148), Stop sign (149), Stop sign (150), Stop sign (151), Street r2 (152), Stop sign (153), Stop sign (154), Stop sign (155), Street r1 (156), Street r3 (157), Stop sign (158), Stop sign (159), Stop sign (160), Stop sign (161), Designated destination (162), Cule de sac 1 163), Cule de sac 2 (164), Compass (165), Designated start point (166), Car icon (167), Windshield (169), Driver (170), Birdseye view of a map on a HUD (171), Map of segment "a" on street r main in 3D view on a HUD (172), Map segment on "b" r1 in 3D view on a HUD (173), Map segment on r4 "c" in 3D view on a HUD (174), Map segment on Cule de sac 1 in 3D view on (175), Projection of segment "a" directly onto street r main pavement (176), Projection of segment "b" directly onto street r1 pavement 177), Projection of segment "c" directly onto street r4 pavement (178), Projection of segment "d" directly onto Cul de sac 1 pavement (179).

The computer will know the eye level of the driver from seat position/height/recline angle, previously entered data about driver dimensions adjusted to current positions or possibly an optical sensor/a camera or other type.

The controller will then calculate projection & size of directions & display them on the windshield/LCD combo. The displayed directions will look to the driver as if they are painted on the street Other things can also be displayed such as street names, street signs, known pot holes, etc. The graphics displayed will still be more clear than opaque and will be projected to ground level viewing angle/perspective so the view is not a screen view, but more like a painted road view as if the road was specifically painted to show the specific driver the direction to the specific trip.

When displaying street names or traffic signs the system will display them in an area that is not obstructive of the driver line of site where most likely they should be based on local civil engineering standards. The bonus of such feature is that it will permit the driver to read street names in his native alphabet/character if he is in a foreign country. The display will be more clear (vs. opaque) then the virtually painted direction line on the ground. If a driver is approaching a cross road traffic sign and does not show a tendency to obey the sign (e.g. Stop signs, Yield sign, Blind child in area sign One way Sign, Rail Road Crossing sign, Pedestrian crossing sign, or any other safety sign) The display will flash the sign at its correct perspective, to draw the driver attention to the sign.

Embodiment 2: The HUD is projected onto the entire front windshield using LCD projector that utilizes an LED diode for projector lighting. The computer will know the eye level of the driver from seat position/height/recline angle & possibly an optical sensor/a camera or other type.

The controller will then calculate projection & size of directions & display them on the windshield/LCD combo. The displayed directions will look to the driver as if they are painted on the street. Other things can also be displayed such as street names, street signs, known pot holes, etc. The graphics displayed will still be more clear then opaque and will be projected to ground level viewing angle/perspective.

When displaying street names or traffic signs the system will display them in an area that is not obstructive of the driver line of site and will be more clear(vs. opaque) then the virtually painted direction line on the ground. If a driver is approaching a cross road traffic sign and does not show a tendency to obey the sign (e.g. Stop signs, Yield sign, Blind child in area sign One way Sign, Rail Road Crossing sign, Pedestrian crossing sign, or any other safety sign) The display will flash the sign at its correct perspective, to draw the driver attention to the sign.

The second technology involves projecting a light source onto the road itself with distinct marking to act like a yellow brick road or bread crumbs that the driver can follow without having to look at a screen. The projection can still provide all the benefit of the screen based system but instead of projecting it on the screen, it will project it on the road. For example, the light source can show a pot hole in red or a lane that will end will be shown as red instead of blank (without any marking) both proposed HUD will be particularly useful in areas where the road is covered by snow or where street signs where vandalized or destroyed by storms, etc.

While it will be appreciated, therefore, that while the invention has been described with respect to one preferred embodiment, many other variations, modifications and applications of the invention may be made.

Another invention deals with detecting an abnormal walking behavior and comparing it to normal walking behavior to determine intoxication, stress or other physiological ailment. Up/Down motion (180), Side To Side motion (181).

Identifying changes in a person walking behavior and acting up on it is possible via walking patters is possible today using one of the many portable devices today that contain gyroscopes (MIMS/accelerometers). We previously stated that a driver can be identified to the vehicle via a portable profile on a telematic device, preferably a phone, and that such profile houses a variety about the driver own physiology, behavior, preferences, calendar, and other historical factors. With this invention, we are elaborating on the physiological element by specifically using it to detect when a driver approaching his car is under stress or under influence of alcohol by changes in his movement in terms of frequency, speed etc.

The MIMS in the current devices are on all the time and they can be used to monitor the pattern of a person walking pattern to identify him and then provide him with automatic access or to ban access or any other identity based functions such as a house or a car. The profile is built up from base information about a driver physical dimensions and possible walking pattern and adjusted statistically over time in association with environmental factor, location factor, time of day, day of year, day of weak, geographical factor. The other factors can also be considered such as approaching a vehicle, approaching a house door or approaching a mall door. Information implied by the change in the walking behavior, will indicate an event and will in response trigger an event in the receiving part, such as opening the door to a store faster, or to locking the store door because the walking behavior indicates an aggressive tendency.

When humans or animals walk they do so in a unique way. The walk is actually a sinusoidal wave on the vertical movement and also to some degree on the horizontal level. More complex frequency based movement can be documented in the 3 dimensional space.

The portable device will also be time sensitive and walking surface sensitive, so a road, a downhill road, climbing up steps or a ladder, or going down steps a ladder will have different profile, so the device may need to be aware of the location of the driver walking activity Location/topography awareness may be brought into the system using architectural and topographical maps, but can also be brought in from wireless telemetries where the device can ping stationary wireless devices to determine linear distance and then convert to a 3D map, or it can listen to pings from other devices that are stationary and then plot its position based on their known location.

The device can also be used to identify deterioration in the physical health of the walker. This can be used for detecting drunk or buzzed drivers before they get into the vehicle. It can also be used to detect walking problems that the walker got used to or a deterioration in the sole of the shoe and other abnormality that can lead to a tripping and falling in case the walker has to perform running or speed up climbing stairs or walk on slippery surfaces.

While it will be appreciated, therefore, that while the invention of system and method for a: collecting information about a specific person walking style, b: analyzing the information to adjust raw information about the driver physiology and projected walking style based on body dimensions c: storing the information d: Identifying a walking person from their walking style and comparing it to their statistical Normal to see if they are tired, under influence, stressed, etc. and to act on predicted state for simplify legal, safety, health and service factors, has been described with respect to one preferred embodiment, many other variations, modifications and applications of the invention may be made.

Another invention is dealing with detecting vehicle position in road lanes by detecting 3D objects and calculating distances from them using trigonometry vectors calculations. Land mark to be used in measurement (Natural formation) (182), Land mark to be used in measurement (Natural formation) (183), Land mark to be used in measurement (Natural formation) (184), Land mark to be used in measurement (Natural formation) (185), Land mark to be used in measurement (Natural formation) (186), Land mark to be used in measurement (Landscape horizon line) (187), Land mark to be used in measurement (188), Land mark to be used in measurement (Chimney) (189), Land mark to be used in measurement (Chimney) (190), Land mark to be used in measurement (Ornamental design) (191), Land mark to be used in measurement (Chimney) (192), Land mark to be used in measurement (Chimney) (193), Land mark to be used in measurement (Building roof corner) (194).

The Lane departure warning using cameras with memory of vertical references. Current Lane departure warning devices follow the white and yellow marked lanes to determine if the vehicle is drifting out of lane. When covered with snow, the cameras are useless. When covered with water the road will have an optical effect or even reflect the sun during the day and the headlights during the nights. Other form of failures include worn out lane marking, shine road surface at certain time of days and double marking and similar mishaps which is usually seen in construction area.

In our previous project, Infrastructure/Intelligent Notification, we suggested placing RFID in the lane marking or introducing metal contents to each strip that will identify it to be detected by a on vehicle detector. While those are workable solution, they are outside the current accepted technology trend and using a camera is easier to deploy from a technology and cost acceptance perspective since they do not require expensive infrastructure investment.

This device will use a camera technology similar to what is used today, but instead of just reading the lane, the camera will read any other feature around the vehicle, e.g. poles signs, bridges freeway dividers, trees, mountains etc. The CPU recording the information will make a reference between the vehicle location with respect to the lanes and with respect to the other objects the camera is receiving, including objects with a known location on the vehicle itself, i.e., emblem, fender corner, etc. . . . . A mathematical image of the actual location with respect to the vertical objects will be drawn in the memory with respect to the vehicle position in the lane and stored locally and remotely.

Natural or accidentally available man made feature does not have to be the only source for a reference point. Intentional landmarks can be installed so they are recognizable by an optical sensor to use in calculating the position of the vehicle. While wireless technology can be used in triangulating a location and can cover a wide range, and so does a GPS/Glasnost signals, the resolution is usually not as fine as it will be from a camera observing the immediate surroundings.

Alternately, the vehicle will have access to a database and a geo location sensor that is used by the controller receiving the information from the camera to correlate what the camera is sensing with data about the 3D environment so the controller can use the correct reference to calculate the vector to the reference point and thus identify the location of the vehicle on the road.

The data is shared across the remote data source subscribers and reinforced and corrected for various lighting conditions time of day, day of year, type of weather and any other optical changes or blockage that take place due to cloudy weather, change in paint color, shadow, shades etc. The remote data sharing/storing source is a remote computer and memory located on a car, LAN, WAN and Internet using wireless RF or Optical or Sonar communication technology.

Eventually, the line following camera will no longer be the only thing to rely on during the drive and the other data will be used to substitute for the lane following technology. Sample photos from real roads that show features other then lanes that can be used as a reference to determine vehicle position within a lane.

While it will be appreciated, therefore, that while the invention has been described with respect to one preferred embodiment, many other variations, modifications and applications of the invention may be made.

Another invention is about roof rack on vehicles. These are utilitarian equipment, but they are an eyesore and cause wind noise as well as increase drag on the vehicle and effect fuel efficiency. Fully deployed Rack (195), Roof liner (196), Fully deployed Roof Rack (197), Roof liner (198), Fully Retracted Roof Rack (199), Roof liner (200), The proposed improvement here is a collapsible and stylish Roof Rack that retracts flat into the roof when not needed. The rack will consist of a main support beam, one for each side of the vehicle in the forward travel direction. The beams are mounted on one or more vertical beams via joints. The joints are at the roof and possibly at the beams. They lock in the upright position when needed to support a n item or they can lay flat into the roof line when not needed. They can have an optional beam or more between both beams to provide additional strength if needed.

While it will be appreciated, therefore, that while the invention has been described with respect to one preferred embodiment, many other variations, modifications and applications of the invention may be made.

Another invention relates to Lane departure cameras designed to avoid sun wash, surface glare, etc. The current Lane departure cameras suffer from multiple disadvantages one of which is glare from the sun or reflection of light on a wet road and snow covering the road or poorly maintained delineation marks. Left Lane Marking (203), Vehicle (204), Vehicle Travel Line (205), Right Lane Marking (206), Forward Looking Camera (207), Downward Looking Camera (208), Backward Looking Camera (209), Backward Looking Camera (210), Downward Looking Camera (211), Forward Looking Camera (212), Backward Looking Camera (213), Downward Looking Camera (214), Forward Looking Camera (215), Forward Looking Camera Left (216), Forward Looking Camera Right (217)

The system to avoid this will consist of a camera that can rotate between at least two positions or multiple cameras hocked up to a controller system that can select which camera to use based on environmental conditions restricting the benefit or a forward-looking camera.

The camera or cameras will preferably look in at least two direction, forward, downward and/or look backward. This selectivity allows the camera to track the lanes on the road without being effected by a glare so it always has an angle that is glare free Once a clear image is captured, the camera signal is processed as the current technology does, but the drift will be detected differently using the back view than the side view than the front view.

The front view will tend to project where the car will be based on drifting from an absolute/ideal center, while the mirror looking down will determine how far it is from the lane and if it is getting closer, e.g. drifting in the direction of the late or getting father out such as it is drifting away which means it is in danger of drifting away from the other side of the lane. The rear view camera will define drifting based on the where it was and where it is not with respect to an absolute/ideal center. A system to avoid glare or sun wash consists of a camera that can rotate between at least two positions or multiple cameras hocked up to a controller system that can select which camera to use based on environmental conditions restricting the benefit or a forward looking camera. The camera will preferably look in at least two direction, forward, downward and/or look backward. To track the lanes on the road without being effected by a glare so it always has an angle that is glare free.

The same system can be used to double as a rear view mirror support or alternative so that when the lane departure function is in use, the driver to see the side view/lanes in preparation of changing lanes can override it. In that case, the override signal will indicate that the driver is changing lanes intentionally and the O/S will switch off the lane departure application and will provide the visual cues to the departure.

Such camera may also be able to calculate distance gap and other vehicle speed and recommend to the driver if a lane change is possible under current conditions or if other changes are necessary. It can also recommend breaking or directly apply the brakes in case the vehicle ahead is stopping suddenly or is slowing down.

Such camera may also be able to perform another safety feature by being aware of Geo Heading/Bearing/Latitude/Longitude/Time of day, Day of week, day of year month of year week of year inclination in road as well as current forecast for dust, pollution and precipitation to adjust an image recognition software to filter out an expected sun glare at an upcoming turn, etc.

The Camera may also be attached to a controller and the controller drivers mechatronic mechanism to swap optical filter for the lens to avoid sun wash effect and other undesirable imaging source.

While it will be appreciated, therefore, that while the invention has been described with respect to one preferred embodiment, many other variations, modifications and applications of the invention may be made.

Another invention relates to Interactive menu for phones. Usually when a caller contact a service company, he is asked to listen to the prompts and answer verbally or by pressing a button. The problem here is two folds. The first, is the time is takes to listen to the options and try to figure out which one is more suitable, then remember the correct option and press it.

This invention will allow the caller to start with a visual menu from an app on the phone. The app will display the options and the customer can select the options right from the screen and in case of an error, the app will permit that he go back to the previous menu. As it's usually done in menus on an app or on a browser. Once the customer is at the end of available options, the app will dial the customer service center, give all the necessary information to the operator who will proceed with the help without all the wait The menu can be an app provided by the service provider, or it can be a web page on the service company website.

So basically, the system uses a screen from a mobile device to interact with a remote system when selecting from multitude of options before being routed to a final destination The remote system will detect if the caller is calling for a system equipped with a screen, e.g. phone, the remote system will enter into an interactive visual mode where it will display available options in a language or in icons so the user can visually and quickly navigate the menu because visual interaction is much faster than audible interaction.

While it will be appreciated, therefore, that while the invention A system or a method applied on a phone or a website on a phone that interacts with a remote system when selecting from multitude of options before being routed to a final destination. The remote system will detect if the caller is calling for a system equipped with a screen, e.g. phone and instead or reading verbal prompts that may be too numerous and the user may forget them, the remote system will enter into an interactive visual mode where it will display available options in a language or in icons so the user can visually and quickly navigate the menu because visual interaction is much faster than audible interaction, has been described with respect to one preferred embodiment, many other variations, modifications and applications of the invention may be made.

Another invention relates to Thumb Wheels which use mechanical means for creating haptic feel and use encoders to translate the changes in position. This mechanical system can be expensive, especially if the haptic feedback extends to control of the thumb wheel as well. Vehicle (218), Area visible by outside left Side mirror (219), Area NOT visible by outside left Side mirror (220), Vehicle in adjacent left lane (221), Area visible by inside Rear view Mirror (222), Area NOT visible by outside right side mirror (223), Vehicle in adjacent right lane (224), Area visible by Outside right Side Mirror (225), Inside Rear View Mirror (226), Outside Rear View Mirrors, left side and right side (227), Inside Rear View Mirror after modification of angle (229), Outside Rear View Mirrors, left side and right side after modification of angle where outside right side mirror entire body have moved, but the left side mirror had its mirror only move (230), Area visible by Outside right Side Mirror after modification of angle (231), Area visible by inside rear view mirror after modification of angle (232), Area Not visible by inside rear view mirror after modification of angle (233), Camera monitoring driver (234), Direction of travel/driver vision (235), Driver head and eyes looking in the direction of travel (236), Area NOT visible by outside left Side mirror (237), Area visible by outside left Side mirror (238), Area visible by Outside right Side Mirror (239), Area NOT visible by outside right side mirror (240), Outside Rear View Mirrors, left side and right (241), Camera monitoring driver (242), Direction of travel/driver vision (243), Driver head and eyes looking in the direction of travel (244), Area NOT visible by outside left Side camera (245), Area visible by outside left Side camera (246), Area visible by Outside right Side camera (247), Area NOT visible by outside right side camera (248), Outside rear view cameras, left side and right side (249), Screen to display vehicle application, (250), Camera monitoring driver (251), driver vision direction (252), Area NOT visible by outside left Side camera (253), Area visible by outside left Side camera (254), Area visible by Outside right Side Mirror (255), Area NOT visible by outside right side camera (256), Outside rear view cameras, left side and right side (257), Screen to displaying left side outside camera views based on the direction of the driver (258), Camera monitoring driver (259), driver vision direction (260), Area NOT visible by outside left Side camera (261), Area visible by outside left Side camera (262), Area visible by Outside right Side Mirror (263), Area NOT visible by outside right side camera (264), Outside rear view cameras, left side and right side (265), Screen to displaying right side outside camera views based on the direction of the driver vision (266), Right side mirror at an angle to show blind spot (267), Blind spot further to the left of the car (268), Visible area shown by the left side mirror when at an angle (269), Left side mirror standard angle view (270), Left side mirror standard blind spot (271), Right side mirror at a standard angle (272), Driver vision direction (273), What is proposed here is a rotary switch that uses optic for detecting movement and magnet for creating a haptic feedback. The magnet maybe permanent magnet, but it can also be electromagnet to provide the designer with variable detent using the same switch or to provide dynamically changing detents based on different operational conditions. The Thumb wheel will consist of two circular plates, a rotating plate and a fixed plate.

The rotating plate is circular and pivots over an axis that goes through its center and through the center of the fixed plate. The axis has mechanical means to support pressure on the farthest part of the wheel from the center, but the edge of the upper plate may also overlap a mechanical support lip designed with low friction specifically to support the plate.

The entire sensor can act as a momentary switch by being pushed down so the top and lower wheel are pushed down as one piece and the push is recorded by a momentary switch, an optical trip sensor or a strain gage, etc. Alternately, the top wheel may be pushed down individually with the shaft supporting it and register a push down action using momentary switch, an optical trip sensor or a strain gage, etc or by recording the changes in the magnetic field produced by the electromagnet from the lower field or another detection circuit (RLC) that can detect the change in the magnetic field between both wheels.

Another feature is to have the entire sensor act as a rocker switch with the addition of a swivel axis in at least one area so the entire housing can rock in one direction and the opposite direction in addition to the rotation action and the up down action. The rocking can be detected from sensor within the axis, or with a level change detector, e.g. bubble, two momentary switches on each end of the rocking action or a single transducer that can detect changes in separation via While it will be appreciated, therefore, that while the invention Programmable rotation haptic jog/dial switch or a slide switch that does not use mechanical gears or vibrators, but can be programmed to provide variable detents, has been described with respect to one preferred embodiment, many other variations, modifications and applications of the invention may be made.

Another invention relates to Monetizing and rewarding data sharing for drivers. A controller in a vehicle, or a portable telematic device that is capable of collecting data from vehicle and transmitting them to the outside world wirelessly. The data is anything that the vehicle can produce through their bus system or through any additional monitoring devices that can be incorporated to the vehicle or simply carried or placed in the vehicle but can communicate physically or wirelessly with the controller or the outside world directly.

The data transmitted from the vehicle is then received at least in one location, evaluated assessed and weighed based on value to others or the program, as it relates to man machine environment history and regulation. It is then credited to the vehicle driver or account owner, depending on who owns the right to the trip, and then a suitable reward is applied to the account that can be translated to savings, free gifts, points toward a reward or even cash.

The data is compiled with other accounts data to present options for safe driving, efficient driving or directions or suggestions or recommendations or evacuations or emergency.

The data from the compiled accounts or a statistical representation of the data is then shared by others based on their preferences and need as it relates to Man, Machine, Environment, History and regulation. Either through the controller or over the internet or over the radio or via e-mail or text messages or audible computer generated messages via voice lines or wireless lines or VOIP lines or wireless VOIP.

The administrator of the account will support the program by one of many ways which can be fee based accounts, advertising based, coupon based, or data leasing based. The administrator may disable a user participation in the program and blocks such users and the users authorized persons or entity from registering or using data on the system if the administrator deems that the data being provided is causing statistical shift in the data normal or if the data is an outlier. Such data may include falsified data, made up data (Not a real time data) edited data, data that shows too high of a speed, to high of an acceleration rate, deceleration rate, zigzagging, intoxication and anything that shows an illegal or wrong driving data that is outside the norm of safe driving, legal driving, traffic flow driving, weather condition driving.

Electronic transactions are turned into data and are being gathered at unprecedented rate. These transactions are gathered through browsing, e-mails, purchasing, driving, shopping or simply appearing in the view of a security camera or from the position of communication devices or the content and the communications of such device.

Many companies are using the data collected from their customers or their patrons to accrue more income for their company by trading the data for cash as in advertising on search engines (Pay per click) or by swapping data to mitigate risk, as in extending credit to customers that did business with a competitor or an alternate lending.

The opportunity here is that companies are using consumers data to make money but they are not giving the consumers any share in the revenue, so a business model that accepts membership by opting in or by buying a device that implicitly implies entering the communal program.

Communal data storage and sharing, and applications staging center that can be accessed by commune participants (individuals, groups, corporations and governments) to store and share their data and to use applications unique to their purpose or common with at least one other commune member. The commune data is sorted for patterns and volumes that can be monetized by the commune management with profits shared among all commune members whose data was sold, leased, used or shared with another commune. The commune depository can be accessed through a land data line, through mobile data terminal operating autonomously or under partial human control, through direct access of bank account, debit card account, credit card account, accounting software on a computing medium, or by manually entering data or scanning receipts and other similar methods.

The data consists of man, machine, environment, history, regulatory, mobility, purchases, medical, eating, place of living, working, driving, etc. The applications are computer application for use at home, work, while driving or commuting to work.

The commune member may authorize the commune to get data collected about the members from other sources, including medical treatment, credit card purchases, driving habits, travel destinations, carbon reduction, etc. The commune member may authorize the sale or trade of data collected about the members from other sources, including medical treatment, credit card purchases, driving habits, carbon reduction, etc.

The benefit to the commune member is in accumulating "EasyMoney™" that can be traded for real cash or goods and services based on the actual market value of such information. iQ-Telematics™ will benefit from a commission on the money saved or awarded to the driver and can also request standard fees from companies, institutions or individuals that would like to use the data.

Some may be evaluated based on market value, e.g. how many miles a driver spend on the road yearly, or they may be based on real time need, as in traffic data or street surface data, or Draw Bridge is open/close.

Other data can be evaluated based on auction system where a real time need by one person can drive a bidding process between people that offer the same service to get that real time need. Unlike cheaper hotel or airline services where a person need to directly look for a specific trip on a specific date or a specific hotel, this is system will proactively classify the commune member as a traveler and his overall profile is offered to interested parties to choose to bid or not to bid on his business and when the commune member enter a trip plan to his calendar, the offers will come in and the commune member will decide on which offer to accept.

Similar to above example in terms of real time, but without pre-review by potential bidder. A person driving may get a flat tire and he summons an SOS service using this business model. Usually, the SOS service will dispatch the available truck based on closeness and availability. In this model, the SOS will go to all services within a reasonable distance for bidding to service the flat tire.

A person seems to stop at certain brand place (e.g. shell, burger king, sears, etc.) The profile of this person can be evaluated in terms of visited location and other phenomenon, e.g. Time of visit, length of visit, purchases etc. The interested party, can be a competitor to the brand.

Another type of data that can be bid on is street views that are captured by cameras that is newer then what's the navigation company, search engine or advertising company have on file. They can get the photo exclusively or pay royalty so it can be shared among multiple customers.

Examples of energy conservation and energy efficiency are numerous and can be as abstract as mindset changes and as tangible as monetary savings resulting directly from using less energy. Additional examples of carbon value initiatives include; carpooling, using cloth shopping bags, purchasing locally grown food, purchasing green certified products, riding a bike or walking in place of driving a car or taking public transport, using public transport in place of a car, "e-cycling" of e-waste, a move closer to work or working from home, purchase of natural versus chemical products, hang drying of cloths in place of using a dryer, using alternative fuels (Biodiesel, ethanol, hydrogen, electricity, fuel cells) versus traditional fuels (gasoline and diesel), The CVT is ideally coupled with existing and emerging technology designed to track and bank data required verifying for the carbon bonds to be sold and traded on the open carbon stock exchange markets. This technology is a wide variety of energy infrastructure and IT hardware and software running on real-time web hosted platforms (ie, on the "Cloud"). The following flowchart is an example of the CVT coupled with a data mining and storage technology for driver habit and route optimization:

The CVT is composed of independent parties agreeing to work together in a commune format to harvest and sell energy conservation and pollution reduction savings to third-party entities. The CVT runs in phase with a variety of data collection and storage technologies including but not limited to; real-time web applications, optimization software and hardware, human physiology tracking hardware and software, condensed charge technology, electro-optical and fully optical computing devices, etc. The commune pools a wide selection of data collected through these technologies, the data is then sorted and appropriated to either a carbon bank, directly to a carbon sale or trade or pooled in a carbon micro-fund until a sufficient amount of carbon pollution mitigation credits are attained to justify a sale or trade. This tool will be running simultaneously for all commune members and will continually optimize the influx of data producing a steady stream of carbon pollution mitigation credits to the communes overall credit and dispersed to each commune member in proportion to their input.

At the center of the CVT is the individual commune member and the tool is designed to offer the highest data security and total data control in regards to collecting and sharing personal data and in regards to the amount of money or barter requested for the data. The commune acts as a "Carbon Clearing House" bringing value to the commune member's personal and collective initiatives.

While it will be appreciated, therefore, that while the invention Communal data storage and sharing, and applications staging center that can be accessed by commune participants (individuals, groups, corporations and governments) to store and share their data and to use applications unique to their purpose or common with at least one other commune member. The commune data is sorted for patterns and volumes that can be monetized by the commune management with profits shared among all commune members whose data was sold, leased, used or shared with another commune. The commune depository can be accessed through a land data line, through mobile data terminal operating autonomously or under partial human control, through direct access of bank account, debit card account, credit card account, accounting software on a computing medium, or by manually entering data or scanning receipts and other similar methods.

-2. Other data can be evaluated based on auction system where a real time need by one person can drive a bidding process between people that offer the same service to get that real time need. Unlike cheaper hotel or airline services where a person need to directly look for a specific trip on a specific date or a specific hotel, this is system will proactively classify the commune member as a traveler and his overall profile is offered to interested parties to choose to bid or not to bid on his business and when the commune member enter a trip plan to his calendar, the offers will come in and the commune member will decide on which offer to accept, has been described with respect to one preferred embodiment, many other variations, modifications and applications of the invention may be made.

Another invention relates to Portable telematics built in camera utilization.

Most cell phones carry a camera. What this invention propose to do is to have the camera capture pictures continuously while the vehicle in motion to do one or more of the followings: 1—Monitor the road ahead including the lane markers and the traffic ahead. 2—The Cradle AND/OR the phone controllers will analyze captured images to avoid lane departure. 3—The Cradle AND/OR the phone controllers will analyze captured images to avoid collisions. 4—If the Camera is turned to the user, then the camera will monitor the drivers face and eyes for distraction, drowsiness and eyes off the road In either case, the data from the camera will be used for reporting in event of an accident As data of what was happening, As remote Camera so emergency personnel can see what's inside the car, In event of monitoring purposes the camera is used to comply with legislative, legal, companies policies or procedures To monitor the driver in real time remotely. And to act as a black box recorder.

While it will be appreciated, therefore, that while the invention, Portable telematics built in camera utilization in automotive application so a device with a controller and software can make use of the camera for sensing safety related events or objects within the field of view inside or outside the vehicle, has been described with respect to one preferred embodiment, many other variations, modifications and applications of the invention may be made.

Another invention relates to Sun wash countermeasure for external rear view mirrors with warning lights Thursday. Current Mirror reflective surface design (293), Optical indicator (294), Proposed mirror reflective surface design with blacked out area (295).

Embedding a light on the reflective surface of a rear view mirror may subject it to sunlight wash where none of the indicator lights may be visible as a result of the sun rays reflection.

The solution is to surround the light source with non-reflective surface so the sunrays will not affect it and will allow the indicator light to be distinguished from the sunlight. The non-reflective surface is permanently etched, non-reflective portion, painted portion or electrochromic switched surface triggered by preset threshold of sun light or other illuminations.

While it will be appreciated, therefore, that while the invention has been described with respect to one preferred embodiment, many other variations, modifications and applications of the invention may be made.

Another invention relates to evacuating odor from a toilet bowl while in use. This is particularly annoying in public toilets or in houses where a big family use the restroom around the same time such as when going to work or school in the morning. Toilet seat (296), Suction adaptor to remove fumes from bowl (297), Sensor to activate blower (298), Fumes direction (299), Water in bowl (300), Water seal to trap vapor (301), Fume suction tube (302), Blower box (303), Power source (304), Evacuated fumes (305), Trapped fumes (306).

The current method used is to mount a fan somewhere in the ceiling and to keep the fan running all the time, thus throwing heated or cooled air to the outside, and ineffectively and inefficiently dealing with the odor and gases problem, or to activate the fan on demand, which is no more effective than the always on method.

This system proposes two different engineering approach to the problem. The common feature between them is an adaptor between the toilet seat and the toilet bowl, or part of either. The adaptor is basically a hollow body with openings to the inside of the U shape. In other word, it is a hollow toilet seat with openings on the inside edge of the bowl. The adaptor will have one other opening that attaches to a housing containing an electric blower. The electric blower activates automatically when a sensor in the seat detects a load or detects the gas being emitted or by optically detecting usage. Alternately, the blower may also be activated when the room light switch comes on or the door to a stool is open or any other similar sensing means.

The difference between the two engineered methods is where does the blower send the fumes collected from the bowl through the adaptor.

One method is to send the fumes via tubes into the ceiling fan which activates concurrently with the seat blower. The tubes can be visible in case of an after the fact installation, or may be installed inside the walls. Another option that can eliminate the need for a blower at the toilet bowl is to have the ceiling fan be optimized to handle the evacuation just as a vacuum uses a long hose to clean dust from a high place. This will reduce the cost of such installation and is probably more economical in public/multi stall settings.

The other method involves having the blower connected to a tube that goes inside the bowl and loops into the water trap to evacuate the fumes into the sewer line. This tube is preferably a chrome tube so it is easy to clean and preferably pliable so it can be tightly attached to the bowl interior to prevent solids from getting trapped between it and the bowl wall The blower may have an optional aroma cartridge to add air freshener to the bowl after the toilet is no longer in uses. In either case, the blower or the ceiling fan may continue to operate for short period of time to assure that all the fumes are dealt with completely. Or to rely on an optional gas detector to detect if too much methane is still in the bowl.

While it will be appreciated, therefore, that while the invention has been described with respect to one preferred embodiment, many other variations, modifications and applications of the invention may be made.

Another invention relates to modular cradle for telematic devices and a mounting method thereof. Car roof (334), Instrument panel/Dashboard surface/Center Console or Vehicle floor (335), Arm holding cradle(Cradle not shown) (336), Mounting bracket (337), Windshield (338), Main body Post (339), Mounting bracket (340), Portable Telematics device or other driver used accessories (341).

Current mounting cradle in the car are always using suction cups to be mounted to the windshield or other smooth surfaces. It is illegal in some jurisdictions to mount anything the windshield. Another problem with this mounting method is the changes in temperature and imperfections or dirt on the windshield or the suction cup causes the devices to fall while driving which causes driver distraction in addition to the possible loss of time critical information such as a dropped call or navigation information. The week mounting also causes the items to fly around in case of an accident. Using the camera function for recording also produces poor images because of vibrations.

To avoid the problem mentioned above, the new invention uses two points mounting system when the mount attaches to two points, e.g. windshield and instrument panel, or two points on the windshield, or the cup holder and the roof of the car and so on.

This mounting system will allow for sturdier docking and also for multiple docking of multiple equipments. For example, strong mounting between the floor or the cup holder and the vehicle roof can support a notebook, a cup holder and a cellphone. While a mounting with two points on the windshield will likely be used for navigation and phones only and a mounting between the IP panel and the Windshield can be used for phone/navigation and cup holder.

The mounting body may have built in cradles and cup holders or may have attachments of various strength and length equipped to handle specific function. For example, the cup holder mount may be sturdier than that of the phone, but may also have an optional heating or cooling attachment with a power source. The phone may only require a cradle and a power source. The mounting body may then have a power strip to enable various plug-ins for power including A/C and DC outlets. Another accommodation for the cup holder is the possible addition of a small reservoir to the cradle so a spill will be trapped in the reservoir below the cup and will not cause The body of the mounting system will be strong enough to support the weight loaded and to avoid losing the mounted devices in case of an accident. Another way is to make the mounting body capable of fracturing to pieces without falling apart completely so the fracturing will take away some of the impact energy, but will keep the mounting all together so there are no flying projectile.

One envisioned form of this mounting body is a long rod that is adjustable in length. The mounting body maybe hollow and contains a rope through it that is firmly attached to both end. Furthermore, the body may be made of several pieces that can come apart when exposed to certain G forces or acceleration due to accident, but the rope inside the body will keep the parts together even though they are not snapped together anymore.

While it will be appreciated, therefore, that while the invention has been described with respect to one preferred embodiment, many other variations, modifications and applications of the invention may be made.

Another invention relates to Playing one own music while on hold. The system will receive a signal from a remote system telling the phone controller that it is on hold. The phone controller will then play music stored on the phone or on the web music that is selected by the phone owner or user, who may also choose not to play any music at all so the caller does not hear an annoying music.

The remote system will issue a signal instructing the system to hold or resume based on the remote system activity, e.g. if the remote system is ready to connect the caller to an operator or if requesting more information to be entered verbally or via dial pad. The signals exchanged between the phone controller and the remote controller can be audio tone or a network based communication protocol or a wireless signal While it will be appreciated, therefore, that while the invention has been described with respect to one preferred embodiment, many other variations, modifications and applications of the invention may be made.

Another field deals with Connected Utility station that can supply heating, cooling and other services while parking in inclement weather.

While it will be appreciated, therefore, that while the invention has been described with respect to one preferred embodiment, many other variations, modifications and applications of the invention may be made.

Another invention relates to Maximizing the use of Kinetic energy already generated by managing the Potential energy existing in a moving object using foot gesture interpretation and environmental factors to manage the entire trip-1. a multipurpose vehicle pedal or multiple pedals with expanded functionality in that at least one is 1. Monitored by a controller that is connected to different soft or mechanical actuators that can control at least power train and vehicle speed.

2. Changes role based on context and said controller is effective to actuate different actuators based on such context where such context include at least one of:

a. Internal OR external signal where such signal includes at least one of implicit or explicit
      i. Data OR signal from LAN, WAN, Internet, PAN about infrastructure or other vehicles in the immediate vicinity or in remote location
      ii. Data OR signal from LAN, WAN, Internet, PAN about infrastructure or other vehicles in the immediate time frame or historical time frame
      iii. Data OR signal about a pedestrian in the immediate vicinity or in remote location
      iv. Data OR signal about a pedestrian in the in the immediate time frame or historical time frame
      v. Data OR signal about other vehicle in the immediate vicinity or in remote location
      vi. Navigation software on board
      vii. Operator action as associated with the immediate vicinity or upcoming vicinity
      viii. Operator action as associated with the immediate time frame or historical time frame
      ix. Data about the environment
      x. Data about the road condition
      xi. Data about traffic
   b. External signal where such signal includes at least one of one of implicit or explicit
      i. Data signal from LAN, WAN, Internet, PAN about infrastructure or other vehicles in the immediate time frame or historical time frame
      ii. Data about the environment
      iii. Data about the road condition
      iv. Data about traffic
      v.
   c. Driving purpose
   d. Vehicle type
   e. Energy recovery or storage device status
   f. Trip context including destination
   g. Data OR signal from a portable device in the possession of the driver, passenger
   h. Vehicle speed or momentum
   i. Driving policy as set by at least one of a Regulatory factor, Legal factor, Laws, Driver preferences or vehicle owner settings
      i. Where preferences are set explicitly or implicitly 3. When the controller translates the context into action to maximize the benefit of the potential energy present in the vehicle at the time at least one context and one pedal is actuated -2. A system for energy conservation and allocation that uses at least one controller that is monitoring multiple factors status and then it is effective to change the mechanical linkage of the power train to maximize the use of the potential energy stored in the vehicle due to its current momentum by deciding if such energy is better used to perpetuate the vehicle travel or to store it in an energy recovery device. Hyper Miler System (HMS) algorithm (307), Transmission (308), Engine or Motor (309), Drive shaft(s) (310), Wheels (311), Driving System Algorithm (312), Copyright statement, presentation audience and presentation name: Applikompt, Applied Computer Technologies, Inc. Copyright (C) 1987, 1997, 2009 Applied Computer Technologies Inc. Delphi Vehicle Travel Management (313), Patent pending statement: United States and international patents are pending. All rights reserved, This is a presentation for the purpose of soliciting business transaction and not for benchmarking or sharing of ideas. All contents are intellectual properties and need to be licensed by the inventor for use by any other party or entity. (314), Copyright statement, presentation audience and presentation name: Applikompt, Applied Computer Technologies, Inc. Copyright (C) 1987, 1997, 2009 Applied Computer Technologies Inc. Delphi Vehicle Travel Management (313), Patent pending statement: United States and international patents are pending. All rights reserved, This is a presentation for the purpose of soliciting business transaction and not for benchmarking or sharing of ideas. All contents are intellectual properties and need to be licensed by the inventor for use by (314), Copyright statement, presentation audience and presentation name: Applikompt, Applied Computer Technologies, Inc. Copyright (C) 1987, 1997, 2009 Applied Computer Technologies Inc. Delphi Vehicle Travel Management (313), Patent pending statement: United States and international patents are pending. All rights reserved, This is a presentation for the purpose of soliciting business transaction and not for benchmarking or sharing of ideas. All contents are intellectual properties and need to be licensed by the inventor for use by (314), Copyright statement, presentation audience and presentation name: Applikompt, Applied Computer Technologies, Inc. Copyright (C) 1987, 1997, 2009 Applied Computer Technologies Inc. Delphi Vehicle Travel Management (313), Patent pending statement: United States and international patents are pending. All rights reserved, This is a presentation for the purpose of soliciting business transaction and not for benchmarking or sharing of ideas. All contents are intellectual properties and need to be licensed by the inventor for use by (314), Vehicle On Board Sensors (315), Wireless data from other vehicles and infrastructure (316), DSRC data (317), wireless traffic Infrastructure (318), Traffic data (319), Uphill data (320), Level road data (321), infrastructure data (322), Downhill data (323), Winding road data and 90 degrees turns (324), Database updated in real time (325), Vehicle in travel/Or Standing/Parking/(326).

While it will be appreciated, therefore, that while the invention has been described with respect to one preferred embodiment, many other variations, modifications and applications of the invention may be made.

Another invention relates to a multipurpose vehicle pedal or multiple pedals with expanded functionality in that at least one is monitored by a controller that is connected to different soft or mechanical actuators that can control at least power train and vehicle speed Changes role based on context.

Using Swing Set as a model to explain Maximizing Vehicle Range by defining the entire driving experience as One System and use this definition to maximize benefit of already Converted Chemical Energy.

As Known, A swing pushed by a person in direction X will Have an X & Y forces acting on it. Initially moved in the pushed direction X until the potential energy pushing it in XY direction is overtaken by the force of gravity Y direction. It then heads back in the opposite direction for another push to power its trip.

Scenario A: If there was no additional pushing, the swing will oscillate until all stored energy is dissipated in the form of movement (Swinging). (This is analogues to a soap box cart sliding down the road without any hindrance and no breaks)

Scenario B: Immediate stopping of the swing can be achieved if the swing was to be grabbed instead of pushed, thereby placing equal & opposite force in the direction opposite to the swing causing the net energy stored to become Zero. (This is analogous to a soap box cart with brakes and where applying the brakes immediately dissipates the potential energy and the momentum to zero)

Scenario C: Slower stopping can also be achieved if instead of grabbing the swing and forcing it to stop, the person on the swing can let his feet touch the ground thus creating a faster damping then he would if he was to let the swing expand its energy in oscillation. (This is analogous to a modern car with a transmission and a propulsion system (e.g. an ICE or an electric motor etc.). Lifting one foot off of the accelerator is similar to stopping the pushing of the swing and dangling the feet to drag on the ground is analogous to breaking by the engine or by shifting down the transmission to transfer the energy propelling the vehicle to a reverse angular torque through the wheels, the driving axle, the transmission and finally the engine who will dissipate the energy by increased RPM using the combustion to dampen the torque coming out of the transmission (Otherwise, commonly known as breaking with the engine instead of using the brakes).

Unlike the swing in scenario A that will dissipate all of its energy in additional swinging thus providing more value and entertainment to the user without additional effort, a Vehicle and power train combos as designed today will not maximize the use of the Chemical energy spent to propel the vehicle if the driver decides to decrease the speed or stop altogether. As in Scenario C, once the driver let go of the gas pedal, the vehicle will begin to experience an immediate dissipation of the potential momentum/energy due to reverse torque being applied from the road surface through the tires and transmission and engine (Breaking by Engine). This is a wasted momentum/energy particularly if the driver does not intend to stop.

For the case when a driver wants to stop, regenerative braking is a way to store some of this energy in a mechanical or chemical form, e.g. charging a battery, flywheel, hydraulic compression (Gases or Fluids) or torsion. This method proved beneficial in storing energy that otherwise would be dissipated as friction heat between brake pads and disk-drum as well as friction between tires and road surface. This helped in increasing the range of a vehicle There is an obvious gap in conserving or maximizing the range of a vehicle based on a preset initial energy conversion from chemical—Mechanical to propulsion. This gap exists in the unnecessary reverse torque and breaking by the engine. While it is obvious that when a driver removes his foot off the gas pedal is an indication that the driver no longer wants to move at the same speed, the fact that the driver did not apply the brake is another indicator that the driver does not want to stop nor want to immediately decrease the speed, so applying breaking by reverse torque is wasting the stored energy in the vehicle unnecessarily and counter to what the driver wants. Although drivers are used to this today and incorporate the breaking by engine into their driving skill, this does not mean that it is not a wasteful phenomenon.

As evident from various news stories, many people recognized the above conclusions and they took it upon themselves to maximize their mileage manually. Doing so under manual control and with current engineering is dangerous, illegal and damaging to vehicles as designed currently. What I am suggesting is an engineered approach that adds to the current vehicle design at least one new piece of engineering that works with changes in the software the operate the power train change the states which the power train goes to based on driver issued commands.

For example, while the driver "Foot Gesture" (Off/On-Increase/On-Decrease/On-Stable) pressure on gas and brake pedal, are accounted for, the current system does not treat the Off Gas/Off Brake as a unique state, but rather treats it as Off Gas/On Brake even when the brake pedal is not applied yet.

In addition to driver gesture, which is a purely manual operation mode, there are many other states that do not involve the driver gesture, but rather comes from other elements of the DrivingSystem™.

DrivingSystem™: In the previous project, Safe Telematic Monitoring and Control Gateway, we treated the entire driving experience as one system so we can account for possible points of failure on behalf of the driver so we can provide accurate and timely warning and workload management. We suggest here that we can do the same thing to focus on the vehicle mileage maximization instead of focusing on the driver distraction minimization.

For our purpose, we will transform the DrivingSystem™ to Hyper Miler System:
MAN:
Foot Gesture interpretation (Assuring Driver Intent)
Foot On Gas
Stable
Increase
Decrease
Foot off Gas
Foot off Brake
Foot On Brake
Stable
Increase
Decrease
Driver Activity: (Assuring Driver Intent)
Turn Signal activation
Based on Foot Gesture
Based on Driver preferences or habits
Machine:
Car
Data
From Communication Device
e.g. LAN, WAN, Internet, Vehicle to Vehicle, (VtoV), Infrastructure to Vehicle, (ItoV)
From Sensors
Forward, Rear, Surroundings proximity sensors
Traffic light status detectors (Optical)
Bridge status indicator (Optical)
Emergency Vehicle Indicator (Audible or optical)
Inclinometer
Machine Safe Operation Envelop
Environment:
Geography from Map Data
Location and direction
based on Trip plan from a PIM
based on possible or probable heading as per driver history, habits and preferences including day, time, week, season workday, weekday, vacation day etc.
Topography from data
Topography from sensors e.g. freeway ramps, etc.
Subject vehicle on board sensors
shared from "Other vehicle" via WEB/LAN/WAN, VtoV or ItoV on board sensors
Real-time weather
Real-time Road adhesion coefficient, classified (e.g., wet, dry, snow-covered etc.) approximated or actually measurement, Real Time traffic density condition from off vehicle data or on vehicle sensors. Optical, RF, Laser, Sonar etc.

Environment Safe Operation Envelop

History:

Driver Skills and experience

Driver history and familiarity with the Machine

Driver history and familiarity with the Environment

Driver history and familiarity with the DrivingSystem™

Maximum and Minimum known safe operation that does not cause accidents

As it relates to environment

Infrastructure: Roads, Roads Curvature, etc.

Weather

Effect on Driver, e.g. visibility or comfort, etc

Effect on vehicle

Effect on road surface and infrastructure

As it relates to Machine

Vehicle type and capabilities, including maintenance

As it relates to Driving purpose

Regulation:

Speed limit

MAX

MIN

Etc.

Distance Separation from other vehicles in traffic

Safety Regulation

Any other regulation imposed by government, fleet management, parents etc.

The Hardware: Now that we analyzed the basis for the system, we will turn our attention to the hardware involved. While the current system Engine-Motor and Transmission can be modified or re-engineered to separate/decouple the system from the Road, durability issues as well as engineering issues may stand in the way of the decoupling. This is true for both manual and automatic transmission, but for different reasons (Wear and tear on A/T clutch due to lack of lubrication and the position of the manual gear. The current ignition system also depends on starter and to stop the combustion engine or electric motor from consuming electrical energy will involve shutting off other accessories at the same time.

The natural solution is to have a mechanism monitored and activated by a controller that takes input from the Hyper Miler System as defined above and selectively based on certain conditions and thresholds disconnect the wheels of the vehicle from the power train so the car acts in the following modes:

Rolls freely like a soap box car (totally disconnected from the Drivetrain).

Uses Regenerative breaking to recover energy when slowing down or stopping is desired as indicated by the driver Foot Gesture or Automatic Cruise Control Or Automatic Breaking.

May be existing Regenerative breaking that can also be used to drive vehicle, e.g. motor changing role to generator when breaking by engaging the Drive Train.

New type of regenerative breaking that is incorporated in the to the New Hardware that may have in part, a permanent magnet generator, but also has electrical magnet that can proportionally increase or decrease the magnetic field to vary the damping effect on the momentum.

Activate powertrain to generate energy but keep Drivetrain uncoupled from wheel.

Activate powertrain AND couple Drivetrain to wheel to achieve acceleration or increase the breaking of the vehicle beyond regenerative and friction braking.

This Soapbox mechanism will have to be implemented at least in one location, (after the transmission and before the drive axle), or on each wheel where it connects to the axle so it can be used to individually control the breaking or the rolling speed of each wheel individually.

Other novel modifications will have to be added to the vehicle to enhance its existing capability so they can compensate with what is today deemed as illegal or dangerous. Such the attached "Accelerator Brake Pedal as a Starter Button" and "Vehicle hydraulic fluid pump that is also an electric motor and a generator."

In case the vehicle is equipped with regenerative braking/hybrid system, the system will make a decision as to which is better to deploy, the regenerative braking or the HMS.

The HMS system can actually enhance the capability of the regenerative braking because the full potential energy stored in the vehicle will be directed toward regeneration more often than with braking only.

The FIG. 56 is a sample truth table of the operations as per signals collected from the Hyper Miler System.

While it will be appreciated, therefore, that while the invention has been described with respect to one preferred embodiment, many other variations, modifications and applications of the invention may be made.

Another invention relates to another field deals with Modifiable docking station for portable telematics in that it allows a connection point to be affixed to a certain location and moved when another device is being used by replacing the cable only or by shifting its position. This is done to make docking a portable device in the car a single step operation instead of messing around with cables. Portable telematics device (327), Portable telematics device Power connector (328), External power connector (329), Power source (330), Brackets (331), Locator holes to adjust location of brackets (332), Cradle body (333).

The docking station body is one block that comes with 4 attachment. Each attachment connects to one side of a square boy of the cradle one of the attachment is an adaptor designed for specific use so that when attached to the body of the cradle it is perfectly aligned to at least one port on the cradle.

The attachment are designed to plug into the body of the cradle through holes in the body of the cradle.

The part of the attachment that plugs into the holes has long arms and it can plug into the body at various depth to adjust to the size of the devise. the body of the cradle also has multiple holes vertically so the attachment can adjust to the thickness of the device being mounted.

a securing mechanism, like a screw pushing against the attachment prongs inside the cradle can be used to secure the extensions inside a power adaptor specific to the device being mounted, or other ports adaptor is mounted in a similar way.

While it will be appreciated, therefore, that while the invention has been described with respect to one preferred embodiment, many other variations, modifications and applications of the invention may be made.

The invention claimed is:

1. A method for adjusting an outside mirror and an inside rear view mirror of a vehicle comprising:

receiving pre-stored information identifying a driver;

identifying physical dimensions of the driver;

setting at least one of the outside mirror and the inside rear view mirror to a first position based on the physical dimensions of the driver to avoid a dangerous condition;

receiving new information from the vehicle in motion; and adjusting the position of the outside mirror and the inside rear view mirror according to the new information.

2. The method of claim 1 wherein setting at least one of the outside mirror and the inside rear view mirror to a first position based on the physical dimensions of the driver to avoid a dangerous condition further comprises wherein the first position of the outside mirror and inside rear view mirror is the optimal position based on the identified driver physical dimensions.

3. The method of claim 1 wherein receiving new information from the vehicle further comprises receiving new information from the vehicle including at least one of a turn signal indicator, a position shift of the driver, and a relative movement of nearby vehicles.

4. The method of claim 1 wherein receiving new information from the vehicle further comprises receiving new information from the vehicle including real time map data and vehicle location provided by global positioning (GPS).

5. The method of claim 1 wherein receiving new information from the vehicle further comprises receiving new information from the vehicle including a turn signal indicator and adjusting the outside mirror for scanning a blind spot of the driver based on the turn signal indicator.

6. The method of claim 1 wherein receiving new information from the vehicle further comprises obtaining new information through at least one video camera on the interior and exterior of the vehicle.

7. A method for adjusting an outside mirror and an inside rear view mirror of a vehicle comprising:

receiving pre-stored information identifying a driver;
identifying physical dimensions of the driver;
setting at least one of the outside mirror and the inside rear view mirror to a first position based on the physical dimensions of the driver to avoid a dangerous condition;
receiving new information from the vehicle in motion wherein the new information includes at least one of a turn signal indicator, a position shift of the driver, and a relative movement of nearby vehicles; and
adjusting the position of the outside mirror and the inside rear view mirror according to the new information.

8. The method of claim 7 wherein setting at least one of the outside mirror and the inside rear view mirror to a first position based on the physical dimensions of the driver to avoid a dangerous condition further comprises wherein the first position of the outside mirror and inside rear view mirror is the optimal position based on the identified driver physical dimensions.

9. The method of claim 7 wherein receiving new information from the vehicle further comprises receiving new information from the vehicle including real time map data and vehicle location provided by global positioning (GPS).

10. The method of claim 7 wherein receiving new information from the vehicle further comprises receiving new information from the vehicle including a turn signal indicator and adjusting the outside mirror for scanning a blind spot of the driver based on the turn signal indicator.

11. The method of claim 7 wherein receiving new information from the vehicle further comprises obtaining new information through at least one video camera on the interior and exterior of the vehicle.

12. A method for adjusting an outside mirror and an inside rear view mirror of a vehicle comprising:

receiving pre-stored information identifying a driver;
identifying physical dimensions of the driver;
setting at least one of the outside mirror and the inside rear view mirror to a first position based on the physical dimensions of the driver to avoid a dangerous condition;
receiving new information from the vehicle in motion wherein the new information includes a turn signal indicator; and
adjusting the position of the outside mirror for scanning a blind spot of the driver based on the turn signal indicator.

13. The method of claim 12 wherein setting at least one of the outside mirror and the inside rear view mirror to a first position based on the physical dimensions of the driver to avoid a dangerous condition further comprises wherein the first position of the outside mirror and inside rear view mirror is the optimal position based on the identified driver physical dimensions.

14. The method of claim 13 wherein receiving new information from the vehicle further comprises receiving new information from the vehicle including at least one of a position shift of the driver and a relative movement of nearby vehicles.

15. The method of claim 14 wherein receiving new information from the vehicle further comprises receiving new information from the vehicle including real time map data and vehicle location provided by global positioning (GPS).

16. The method of claim 15 wherein receiving new information from the vehicle further comprises obtaining new information through at least one video camera on the interior and exterior of the vehicle.

* * * * *